US011712638B2

(12) United States Patent
Szczap

(10) Patent No.: US 11,712,638 B2
(45) **Date of Patent: *Aug. 1, 2023**

(54) ELECTROSTATIC SPRAY DRYER SYSTEM

(71) Applicant: Spraying Systems Co., Wheaton, IL (US)

(72) Inventor: Joseph P. Szczap, Naperville, IL (US)

(73) Assignee: Spraying Systems Co., Wheaton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,943

(22) Filed: Oct. 31, 2019

(65) Prior Publication Data

US 2021/0146272 A1 May 20, 2021

Related U.S. Application Data

(60) Provisional application No. 62/754,691, filed on Nov. 2, 2018.

(51) Int. Cl.
*B01D 1/18* (2006.01)
*B05B 5/03* (2006.01)
(Continued)

(52) U.S. Cl.
CPC .................. *B01D 1/18* (2013.01); *B05B 5/03* (2013.01); *F26B 3/08* (2013.01); *F26B 3/12* (2013.01);
(Continued)

(58) Field of Classification Search
CPC ......... A23B 5/035; A23B 7/026; A23L 2/102; A23L 3/46; B22F 9/026; B01D 53/505;
(Continued)

(56) References Cited

U.S. PATENT DOCUMENTS

| | | | | | |
|---|---|---|---|---|---|
| 2,730,282 | A * | 1/1956 | Bonner | B01D 1/18 | 141/51 |
| 3,762,063 | A * | 10/1973 | Mullner | B01D 1/18 | 34/314 |
| 4,111,204 | A * | 9/1978 | Hessel | A61M 1/604 | 604/321 |
| 5,015,332 | A | 5/1991 | Iwaya | | |

(Continued)

FOREIGN PATENT DOCUMENTS

| | | | |
|---|---|---|---|
| EP | 0328070 | A1 | 8/1989 |
| KR | 101881354 | B1 | 7/2018 |

OTHER PUBLICATIONS

"Inflatable Rubber Seals", SealingProjex, Sep. 2, 2012 (date obtained from WayBack Machine), URL: https://www.sealingprojex.com/products/inflatable-rubber-seals/ (Year: 2012).*

(Continued)

*Primary Examiner* — Jonathan Luke Pilcher
(74) *Attorney, Agent, or Firm* — Leydig, Voit & Mayer, Ltd.

(57) ABSTRACT

An electrostatic spray dryer for drying liquid into powder including an elongated cylindrical drying chamber having an electrostatic spray nozzle at an upper end and a powder collection vessel at a lower end. The powder collection vessel includes a removable and replaceable filter collections sock made of filter material for receiving and collecting dried powder from the drying chamber. For cleaning residual powder from an inside wall of the drying chamber, a scraper member is provided that is coupled by magnetic attraction to a manually removable driver on the external surface of the wall.

16 Claims, 45 Drawing Sheets

(51) Int. Cl.
    *F26B 3/08*           (2006.01)
    *F26B 3/12*           (2006.01)
    *F26B 21/00*         (2006.01)
    *F26B 21/04*         (2006.01)
    *F26B 21/08*         (2006.01)
    *F26B 21/14*         (2006.01)
    *F26B 25/00*         (2006.01)
    *F26B 25/04*         (2006.01)

(52) U.S. Cl.
    CPC ............ *F26B 21/004* (2013.01); *F26B 21/04* (2013.01); *F26B 21/086* (2013.01); *F26B 21/14* (2013.01); *F26B 25/007* (2013.01); *F26B 25/04* (2013.01)

(58) Field of Classification Search
    CPC .......... B01D 1/18; B01D 23/04; B01D 45/02; B01D 46/0005
    See application file for complete search history.

(56) References Cited

U.S. PATENT DOCUMENTS

| | | | |
|---|---|---|---|
| 9,067,728 B2* | 6/2015 | Schmid ................. | B65G 19/04 |
| 10,279,359 B2* | 5/2019 | Ackerman ......... | B01D 46/0005 |
| 10,286,411 B2* | 5/2019 | Ackerman .............. | B05B 7/066 |
| 10,399,098 B2* | 9/2019 | Bright ....................... | F26B 3/12 |
| 10,543,495 B2* | 1/2020 | Ackerman .............. | B05B 7/067 |
| 10,933,343 B2* | 3/2021 | Szczap ..................... | B05B 5/03 |
| 11,033,914 B2* | 6/2021 | Ackerman .............. | F26B 21/02 |
| 2013/0230372 A1* | 9/2013 | Schmid .................. | B65D 88/60 414/288 |
| 2017/0120267 A1* | 5/2017 | Ackerman .............. | B01D 1/18 |

OTHER PUBLICATIONS

European Patent Office, International Search Report and Written Opinion in corresponding International Patent Application No. PCT/US2019/059085 dated Jun. 26, 2020 (15 pages).

* cited by examiner

MACHINE AIRFLOW CONFIGURATIONS TABLE

| VARIABLE OPTIONS | CONFIGURATION A | CONFIGURATION B | CONFIGURATION C | CONFIGURATION D | CONFIGURATION E | CONFIGURATION F |
|---|---|---|---|---|---|---|
| CHAMBER LENGTH (VARIED BY ADDING OR REMOVING EXTENSION SPOOL) | LONG OR SHORT | LONG OR SHORT | LONG OR SHORT | LONG OR SHORT | LONG OR SHORT | LONG OR SHORT |
| LINER MATERIAL (NON-PERMEABLE OR PERMEABLE) | NON PERMEABLE | NON PERMEABLE | PERMEABLE | PERMEABLE | PERMEABLE | PERMEABLE |
| NOZZLE ORIENTATION (TOP SPRAYING DOWNWARD, BOTTOM SPRAYING UPWARD) | TOP SPRAY | BOTTOM SPRAY | TOP SPRAY | TOP SPRAY | BOTTOM SPRAY | BOTTOM SPRAY |
| PROCESS GASFLOW DIRECTION (GENERAL DIRECTION THROUGH CHAMBER; PORT USAGE VARIES BASED ON CONFIGURATION) | DOWNWARD | DOWNWARD | UPWARD | DOWNWARD | UPWARD | DOWNWARD |

FIG. 25

ELECTROSTATIC SPRAY DRYER SYSTEM

This patent application claims the benefit of U.S. Provisional Patent Application No. 62/754,691, filed Nov. 2, 2018, which is incorporated by reference.

FIELD OF THE INVENTION

The present invention relates generally to spray dryers, and more particularly to an apparatus and methods for spray drying liquids into dry powder form.

BACKGROUND OF THE INVENTION

Spray drying is a well known and extensively used process in which liquid slurries are sprayed into a drying chamber into which heated air is introduced for drying the liquid into powder. The slurry commonly includes a liquid, such as water, an ingredient, such as a food, flavor, or pharmaceutical, and a carrier. During the drying process, the liquid is driven off leaving the ingredient in powder form encapsulated within the carrier. Spray drying also is used in producing powders that do not require encapsulation, such as various food products, additives, and chemicals.

Spray drying systems commonly are relatively massive in construction, having drying towers that can reach several stories in height. Not only is the equipment itself a substantial capital investment, the facility in which it is used must be of sufficient size and design to house such equipment. Heating requirements for the drying medium also can be expensive.

While it is desirable to use electrostatic spray nozzles for generating electrically charged particles that facilitate quicker drying, due to the largely steel construction of such sprayer dryer systems, the electrostatically charged liquid can charge components of the system in a manner, particularly if unintentionally grounded, that can impede operation of electrical controls and interrupt operation, resulting in the discharge of uncharged liquid that is not dried according to specification.

While it is known to form the drying chamber of electrostatic spray dryers of a non metallic material to better insulate the system from the electrically charged liquid, particles can adhere to and build up on the walls of the drying chamber, requiring time consuming cleanup which interrupts the use of the system. Moreover, very fine dried powder within the atmosphere of heating air in the drying chamber can create a dangerous explosive condition from an inadvertent spark or malfunction of the electrostatic spray nozzle or other components of the system.

Such spray dryer systems also must be operable for spray drying different forms of liquid slurries. In the flavoring industry, for example, it may be necessary to operate the system with a citrus flavoring ingredient in one run, while a coffee flavoring ingredient is used in the next operation. Residual flavor material adhering to the walls of the drying chamber can contaminate the taste of subsequently processed products. In the pharmaceutical area, of course, it is imperative that successive runs of pharmaceuticals are not cross-contaminated.

Existing spray dryer systems further have lacked easy versatility. It sometimes is desirable to run smaller lots of a product for drying that does not require utilization of the entire large drying system. It further may be desirable to alter the manner in which material is sprayed and dried into the system for particular applications. Still in other processing, it may be desirable that the fine particles agglomerate during drying to better facilitate ultimate usage, such as where more rapid dissolution into liquids with which it is used. Existing sprayers, however, have not lent themselves to easy alteration to accommodate such changes in processing requirements.

Spray dryers further tend to generate very fine particles which can remain airborne in drying gas exiting the dryer system and which must be filtered from gas exiting the system. Such fine particulate matter can quickly clog filters, impeding efficient operation of the dryer and requiring frequent cleaning of the filters. Existing spray dryers also have commonly utilized complex cyclone separation and filter arraignments for removing airborne particulate matter. Such equipment is expensive and necessitates costly maintenance and cleaning.

Another issue with spray dryer systems is potential damage to the finished product after completion of the drying process. In particular, damage to the finished product can occur if it is exposed to moisture-laden process gas, excess heat or oxygen. For example, some spray-dried products are very hydroscopic and may reabsorb moisture after the spray drying process is completed if the product is exposed too long to the moisture-laden dryer exhaust stream. While evaporative cooling protects spray-dried products from damage caused by exposure to heat during the spray drying process, some spray-dried products can only tolerate high temperatures for a short period before they begin to denature or otherwise degrade. Thus, prolonged exposure to a heated exhaust stream can lead to product damage. Additionally, some products also can oxidize if exposed to oxygen after completion of the drying process.

Another issue with spray dryer systems is potential damage to the finished product after completion of the drying process. In particular, damage to the finished product can occur if it is exposed to moisture-laden process gas, excess heat or oxygen. For example, some spray-dried products are very hydroscopic and may reabsorb moisture after the spray drying process is completed if the product is exposed too long to the moisture-laden dryer exhaust stream. While evaporative cooling protects spray-dried products from damage caused by exposure to heat during the spray drying process, some spray-dried products can only tolerate high temperatures for a short period before they begin to denature or otherwise degrade. Thus, prolonged exposure to a heated exhaust stream can lead to product damage. Additionally, some products also can oxidize if exposed to oxygen after completion of the drying process.

OBJECTS AND SUMMARY OF THE INVENTION

It is an object of the present invention to provide a spray dryer system adapted for more efficient and versatile operation.

Another object is to provide an electrostatic spray dryer system as characterized above that is relatively small in size and more reliable in operation.

Still another object is to provide an electrostatic spray dryer system that is relatively short in height and can be installed and operated in locations without special building or ceiling requirements.

A further object is to provide an electrostatic spray dryer system of the foregoing type that is effective for spray drying different product lots without cross-contamination.

Yet another object is to provide an electrostatic spray dryer system of the above kind that is easily modifiable, both in size and processing techniques, for particular drying applications.

A further object is to provide an electrostatic spray dryer system that is operable for drying powders in a manner that enables fine particles to agglomerate into a form that better facilitates subsequent usage.

Still another object is to provide an electrostatic spray dryer system that can be effectively operated with lesser heating requirements, and hence, more economically. A related object is to provide a spray dryer system of such type that is operable for effectively drying temperature sensitive compounds.

Another object is to provide a modular electrostatic spray dryer system in which modules can be selectively utilized for different capacity drying requirements and which lends itself to repair, maintenance, and module replacement without shutting down operation of the spray dryer system.

Yet another object is to provide an electrostatic spray dryer system of the above type that is less susceptible to electrical malfunctions and dangerous explosions from fine powder and the heating atmosphere within the drying chamber of the system. A related object is to provide a control for such spray dryer system that is effective for monitoring and controlling possible electrical malfunctions of the system.

Another object is to provide a spray dryer system of such type which has a filter system for more effectively and efficiently removing airborne particulate matter from drying gas exiting the dryer and with lesser maintenance requirements.

A further object is to provide a spray dryer system as characterized above in which the drying gas filter system includes means for automatically and more effectively removing the buildup of particulate matter on the filters.

Still a further object is to provide such an electrostatic spray dryer system that is relatively simple in construction and lends itself to economical manufacture.

Another object is to provide a spray dryer system that protects the finished product from damage.

Other objects and advantages of the invention will become apparent upon reading the following detailed description and upon reference to the drawings.

BRIEF DESCRIPTION OF THE DRAWINGS

FIG. 1 is a side elevational view of the powder processing tower of the illustrated spray dryer system;

FIG. 2 is a vertical section of the powder processing tower shown in FIG. 1;

FIG. 3 is an exploded perspective of the illustrated powder processing tower;

FIG. 3A is a plan view of an unassembled flexible non-permeable liner usable with the illustrated powder processing tower;

FIG. 3B is a plan view of an alternative embodiment of a liner similar to that shown in FIG. A1 but made of a permeable filter material;

FIG. 3C is a plan view of another alternative embodiment of liner, in this case made in part of a non-permeable material and in part of a permeable filter material, usable with the illustrated powder processing tower;

FIG. 3D is a plan view of another alternative embodiment of liner, in this case made of a non-permeable non-conductive rigid material, usable with the illustrated powder processing tower;

FIG. 4 is an enlarged top view of the top cap or lid of the illustrated powder processing tower with an electrostatic spray nozzle centrally supported therein;

FIG. 5 is a side view of the top cap and spray nozzle assembly shown in FIG. 4;

FIG. 6 is an enlarged vertical section of the illustrated electrostatic spray nozzle assembly;

FIG. 7 is an enlarged fragmentary section of the nozzle supporting head of the illustrated electrostatic spray nozzle assembly;

FIG. 8 is an enlarged fragmentary section of the discharge end of the illustrated electrostatic spray nozzle assembly;

FIG. 8A is a fragmentary section, similar to FIG. 8, showing the spray nozzle assembly with the discharge spray tip altered for facilitating spraying of more viscous liquids;

FIG. 9 is a transverse section of the illustrated electrostatic spray nozzle assembly taken in the line of 9-9 in FIG. 8;

FIG. 10 is an enlarged fragmentary section of the powder collection cone and filter element housing of the illustrated powder processing tower;

FIG. 10A is an exploded perspective of the powder collection cone and filter element housing shown in FIG. 10;

FIG. 11 is a side elevational view, in partial section, of an alternative embodiment of filter element housing for use with the illustrated powder processing tower;

FIG. 11A is an enlarged fragmentary section of one of the filters of the filter housing shown in FIG. 11, showing a reverse gas pulse filter cleaning device thereof in an inoperative state;

FIG. 11B is an enlarged fragmentary section, similar to FIG. 11A, showing the reverse gas pulse air filter cleaning device in an operating condition;

FIG. 12 is a side elevational view of an alternative embodiment of a filter element housing and powder collection chamber;

FIG. 12A is a top plan view of the filter element housing and powder collection chamber shown in FIG. 12;

FIG. 12B is an enlarged partial broken away view of the filter element housing and powder collection chamber shown in FIG. 12;

FIG. 12C is an exploded perspective of the filter element housing and an associated upstream air direction plenum shown in FIG. 12;

FIG. 13 is a fragmentary section showing the fastening arrangement for securing the top cover to the drying chamber with an associated upper liner standoff ring assembly;

FIG. 13A is a fragmentary section, similar to FIG. 12, but showing the fastening arrangement for securing the drying chamber to the powder collection cone with an associated bottom liner standoff ring assembly;

FIG. 14 is an enlarged fragmentary view of one of the illustrated fasteners;

FIG. 15 is a schematic of the illustrated spray dryer system;

FIG. 15A is a schematic of an alternative embodiment of a spray dryer operable for spray chilling of melted flow streams into solidified particles;

FIG. 16 is a fragmentary section showing the fluid supply pump and its associated drive motor for the illustrated spray drying system;

FIG. 16A is a vertical section of the illustrated fluid supply pump supported within an outer non-conductive housing;

FIG. 17 is an enlarged top view of the illustrated insulting liner and its standoff ring support assembly;

FIG. 18 is an enlarged top view, similar to FIG. 17, but showing a standoff ring assembly supporting a smaller diameter insulating liner;

FIG. 25 is a chart showing alternative configurations for the illustrative powder drying system;

FIG. 36 is a side elevation view of a further alternative embodiment of a spray drying system.

FIG. 37 is top perspective view of an alternative embodiment of a powder collection vessel that can be used with the spray dryer of FIG. 36.

FIG. 38 is a side elevation view of the powder collection vessel of FIG. 37.

FIG. 39 is a side sectional view of the powder collection vessel of FIG. 37.

Figure 1:
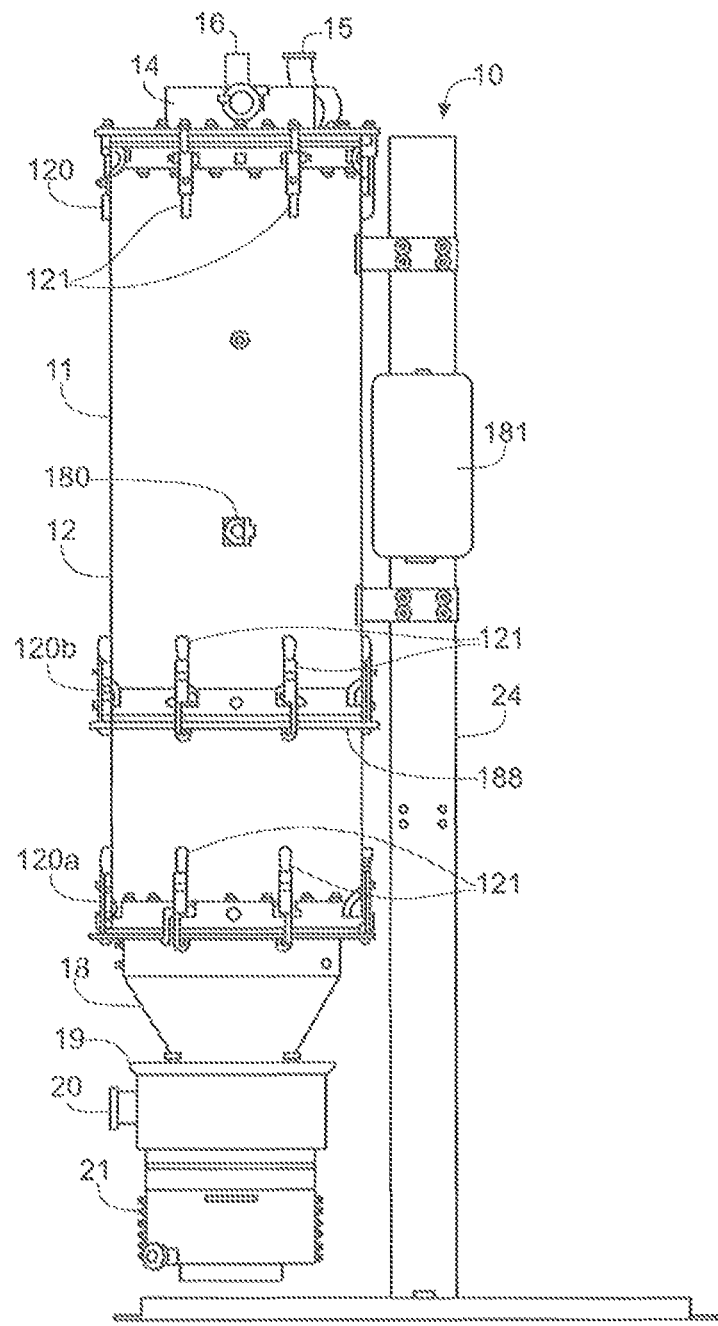

FIG. 40 enlarged view of a portion of the drying chamber of the spray dryer system of FIG. 37 showing a scraper arrangement.

FIG. 41 is a schematic side sectional view of the scraper arrangement of FIG. 40.

FIG. 42 is a side elevation view of a filter housing that can be used on the drying gas inlet or outlet lines of the spray drying system of FIG. 36.

FIG. 43 is a side sectional view of the filter housing of FIG. 42.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Referring now more particularly to the drawings, there is shown an illustrative spray drying system 10 in accordance with the invention which includes a processing tower 11 comprising a drying chamber 12 in the form of an upstanding cylindrical structure, a top closure arrangement in the form of a cover or lid 14 for the drying chamber 12 having a heating air inlet 15 and a liquid spray nozzle assembly 16, and a bottom closure arrangement in the form of a powder collection cone 18 supported at the bottom of the drying chamber 12, a filter element housing 19 through which the powder collection cone 18 extends having a heating air exhaust outlet 20, and a bottom powder collection chamber 21. The drying chamber 12, collection cone 18, filter element housing 19, and powder collection chamber 21 all preferably are made of stainless steel. The top cover 14 preferably is made of plastic or other nonconductive material and in this case centrally supports the spray nozzle assembly 16. The illustrated heating air inlet 15 is oriented for directing heated air into the drying chamber 12 in a tangential swirling direction. A frame 24 supports the processing tower 11 in upright condition.

Pursuant to an important aspect of this embodiment, the spray nozzle assembly 16, as best depicted in FIGS. 6-9, is a pressurized air assisted electrostatic spray nozzle assembly for directing a spray of electrostatically charged particles into the dryer chamber 12 for quick and efficient drying of liquid slurries into desired powder form. The illustrated spray nozzle assembly 16, which may be of a type disclosed in the International application PCT/US2014/056728, includes a nozzle supporting head 31, an elongated nozzle barrel or body 32 extending downstream from the head 31, and a discharge spray tip assembly 34 at a downstream end of the elongated nozzle body 32. The head 31 in this case is made of plastic or other non conductive material and formed with a radial liquid inlet passage 36 that receives and communicates with a liquid inlet fitting 38 for coupling to a supply line 131 that communicates with a liquid supply. It will be understood that the supply liquid may be any of a variety of slurries or like liquids that can be dried into powder form, including liquid slurries having a solvent, such as water, a desired ingredient, such as a flavoring, food, a pharmaceutical, or the like, and a carrier such that upon drying into powder form the desired ingredient is encapsulated within the carrier as known in the art. Other forms of slurries may also be used including liquids that do not include a carrier or require encapsulation of the dried products.

The nozzle supporting head 31 in this case further is formed with a radial pressurized air atomizing inlet passage 39 downstream of said liquid inlet passage 36 that receives and communicates with an air inlet fitting 40 coupled to a suitable pressurized gas supply. The head 31 also has a radial passage 41 upstream of the liquid inlet passage 36 that receives a fitting 42 for securing a high voltage cable 44 connected to a high voltage source and having an end 44a extending into the passage 41 in abutting electrically contacting relation to an electrode 48 axially supported within the head 31 and extending downstream of the liquid inlet passage 36.

For enabling liquid passage through the head 31, the electrode 48 is formed with an internal axial passage 49 communicating with the liquid inlet passage 36 and extending downstream though the electrode 48. The electrode 48 is formed with a plurality of radial passages 50 communicating between the liquid inlet passage 36 and the internal axial passage 49. The illustrated electrode 48 has a downstream outwardly extending radial hub 51 fit within a counter bore of the head 31 with a sealing o-ring 52 interposed there between.

The elongated body 32 is in the form of an outer cylindrical body member 55 made of plastic or other suitable nonconductive material, having an upstream end 55a threadably engaged within a threaded bore of the head 31 with a sealing o-ring 56 interposed between the cylindrical body member 55 and the head 31. A liquid feed tube 58, made of stainless steel or other electrically conductive metal, extends axially through the outer cylindrical body member 55 for defining a liquid flow passage 59 for communicating liquid between the axial electrode liquid passage 49 and the discharge spray tip assembly 34 and for defining an annular atomizing air passage 60 between the liquid feed tube 58 and the outer cylindrical body member 55. An upstream end of the liquid feed tube 58 which protrudes above the threaded inlet end 55a of the outer cylindrical nozzle body 55 fits within a downwardly opening cylindrical bore 65 in the electrode hub 51 in electrical conducting relation. With the electrode 48 charged by the high voltage cable 44, it will be seen that liquid feed to the inlet passage 36 will be electrically charged during its travel through the electrode passage 49 and liquid feed tube 58 along the entire length of the elongated nozzle body 32. Pressurized gas in this case communicates through the radial air inlet passage 39 about the upstream end of the liquid feed tube 58 and then into the annular air passage 60 between the liquid feed tube 58 and the outer cylindrical body member 55.

The liquid feed tube 58 is disposed in electrical contacting relation with the electrode 48 for efficiently electrically charging liquid throughout its passage from the head 31 and through elongated nozzle body member 32 to the discharge spray tip assembly 34. To that end, the discharge spray tip assembly 34 includes a spray tip 70 having an upstream cylindrical section 71 in surrounding relation to a downstream end of the liquid feed tube 58 with a sealing o-ring 72 interposed therebetween. The spray tip 70 includes an inwardly tapered or conical intermediate section 74 and a downstream cylindrical nose section 76 that defines a cylindrical flow passage 75 and a liquid discharge orifice 78 of the spray tip 70. The spray tip 70 in this case has a segmented radial retention flange 78 extending outwardly of the upstream cylindrical section 71 which defines a plurality of air passages 77, as will become apparent.

For channeling liquid from feed tube 58 into and though the spray tip 70 while continuing to electrostatically charge the liquid as it is directed through the spray tip 70, an electrically conductive pin unit 80 is supported within the spray tip 70 in abutting electrically conductive relation to the downstream end of the feed tube 58. The pin unit 80 in this case comprises an upstream cylindrical hub section 81 formed with a downstream conical wall section 82 supported within the intermediate conical section 74 of the spray tip 70. The cylindrical hub section 81 is formed with a plurality of circumferentially spaced radial liquid flow passageways 83 (FIG. 8) communicating between the liquid feed tube 58 and the cylindrical spray tip passage section 75. It will be seen that the electrically conductive pin unit 80, when seated within the spray tip 70, physically supports in abutting relation the downstream end of the liquid feed tube 58.

For concentrating the electrical charge on liquid discharging from the spray tip, the pin unit 80 has a downwardly extending central electrode pin 84 supported in concentric relation to the spray tip passage 75 such that the liquid discharge orifice 78 is annularly disposed about the electrode pin 84. The electrode pin 84 has a gradually tapered pointed end which extends a distance, such as between about ¼ and ½ inch, beyond the annular spray tip discharge orifice 78. The increased contact of the liquid about the protruding electrode pin 84 as it exits the spray tip 70 further enhances concentration of the charge on the discharging liquid for enhanced liquid particle breakdown and distribution.

Figure 8:
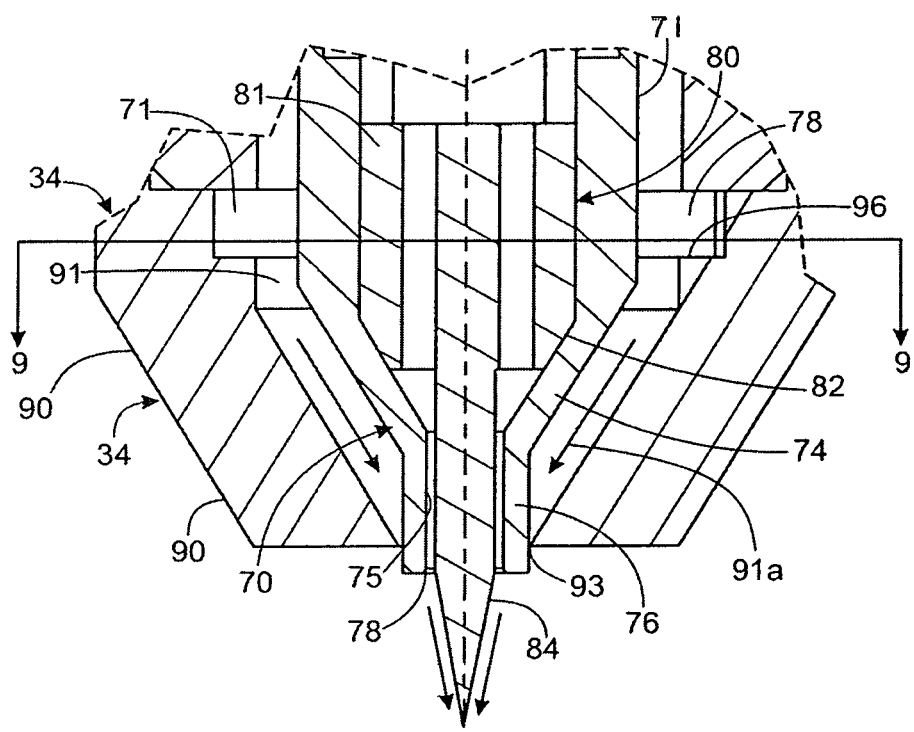
Figure 8A:
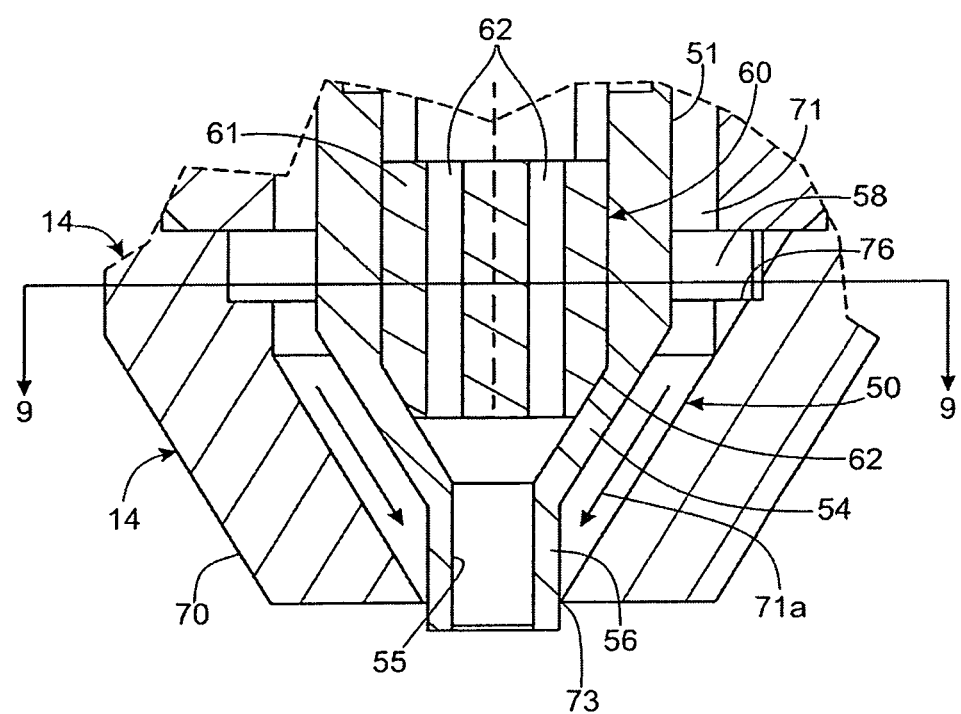
Figure 9:
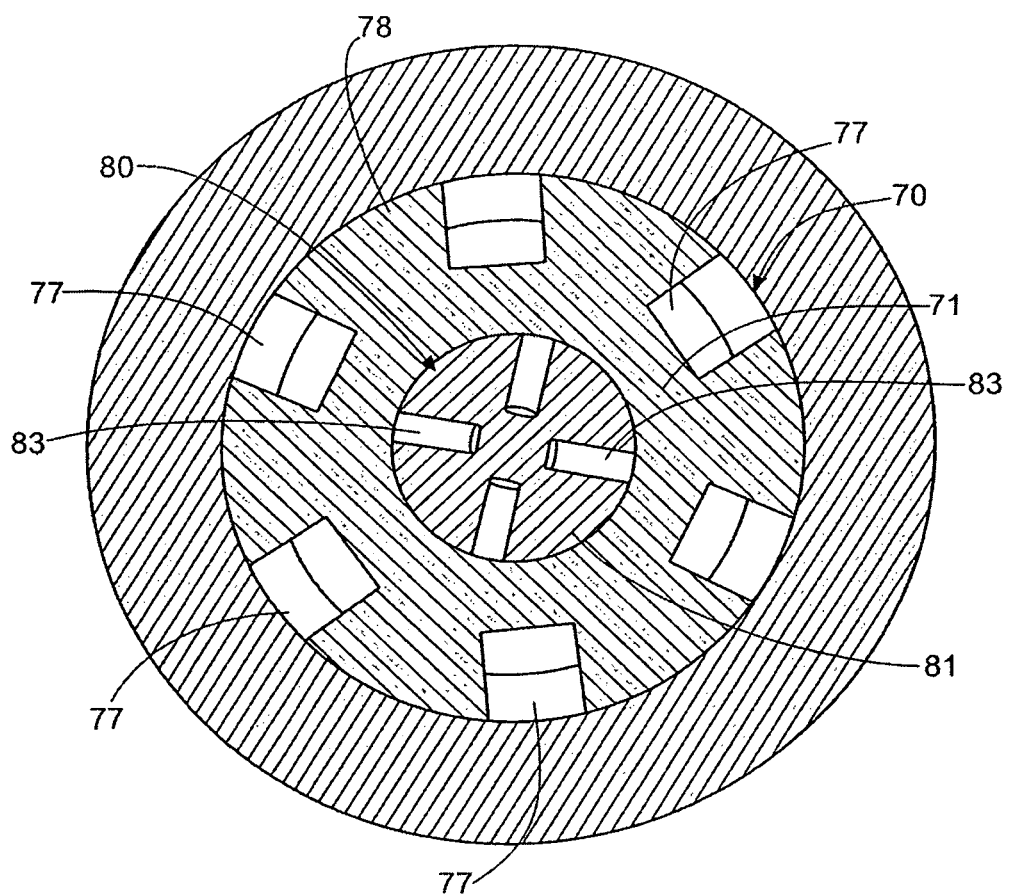
Figure 10:
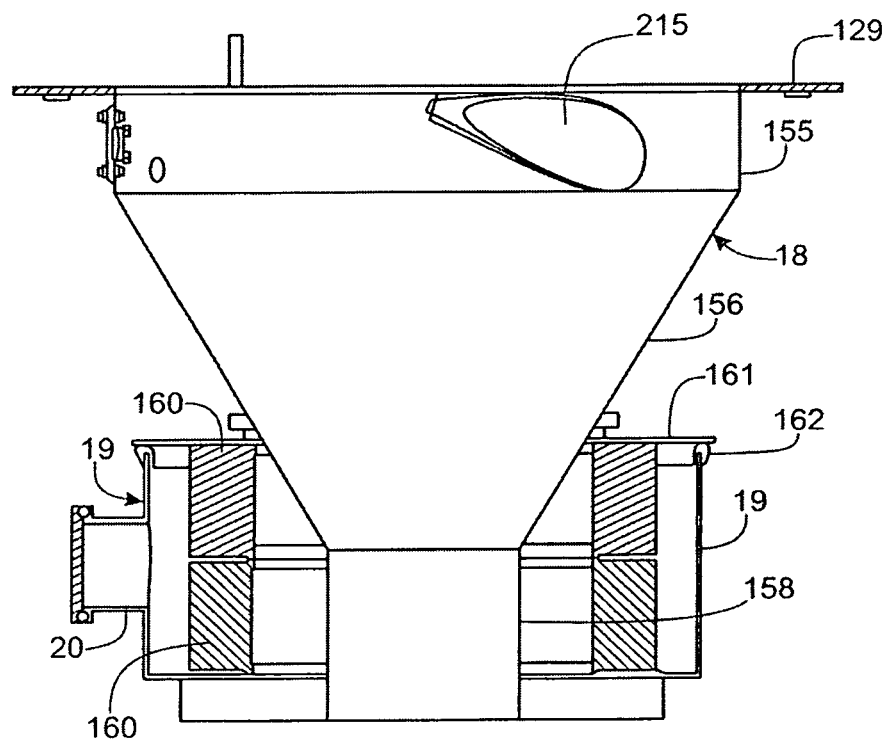
Figure 10A:
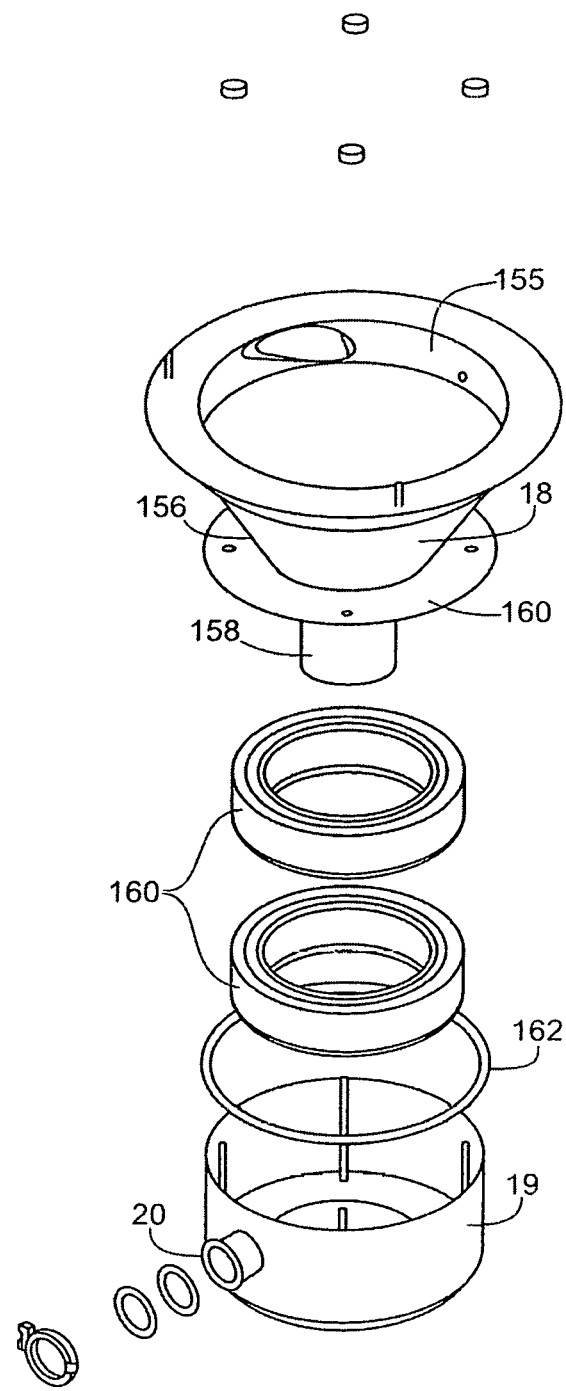
Figure 11:
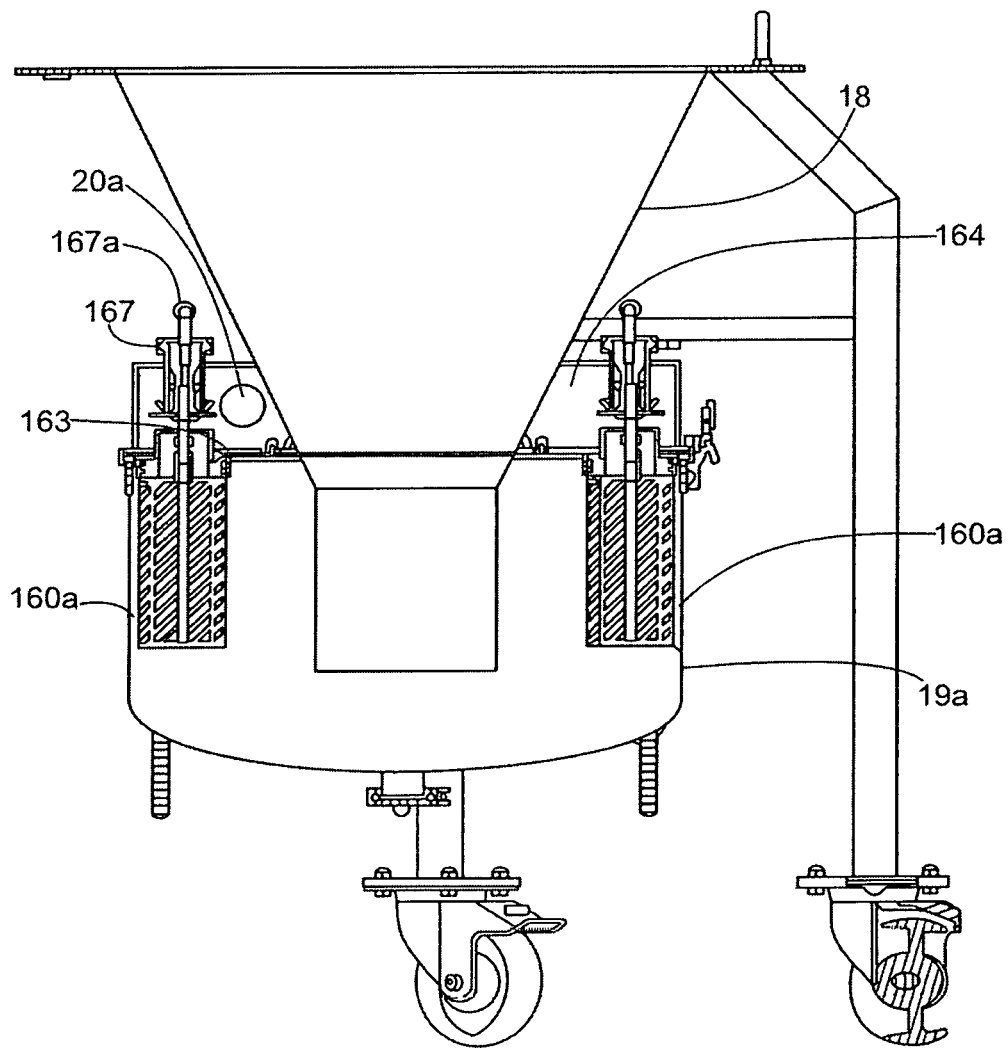
Figure 11A:
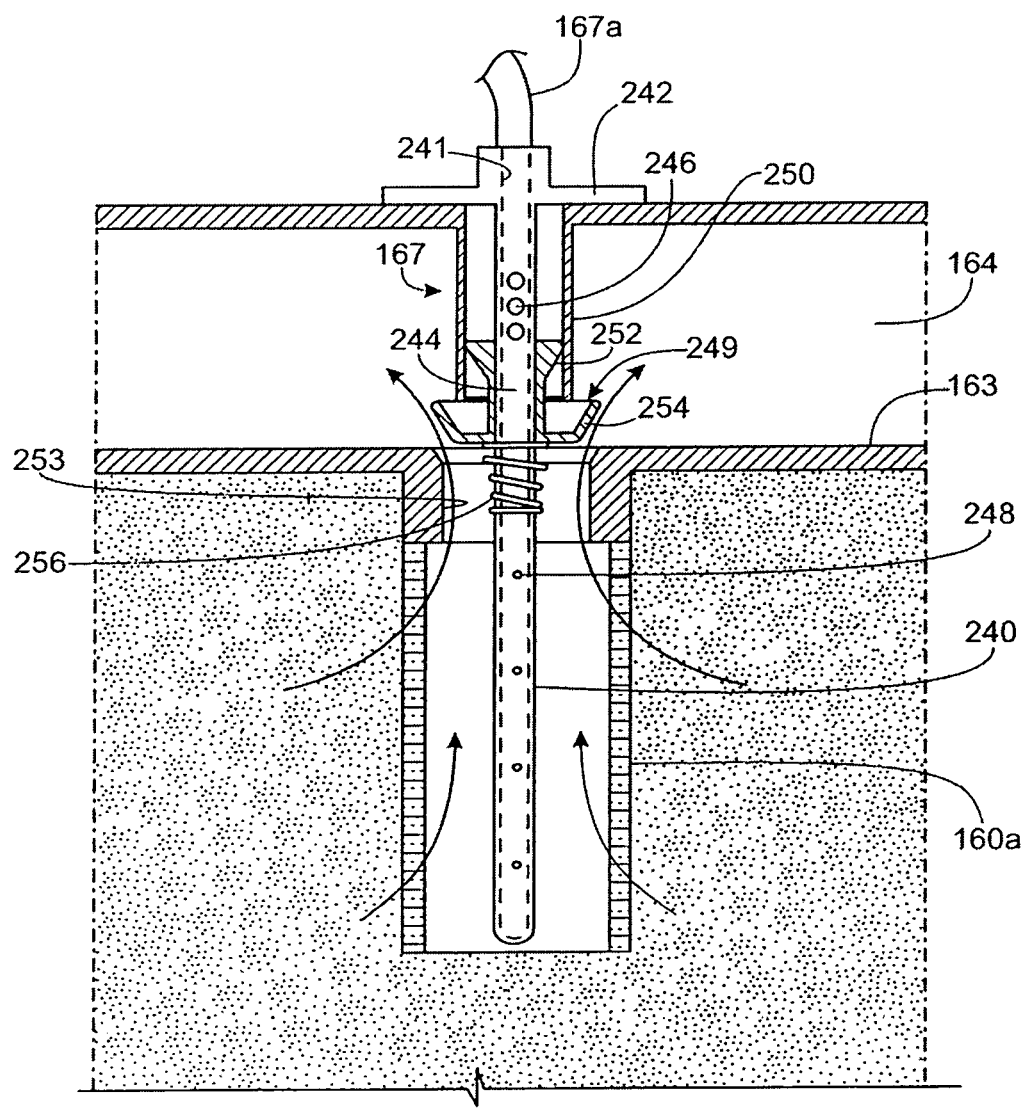
Figure 11B:
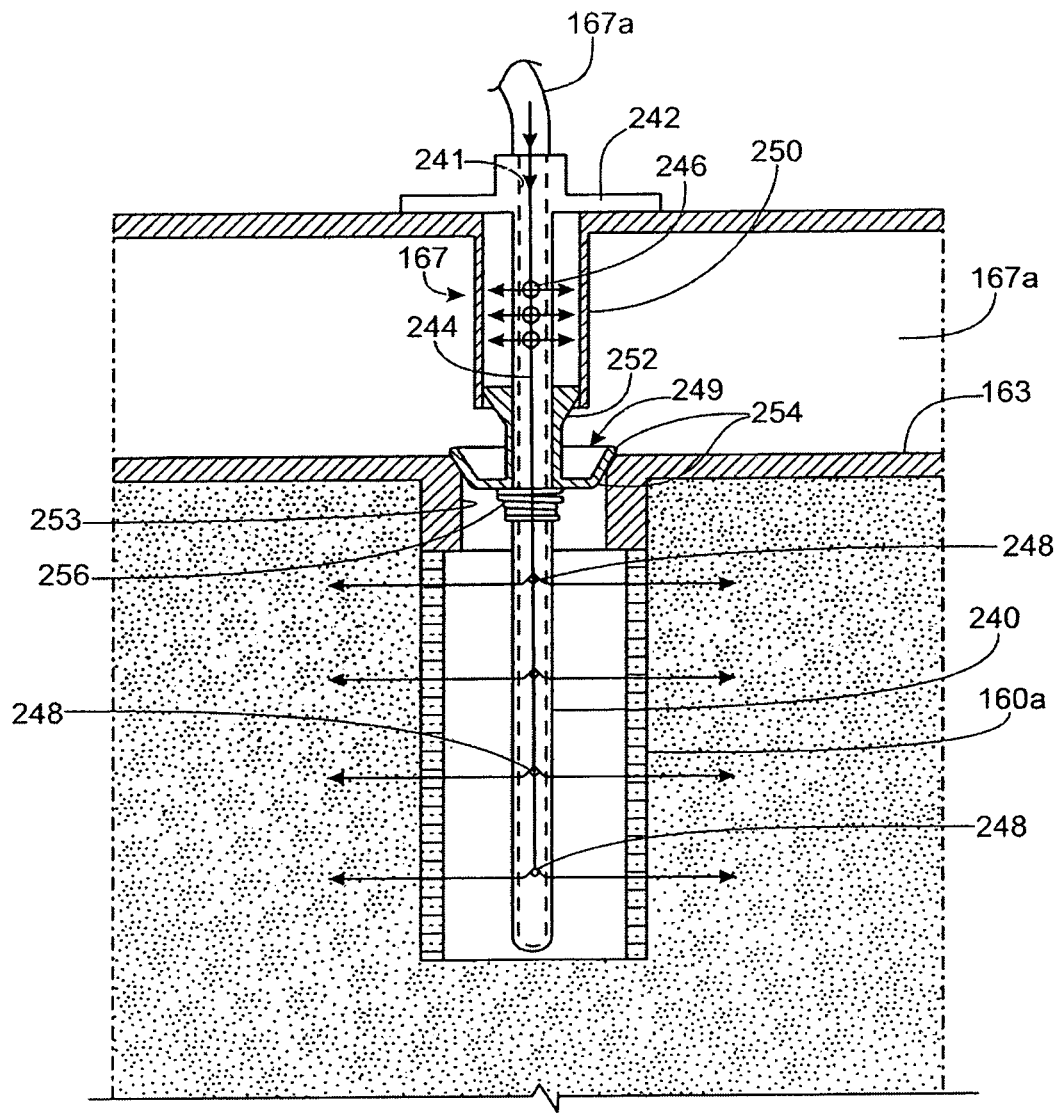

Alternatively, as depicted in FIG. 8A, when spraying more viscous liquids, the discharge spray tip assembly 34 may have a hub section 81, similar to that described above, but without the downwardly extending central electrode pin 84. This arrangement provides freer passage of the more viscous liquid through the spray tip, while the electrostatic charge to discharging liquid still enhances liquid breakdown for more efficient drying of such viscous liquids.

The discharge spray tip assembly 34 further includes an air or gas cap 90 disposed about the spray tip 70 which defines an annular atomizing air passage 91 about the spray tip 70 and which retains the spray tip 70, pin unit 80, and liquid feed tube 58 in assembled conductive relation to each other. The air cap 90 in this instance defines a conical pressurized air flow passage section 91a about the downstream end of the spray tip 70 which communicates via the circumferentially spaced air passages 77 in the spray tip retention flange 78 with the annular air passage 60 between the liquid feed tube 58 and the outer cylindrical body member 55 for directing a pressurized air or gas discharge stream through an annular discharge orifice 93 about the spray tip nose 76 and liquid discharging from the spray tip liquid discharge orifice 78. For retaining the internal components of the spray nozzle in assembled relation, the air cap 90 has an upstream cylindrical end 95 in threaded engagement about a downstream outer threaded end of the outer cylindrical member 55. The air cap 90 has a counter bore 96 which receives and supports the segmented radial flange 78 of the spray tip 70 for supporting the spray tip 70, and hence, the pin unit 80 and liquid feed tube 58 in electrical conducting relation with the upstream electrode 48.

The spray nozzle assembly 16 is operable for discharging a spray of electrostatically charged liquid particles into the drying chamber 12. In practice, it has been found that the illustrated electrostatic spray nozzle assembly 16 may be operated to produce extremely fine liquid particle droplets, such as on the order of 70 micron in diameter. As will become apparent, due to the breakdown and repelling nature of such fine liquid spray particles and heated drying gas introduced into the drying chamber, both from the heating air inlet 15 and the air assisted spray nozzle assembly 16, the liquid particles are susceptible to quick and efficient drying into fine particle form. It will be understood that while the illustrated electrostatic spray nozzle assembly 16 has been found to have particular utility in connection with the subject invention, other electrostatic spray nozzles and systems could be used, including electrostatic hydraulic rotary spray nozzles and high volume low pressure electrostatic spray nozzles of known types.

Pursuant to a further important feature of the present embodiment, the drying chamber 12 has an internal non-metallic insulating liner 100 disposed in concentric spaced relation to the inside wall surface 12*a* of the drying chamber 12 into which electrostatically charged liquid spray particles from the spray nozzle assembly 16 are discharged. As depicted in FIG. 2, the liner has a diameter d less than the internal diameter d1 of the drying chamber 12 so as to provide an insulating air spacing 101, preferably at least about 2 inches (about 5 cm), with the outer wall surface 12*a* of the drying chamber 12, but other dimensions may be used. In this embodiment, the liner 100 is non-structural preferably being made of a non-permeable flexible plastic material 100*a* (FIGS. 3 and 3A). Alternatively, as will become apparent, it may be made of a rigid non-permeable non-conductive material 100*c* (FIG. 3D), a permeable filter material 100*b* (FIG. 3B), or in part a non-permeable material 100*a* and in part a permeable filter material 100*b* (FIG. 3C).

According to another aspect of the present embodiment, the processing tower 11 has a quick disconnect assembled construction that facilitates assembly and the mounting of the annular liner 100 in electrically insulated relation to the outer wall of the drying chamber 12. To this end, the annular insulating liner 100 is supported at opposite ends by respective upper and lower standoff ring assemblies 104 (FIGS. 1, 3, 13, 13A, 14 and 17). Each ring assembly 104 in this case includes an inner cylindrical standoff ring 105 to which an end of the liner 100 is attached and a plurality of circumferentially spaced non-conductive, polypropylene or other plastic, standoff studs 106 fixed in outwardly extended radial relation to the standoff ring 105. In the illustrated embodiment, the upper end of the liner 100 is folded over the top of the standoff ring 105 of the upper ring assembly 104 and affixed thereto by an annular U configured rubber gasket 108 positioned over the folded end of the liner 100 and the standoff ring 105 (FIG. 13). The lower end of the liner 100 is similarly trained about the bottom of the standoff ring 105 of the lower ring assembly 104 and secured thereto by a similar rubber gasket 108 (FIG. 13). Similar rubber gaskets 108 also are supported on the opposite inner ends of the cylindrical standoff rings 105 of the ring assemblies 104 for protecting the liner 100 from damage by exposed edges of the standoff rings 105.

For securing each standoff ring assembly 104 within the drying chamber 12, a respective mounting ring 110 is affixed, such as by welding, to an outer side of the drying chamber 12. Stainless steel mounting screws 111 extend through aligned apertures in the mounting ring 110 and outer wall of the drying chamber 12 for threadably engaging the insulating standoff studs 106. A rubber o-ring 112 in this instance is provided about the end of each standoff stud 106 for sealing the inside wall of the drying chamber 12, and a neoprene bonded sealing washer 114 is disposed about the head of each retaining screw 111.

For securing the drying chamber top cover 14 in place on the drying chamber 12 in sealed relation to the upper standoff ring assembly 104, an annular array 120 (FIGS. 1 and 2) spaced releasable latch assemblies 121 are secured to the mounting ring 110 (FIGS. 13-14) at circumferentially spaced locations intermediate the standoff studs 106. The latch assemblies 121 may be of a known type having an upwardly extending draw hook 122 positionable over a top marginal edge of the cover 14 and drawn down into a locked position as an incident to downward pivotal movement of a latch arm 124 into a latching position for retaining the top cover 14 against the U-shaped gasket 108 about the upper edge of the standoff ring 105 and a similar large diameter annular U shaped gasket 126 about an upper edge of the cylindrical drying chamber 12. The latch assemblies 121 may be easily unlatched by reverse pivotal movement of the latch hooks 124 to move the draw hooks 122 upwardly and outwardly for permitting removal of the top cover 14 when necessary. A similar annular array 120*a* of latch assemblies 121 is provided about a mounting ring 110 adjacent the bottom of the drying chamber 12, in this case having draw hooks 124 positioned downwardly into overlying relation with an outwardly extending flange 129 of the collection cone 18 for retaining the flange 129 of the collection cone 18 in sealed relation with rubber gaskets 108, 126 about the bottom edge of the standoff ring 105 and the bottom cylindrical edge of the drying chamber 12 (FIG. 13A). It will be understood that for particular applications the liner 100, o-rings and other sealing gaskets 108,126 may or may not be made of FDA compliant materials.

During operation of the electrostatic spray nozzle assembly 16, liquid supplied to the electrostatic spray nozzle assembly 16 from a liquid supply, which in this case is a liquid holding tank 130 as depicted in FIG. 15, is directed by the electrostatic spray nozzle assembly 16 into an effective drying zone 127 defined by the annular liner 100. Liquid is supplied from the liquid supply holding tank 130 through a liquid supply or delivery line 131 connected to the liquid inlet fitting 38 of the spray nozzle assembly 16 via a pump 132, which preferably is a peristaltic dosing pump having a liquid directing roller system operable in a conventional manner. The peristaltic dosing pump 132 in this case, as depicted in FIG. 16A, comprises three plastic electrically isolated pump rollers 33 within a plastic pump housing 37. The liquid supply or delivery line 131 in this case is an electrically shielded tubing, and the stainless steel drying chamber 12 preferably is grounded by an approved grounding line through the support frame 24 to which it is secured with metal to metal contact.

An electronic controller 133 is operably connected to the various actuators and electric or electronic devices of the electrostatic spray dryer system such as an electric motor 134, the pump 132, the liquid spray nozzle assembly 16, a high voltage generator providing electrical voltage to the high voltage cable 44, and others, and operates to control their operation. While a single controller is shown, it should be appreciated that a distributed controller arrangement including more than one controller can be used. As shown, the controller 133 is capable of operating in response to a program such as a programmable logic controller. The various operable connections between the controller 133 and the various other components of the system are omitted from FIG. 15 for clarity.

Pursuant to a further aspect of the present embodiment, the pump 132 is operated by the electric motor 134 (FIG. 16) disposed in electrically isolated relation to the pump 132 and the liquid supply line 131 coupling the pump 132 to the spray nozzle assembly 16 for preventing an electrical charge to the motor 134 from liquid electrostatically charged by the spray nozzle assembly 16. To that end, the drive motor 134 has an output shaft 135 coupled to a pump head drive shaft 136 by a non-electrically conductive drive segment 138, such as made of a rigid nylon, which isolates the pump 132 from the electric drive motor 134. The nonconductive drive segment 138 in the illustrated embodiment has a diameter of about 1.5 inches (about 3.8 cm) and an axial length of about 5 inches (about 12.7 cm). The electric motor drive shaft 135 in this case carriers an attachment plate 139 which is fixed to the nonconductive drive segment 138 by screws 141. The pump head drive shaft 136 similarly carries an attachment plate 140 affixed by screws 141 to the opposite end of the nonconductive drive segment 138.

An electrostatic voltage generator 222 is electrically connected to the nozzle assembly 16 via an electrical line 224 for providing a voltage that electrostatically charges the sprayed liquid droplets. In the illustrated embodiment, the electrical line 224 includes a variable resistor element 226, which is optional and which can be manually or automatically adjusted to control the voltage and current provided to the spray nozzle assembly 16. An optional grounding wire 228 is also electrically connected between the liquid supply line 131 and a ground 232. The grounding wire 228 includes a variable resistor 230 that can be manually or automatically adjusted to control a voltage that is present in the fluid. In the illustrated embodiment, the grounding wire is placed before the pump 132 to control the electrical charge state of the fluid provided to the system. The system may further include sensors communicating the charged state of the fluid to the controller 133 such that the system may automatically monitor and selectively control the charge state of the liquid by controlling the resistance of the variable grounding resistor 230 to bleed charge off from the liquid line in the system.

The drive motor 134, which also is appropriately grounded, in this instance is supported within a nonconductive plastic motor mounting housing 144. The illustrated liquid holding tank 130 is supported on a liquid scale 145 for enabling monitoring the amount of liquid in the tank 130, and an electrical isolation barrier 146 is provided between the underside of the liquid holding tank 130 and the scale 145. It will be understood that in lieu of the peristaltic pump 132, plastic pressure pots and other types of pumps and liquid delivery systems could be used that can be electrically insulated from their electrical operating system.

Figure 15:
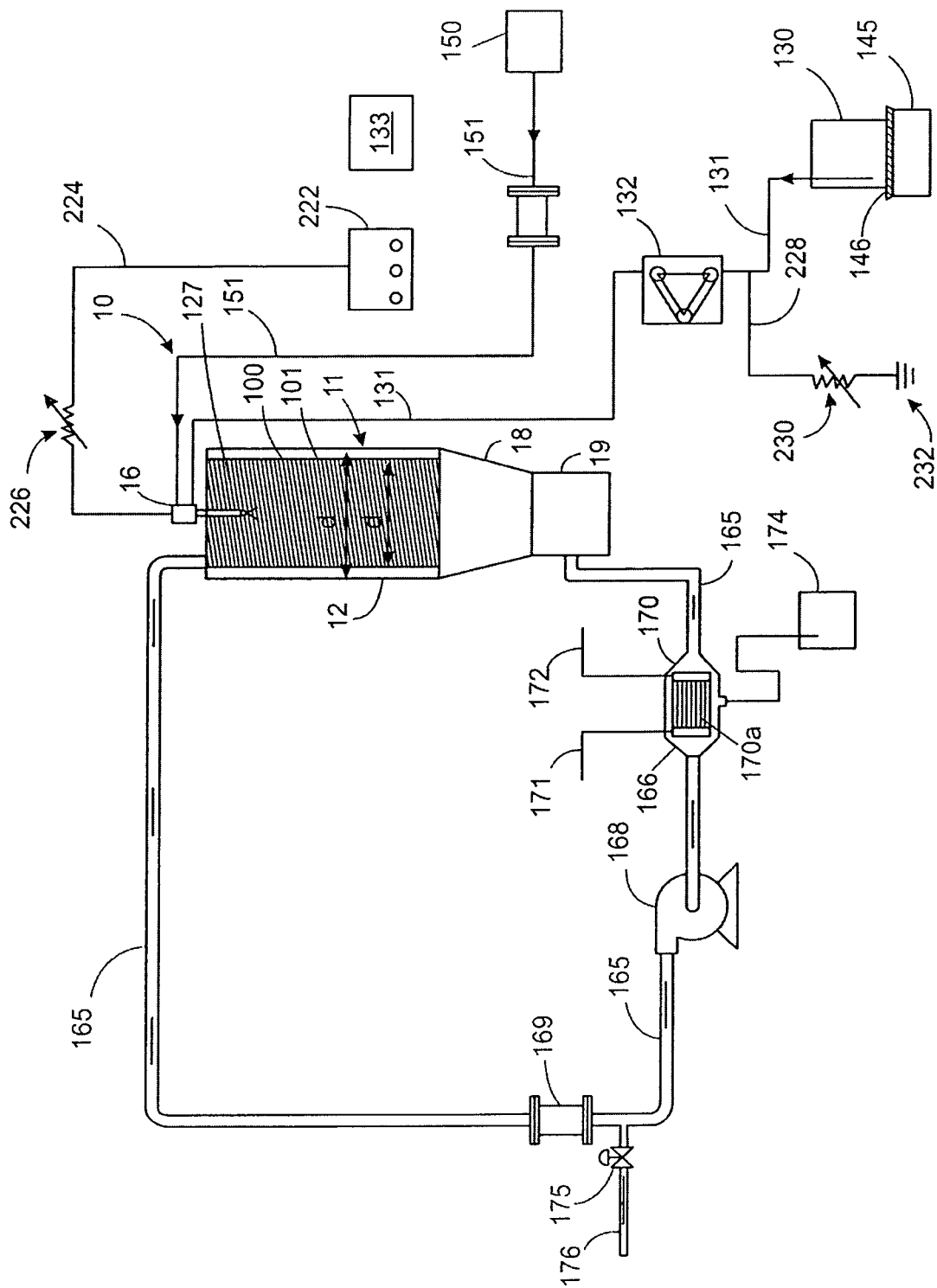

Pressurized gas directed to the atomizing air inlet fitting 18 of the spray nozzle assembly 16 in this case originates from a bulk nitrogen supply 150 which communicates with the atomizing air inlet fitting 18 of the spray nozzle assembly 16 via a gas supply line 151 (FIG. 15). A gas heater 152 is provided in the supply line 151 for enabling dry inert nitrogen gas to be supplied to the spray nozzle assembly 16 at a controlled temperature and pressure. It will be understood that while nitrogen is described as the atomizing gas in connection with the present embodiment, other inert gases could be used, or other gasses with air could be used so long as the oxygen level within the drying chamber is maintained below a level that would create a combustive atmosphere with the dry powder particles within the drying chamber that is ignitable from a spark or other electrical malfunction of the electrostatic spray nozzle assembly or other electronically controlled elements of the drying system.

Pursuant to a further important aspect of the present embodiment, heated nitrogen atomizing gas supplied to the spray nozzle assembly 16 and directed into the drying chamber 12 as an incident to atomization of liquid being sprayed into the drying chamber 12 is continuously recirculated through the drying chamber 12 as the drying medium. As will be understood with further reference to FIG. 15, drying gas introduced into the drying chamber 12 both from the drying gas inlet 15 and the spray nozzle assembly 16 will circulate the length of the drying chamber 12 efficiently drying the electrostatically charged liquid particles sprayed into the drying chamber 12 into powder form. The dried powder will migrate through the powder collection cone 18 into the powder collection chamber 21, where it can be removed by appropriate means, either manually or by other automated means.

The illustrated powder collection cone 18, as best depicted in FIGS. 10 and 10A, has an upper cylindrical section 155, an inwardly tapered conical intermediate section 156, and a lower cylindrical powder delivery section 158 that extends centrally through the filter element housing 19 for channeling dried powder into the powder collection chamber 21. The filter element housing 19 in this case has a pair of vertically stacked annular HEPA filters 160 mounted in surrounding outwardly spaced relation to the lower sections of the powder collection cone 18. The illustrated powder collection cone 18 has an outwardly extending radial flange 161 intermediate its ends positioned over the upper filter 160 in the filter element housing 19 with an annular seal 162 interposed between the radial flange 161 and the filter element housing 19. While the bulk of the dried powder will fall downwardly through the collection cone 18 into the powder collection chamber 19, only the finest particles will remain entrained in the drying gas as it migrates upwardly around the bottom sections of the powder collection cone 18 and then outwardly through the HEPA filters 160 which restrain and filter out the fine powder, prior to exiting through the exhaust gas outlet 20 of the filter housing 19.

Alternatively, as depicted in FIGS. 11, 11A and 11B, a filter element housing 19*a* may be used that comprises a plurality of circumferentially spaced cylindrical filters 160*a* that are mounted in depending vertical relation from an intermediate transverse support panel 163 of a housing 19*a*. Gas latent with powder particles directed from the collection cone 18 into a lower collection chamber flows transversely through the filters 160*a* into a common exhaust plenum 164 within the filter element housing 19*a* above the transverse support panel 163 for communication through an outlet port 20*a* with the particles being restricted from the air flow by the filters 160*a*. For periodically cleaning the filters 160*a*, the filters 160*a* each have a respective reverse pulse air filter cleaning device 167 of a type disclosed in U.S. Pat. No. 8,876,928 assigned to the same applicant as the present application, the disclosure of which is incorporated herein by reference. Each of the reverse pulse air filter cleaning devices 167 has a respective gas supply line 167*a* for coupling to a pulsed air supply.

The illustrated the reverse pulse air filter cleaning devices 21, as depicted in FIGS. 11A and 11B, each includes a reverse pulse nozzle 240 having a gas inlet 241 in an upper wall of the exhaust plenum 164 fixed by an annular retainer 242 for connection to the compressed gas supply line 167*a* coupled to a pressurized gas source, such as nitrogen. The nozzle 240 has a cylindrical closed bottom construction which defines a hollow inner air passageway 244 extending from the inlet 241 through the exhaust plenum 164 and substantially the length of the filter 160*a*. The nozzle 240 is formed with a plurality of relatively large diameter discharge holes 246 in a section within the exhaust plenum 164 and a plurality of smaller sized air discharge holes 248 in the length of the nozzle 240 within the filter 160*a*.

For interrupting the flow of process gas from the filter element housing 19*a* to the exhaust plenum 164 during operation of the reverse pulse nozzle 240, an annular exhaust port cut off plunger 249 is disposed above the reverse pulse nozzle 160*a* for axial movement within the exhaust plenum 164 between exhaust port opening and closing positions. For controlling movement of the plunger 249, a bottom opening plunger cylinder 250 is mounted in sealed depending relation from the upper wall of the exhaust plenum 164. The illustrated plunger 249 includes an upper relatively small diameter annular sealing and guide flange 252 having an outer perimeter adapted for sliding sealing engagement with the interior of the cylinder 250 and a lower larger diameter valve head 254 disposed below the lower terminal end of the cylinder 250 for sealing engagement with an exhaust port 253 in the panel 163. The plunger 249 preferably is made of a resilient material, and the upper sealing and guide flange 252 and lower valve head 254 have downwardly tapered or cup shaped configurations.

Figure 3:
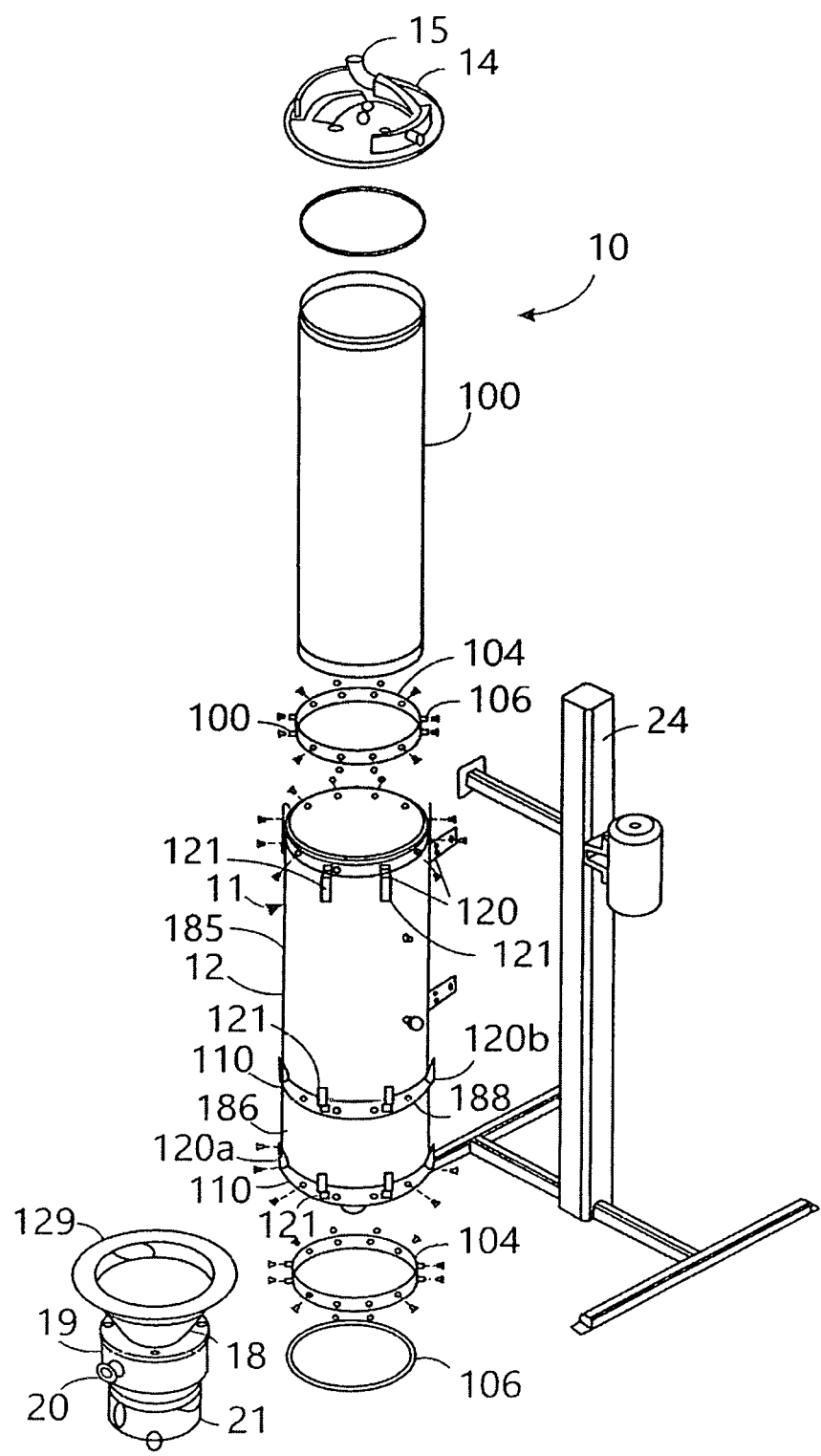
Figure 3A:
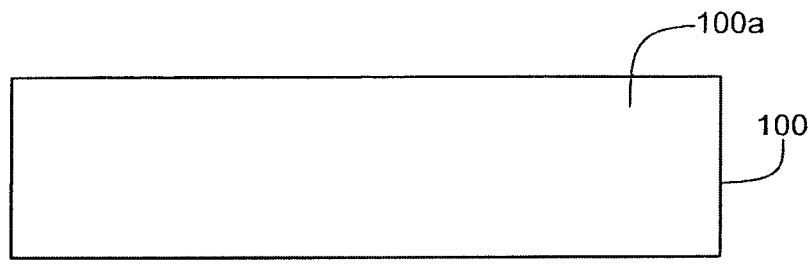
Figure 3B:
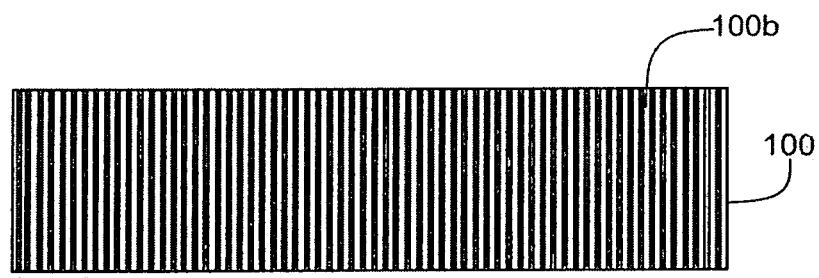

The plunger 249 is disposed for limited axial movement along the reverse pulse nozzle 240 and is biased to a normally open or retracted position, as shown in FIG. 3, by coil spring 256 fixed about the outer perimeter of the reverse pulse nozzle 240. With the valve plunger 249 biased to such position, process gas flows from the filter element housing 19*a* through the filter 160*a*, exhaust port 253 and into the exhaust plenum 164.

During a reverse pulse gas cleaning cycle, a pulse of compressed gas is directed through the reverse pulse nozzle 240 from the inlet line 167*a*. As the compressed gas travels through the nozzle 160*a*, it first is directed through the larger diameter or plunger actuation holes 246 into the plunger cylinder 250 above the plunger sealing and guide flange 252 and then though the smaller reverse pulse nozzle holes 248. Since the larger holes 249 provide the path of less resistance, gas first flows into the plunger cylinder 250 and as pressure in the plunger cylinder 250 increases, it forces the plunger 249 downwardly against the biasing force of the spring 256. Eventually, the pressure builds to a point where it overcomes the force of the spring 256 and forces the plunger 249 downwardly toward the exhaust port 253 temporarily sealing it off After the plunger 249 seals the exhaust port 253 the compressed gas in the outer plunger cylinder 250 can no longer displace the plunger 249 and gas pressure in the plunger cylinder 250 increases to a point that the compressed gas is then forced through the smaller nozzle holes 248 and against the filter 160*a* for dislodging build up particulate matter about its outside surface.

Following the reverse compressed air pulse and the dislodgement of the accumulated particulate on the filter 160*a*, pressure will dissipate within the plunger cylinder 250 to the extent that it will no longer counteract the spring 256. The plunger 249 then will move upwardly under the force of the spring 256 to its retracted or rest position, unsealing the exhaust port 253 for continued operation of the dryer.

Figure 12:
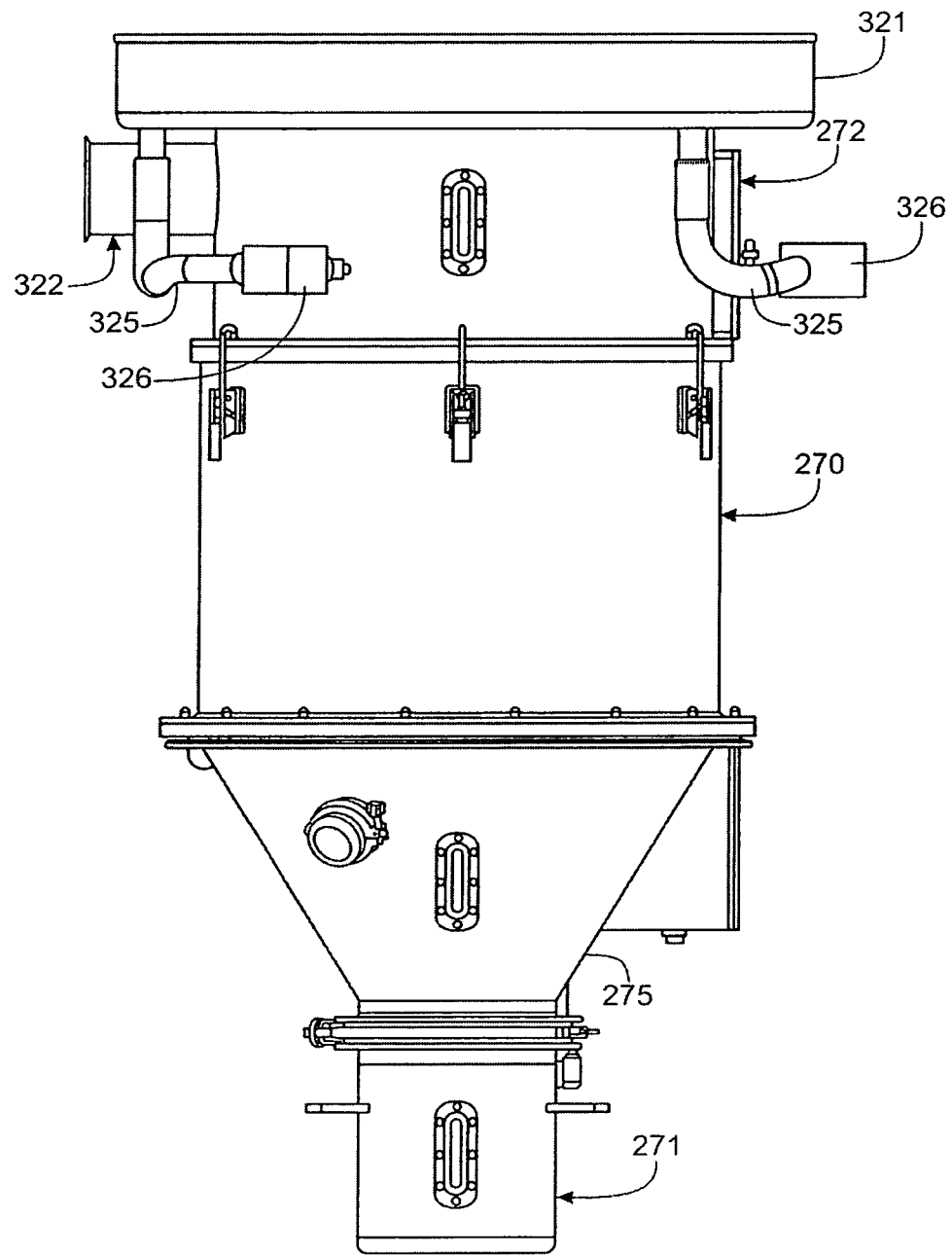
Figure 12A:
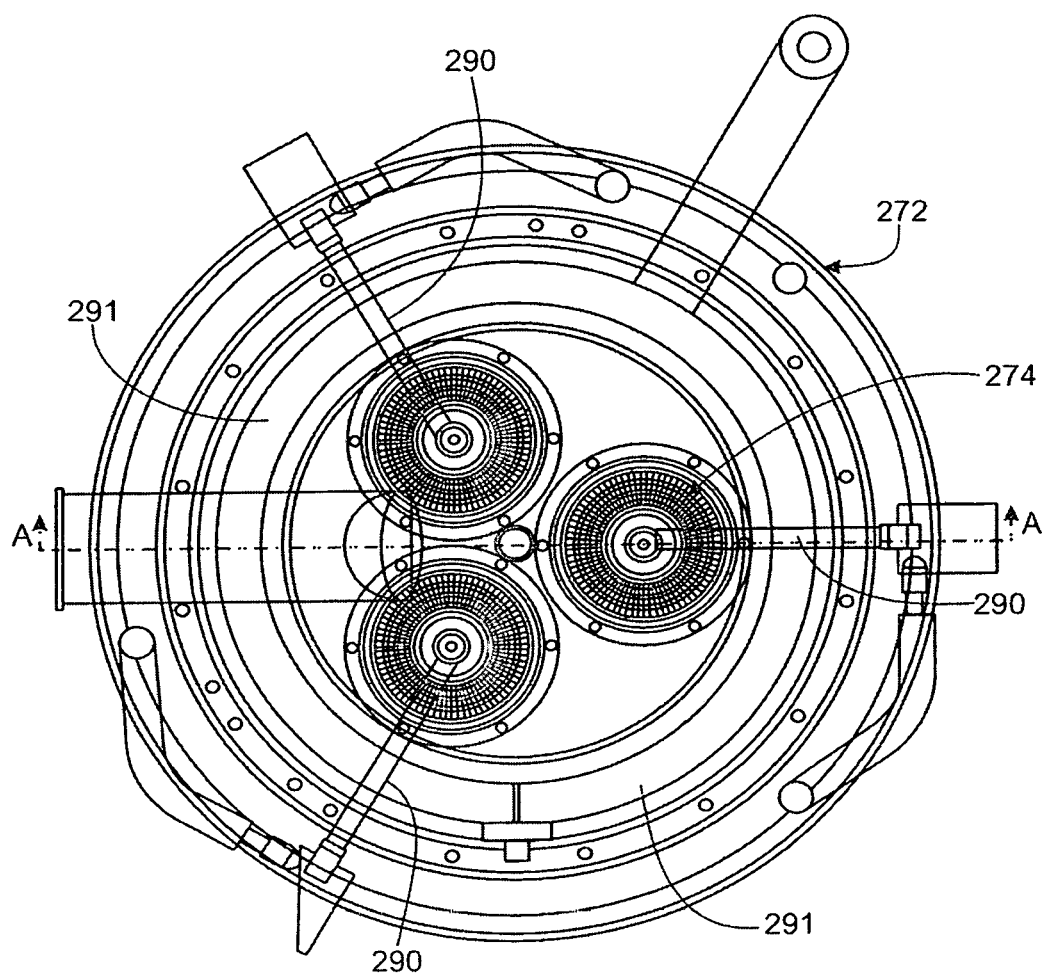
Figure 12B:
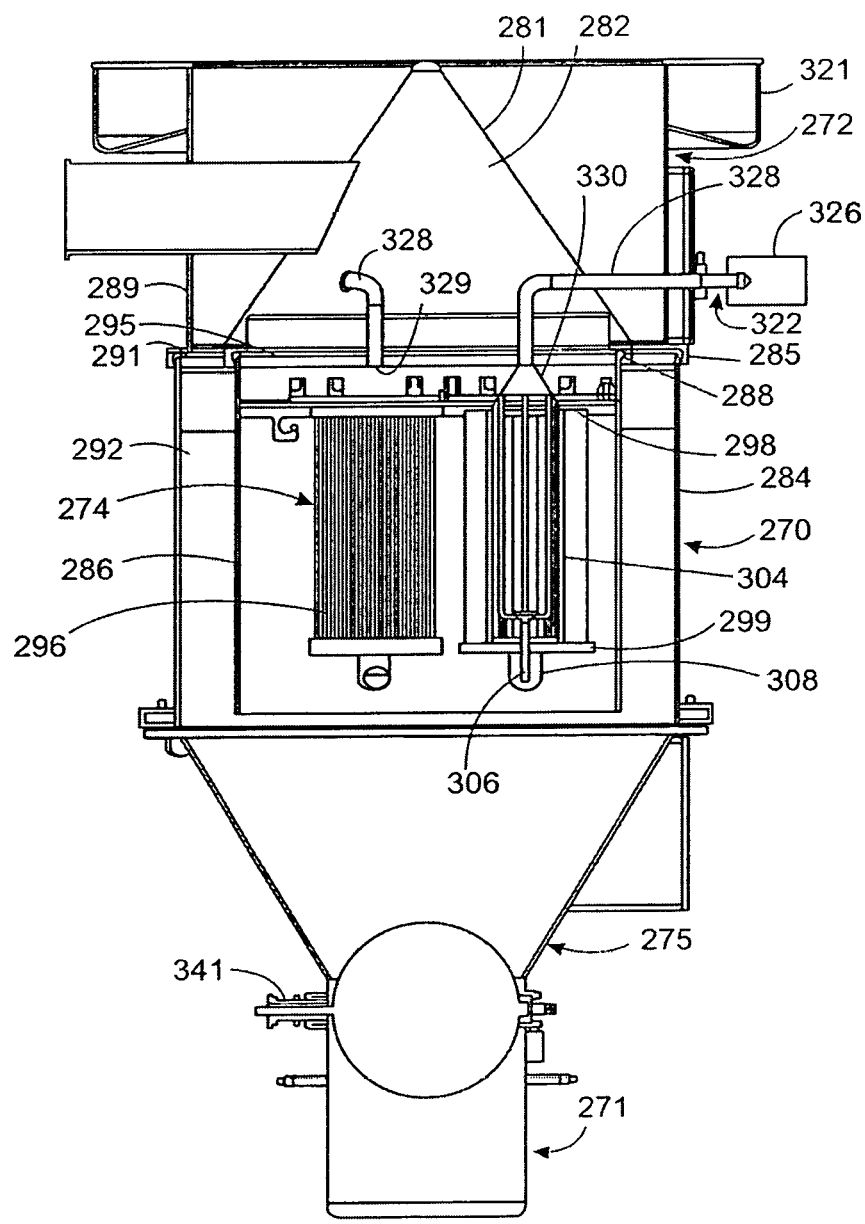
Figure 12C:
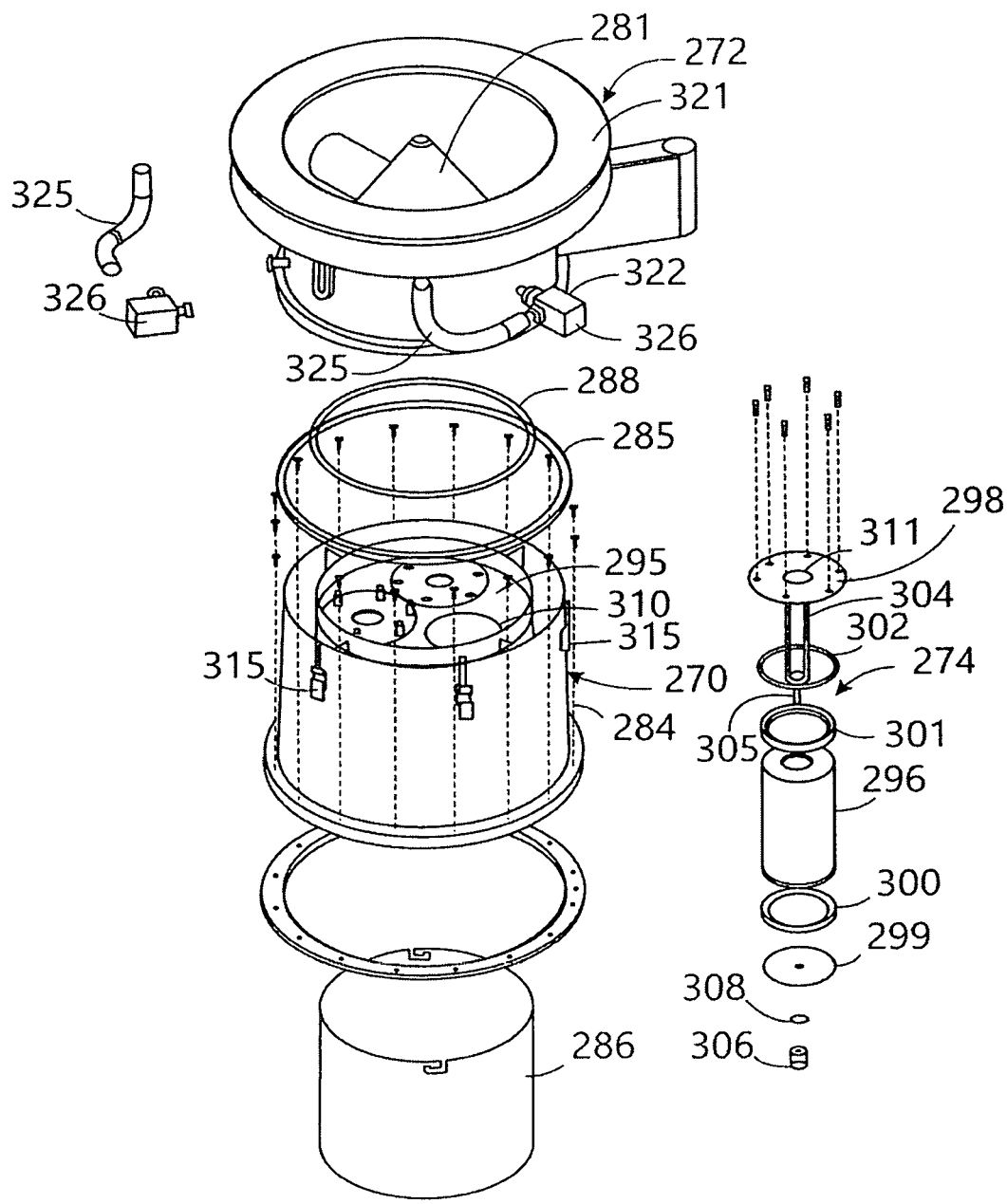
Figure 13:
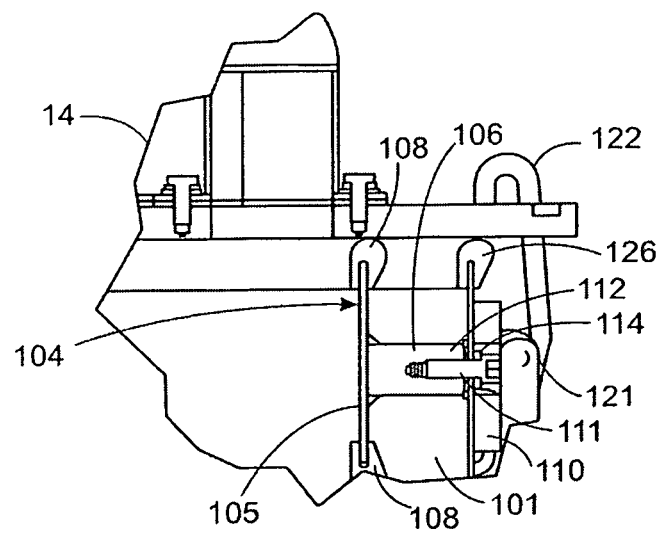
Figure 13A:
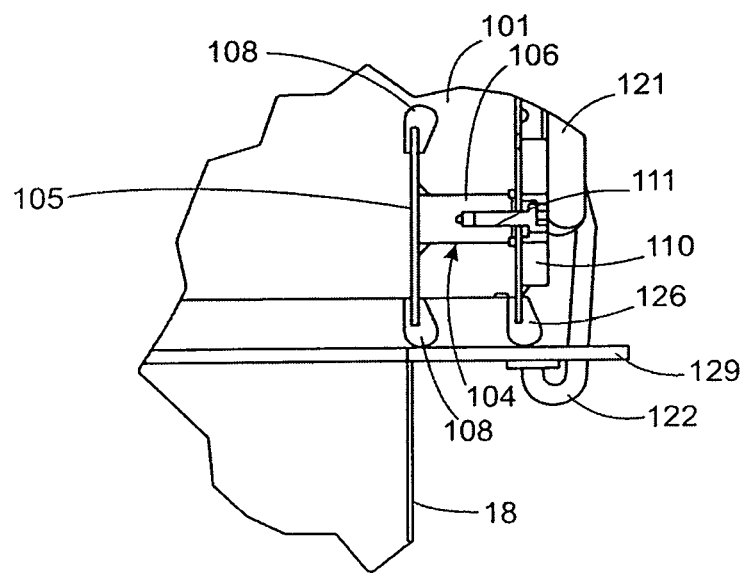
Figure 14:
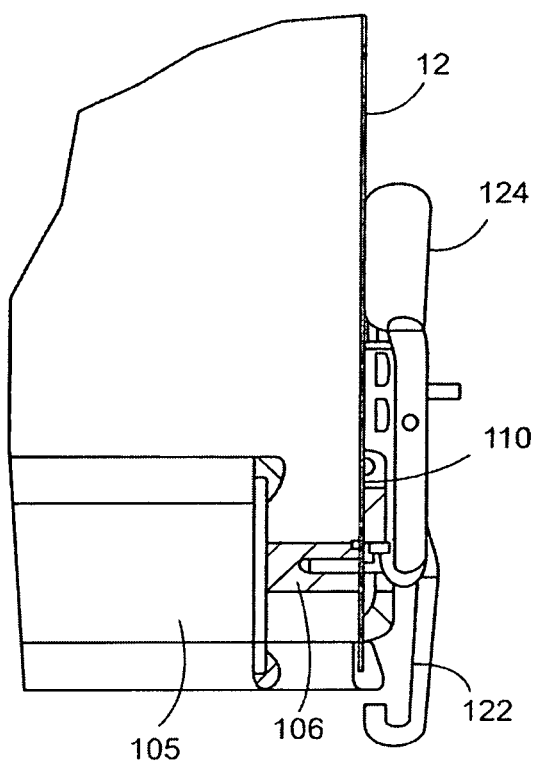

Still another alternative embodiment of an exhaust gas filter element housing 270 and powder collection chamber 271 mountable on a lower end of the drying chamber 12 is depicted FIGS. 12-12B. In this case, an upper powder direction plenum 272 is mountable on an underside of the elongated drying chamber 12, the filter element housing 270 includes a plurality of vertically oriented cylindrical filters 274 and is disposed below the powder direction plenum 272, a powder direction cone 275 is coupled to the underside of the filter element housing 270, and the powder collection chamber 271 is supported on an underside of the powder direction cone 275.

The illustrated powder direction plenum 272 comprises an outer cylindrical housing wall 289 mountable in sealed relation to an underside of the drying chamber 12 and having an open upper end for receiving drying gas and powder from the drying chamber 12 and drying zone 127. Housed within the powder direction plenum 272 is a downwardly opening conically configured exhaust plenum 281 which defines on its underside an exhaust chamber 282 (FIG. 12B) and on its upper side directs drying gas and powder from the drying chamber 12 downwardly and outwardly around an outer perimeter of the conical exhaust plenum 281.

The filter element housing 270 comprises an outer cylindrical housing wall 284 mounted in sealed relation by means of an annular seal 285 to a bottom peripheral edge of the powder direction plenum 272 and an inner cylindrical filter shroud 286 mounted in sealed relation by means of an annular seal 288 to the bottom peripheral edge of the conical exhaust plenum 281. The conical exhaust plenum 281 and the inner cylindrical filter shroud 286 are supported within an outer cylindrical housing wall 289 of the gas directing plenum 272 and filter element housing 270 by the plurality of radial supports 290 (FIG. 12A) so as to define air passageways 291 communicating about the bottom perimeter of the conical exhaust plenum 281 and an annular gas passageway 292 between the inner cylindrical filter shroud 286 and outer cylindrical housing wall 284 such that gas and powder passing through the powder direction plenum 272 is directed by the conical exhaust plenum 281 outwardly about the filter element shroud 281 into the underlying powder direction cone 275 and collection chamber 271.

The cylindrical filters 274 in this case are supported in depending relation to a circular support plate 295 fixedly disposed below the underside of the downwardly opening conical exhaust plenum 281. The circular filter support plate 295 in this case is mounted in slightly recessed relation to an upper perimeter of the cylindrical shroud 286 and defines a bottom wall of the exhaust chamber 282. The illustrated cylindrical filters 274 each are in cartridge form comprising a cylindrical filter element 296, an upper cylindrical cartridge holding plate 298, a bottom end cap and sealing plate 299 with interposed annular sealing elements 300, 301, 302. For securing the filter cartridges in assembled relation, the upper cartridge holding plate 298 has a depending U-shaped support member 304 with a threaded lower end stud 305 positionable through a central aperture in the bottom end cap 299 which is secured by a nut 306 with a o-ring sealing ring 308 interposed therebetween. The upper holding plate 298 of each filter cartridge is fixed in sealed relation about a respective circular opening 310 in the central support plate 295 with the filter element 296 disposed in depending relation to an underside of the support plate 295 and with a central opening 311 in the holder plate 298 communicating between the exhaust chamber 282 and the inside of the cylindrical filter element 296. The filter element cartridges in this case are disposed in circumferentially spaced relation about a center of the inner shroud 274.

The filter element housing 270 in this instance is secured to the powder direction plenum 272 by releasable clamps 315 or like fasteners to permit easy access to the filter cartridges. The inner filter shroud 286 also is releasably mounted in surrounding relation to the cylindrical filters 274, such as by a pin and slot connection, for enabling access to the filters for replacement.

During operation of the dryer system, it will be seen that drying gas and powder directed into the powder direction plenum 272 will be channeled about the conical exhaust plenum 281 into the annular passageways 291, 292 about the inner filter element shroud 274 downwardly into the powder direction cone 275 and collection chamber 271 for collection in the chamber 271. While most of the dried powder remaining in the gas flow will migrate into the powder collection chamber 271, as indicated previously, fine gas borne particulate matter will be separated and retained by the annular filters 274 as the drying gas passes through the filters into the drying gas exhaust plenum 282 for exit through a drying gas exhaust port 320 and recirculation to the drying chamber 12, as will be become apparent.

For cleaning the cylindrical filters 274 of buildup of powder during the course of usage of the dryer system, the cylindrical filters 274 each have a respective reverse gas pulse cleaning device 322. To this end, the gas direction plenum 272 in this case has an outer annular pressurized gas manifold channel 321 coupled to a suitable pressurized air supply. Each reverse air pulse cleaning device 322 has a respective pressurized gas supply line 325 coupled between the annular pressurized gas manifold channel 321 and a respective control valve 326, which in this case mounted on an outer side of the air direction plenum 272. A gas pulse direction line or tube 328 extends from the control valve 326 radially through the air direction plenum 272 and the conical wall of the exhaust plenum 329 and then with a right angle turn downwardly with a terminal discharge end 329 of the gas pulse directing line 328 disposed above and in aligned relation to the central opening 311 of the filter cartridge holding plate 298 and underlying cylindrical filter element 296.

By appropriate selective or automated control of the control valve 326, the control valve 26 can be cyclically operated to discharge pulses of the compressed gas from the line 328 axially into the cyclical filter 274 for dislodging accumulated powder on the exterior wall of the cylindrical filter element 296. The discharge end 329 of the pulse gas directing line 328 preferably is disposed in spaced relation to an upper end of the cyclical filter 274 to facilitate the direction of compressed gas impulses into the filter element 296 while simultaneously drawing in gas from the exhaust chamber 282 which facilitates reverse flow impulses that dislodge accumulated powder from the filter element 296. Preferably the discharge end 329 of the air tube 328 is spaced a distance away from the upper end of the cylindrical filter element such that the expanding air flow, depicted as 330 in FIG. 12B, upon reaching the filter cartridge, has an outer perimeter corresponding substantially to the diameter of the central opening 311 in the cartridge holding plate 298. In the exemplary embodiment, the air direction tube 28 has a diameter of about one inch and the discharge end 329 is spaced a distance of about two and a half inches from the holding plate 298.

The powder collection chamber 271 in this case has a circular butterfly valve 340 (shown in FIG. 12B in breakaway fashion within the powder collection chamber 271) mounted at an upper end of the collection chamber 271 operable by a suitable actuating device 341 for rotatable movement between a vertical or open position which allows dried powder to be directed into the collection chamber 271 and a horizontal closed position which blocks the passage of dried powder into the collection chamber 271 when powder is being removed. Alternatively, it will be understood that the powder collection chamber 271 could deposit powder directly onto a moveable conveyor from an open bottom end.

For enabling recirculation and reuse of the exiting drying gas from the filter element housing 19a, the exhaust outlet 20 of the filter housing 19 is coupled to a recirculation line 165 which in turn is connected to the heating gas inlet port 15 of the top cover 14 of the heating chamber 12 through a condenser 166, a blower 168, and a drying gas heater 169 (FIG. 15). The condenser 170 removes any water vapor from the exhaust gas flow stream by means of cold water chilled condensing coils 170a having respective cold water supply and return lines 171, 172. Condensate from the condenser 170 is directed to a collection container 174 or to a drain. Dried nitrogen gas is then directed by the blower 168 through the gas heater 169 which reheats the drying gas after cooling in the condenser 170 to a predetermined heated temperature for the particular powder drying operating for redirection back to the heating gas inlet port 15 and into the heating chamber 12. An exhaust control valve 175 coupled to the recirculation line 165 between the blower 168 and the heater 169 allows excess nitrogen gas introduced into the system from the electrostatic spray nozzle assembly 16 to be vented to an appropriate exhaust duct work 176. The exhaust flow from the control valve 175 may be set to match the excess nitrogen introduced into the drying chamber 12 by the electrostatic spray nozzle assembly 16. It will be appreciated that by selective control of the exhaust flow control valve 175 and the blower 168 a vacuum or pressure level in the drying chamber 12 can be selectively controlled for particular drying operations or for the purpose of controlling the evaporation and exhaust of volatiles. While a cold water condenser 170 has been shown in the illustrated embodiment, it will be understood that other types of condensers or means for removing moisture from the recirculating gas flow stream could be used.

It will be appreciated that the drying gas introduced into the effective drying zone 127 defined by the flexible liner 100 both from the electrostatic spray nozzle assembly 16 and the drying gas inlet port 15, is a dry inert gas, i.e. nitrogen in the illustrated embodiment, that facilitates drying of the liquid particles sprayed into the drying chamber 12 by the electrostatic spray nozzle assembly 16. The recirculation of the inert drying gas, as described above, also purges oxygen from the drying gas so as to prevent the chance of a dangerous explosion of powder within the drying chamber in the event of an unintended spark from the electrostatic spray nozzle assembly 16 or other components of the system.

Recirculation of the inert drying gas through the spray drying system 10, furthermore, has been found to enable highly energy efficient operation of the spray drying system 10 at significantly lower operating temperatures, and correspondingly, with significant cost savings. As indicated previously, emulsions to be sprayed typically are made of three components, for example, water (solvent), starch (carrier) and a flavor oil (core). In that case, the object of spray drying is to form the starch around the oil and dry off all of the water with the drying gas. The starch remains as a protective layer around the oil, keeping it from oxidizing. This desired result has been found to be more easily achieved when a negative electrostatic charge is applied to the emulsion before and during atomization.

While the theory of operation is not fully understood, each of the three components of the sprayed emulsion has differing electrical properties. Water being the most conductive of the group, will easily attract the most electrons, next being the starch, and finally oil being the most resistive barely attracts electrons. Knowing that opposite charges attract and like charges repel, the water molecules, all having the greatest like charge, have the most repulsive force with respect to each other. This force directs the water molecules to the outer surface of the droplet where they have the greatest surface area to the drying gas which enhances the drying process. The oil molecules having a smaller charge would remain at the center of the droplet. It is this process that is believed to contribute to more rapid drying, or drying with a lower heat source, as well as to more uniform coating. Testing of the spray dried powder produced by the present spray drying system operated with an inlet drying gas temperature of 90 degrees C. found the powder comparable to that dried in conventional spray drying processes operable at 190 degrees C. Moreover, in some instances, the subject spray drying system can be effectively operated without heating of the drying gas.

Encapsulation efficiency, namely the uniformity of the coating of the dried powder, also was equal to that achieved in higher temperature spray drying. It further was found that lower temperature drying significantly reduced aromas, odors and volatile components discharged into the environment as compared to conventional spray drying, further indicating that the outer surface of the dried particle was more uniformly and completely formed of starch. The reduction of discharging aromas and odors further enhances the working environment and eliminates the need for purging such odors that can be irritating and/or harmful to operating personnel. Lower temperature processing also enables spray drying of temperature sensitive components (organic or inorganic) without damage or adversely affecting the compounds.

If during a drying process any particles may stick or otherwise accumulate on the surface of the liner 100, a liner shaking device is provided for periodically imparting shaking movement to the liner 100 sufficient to remove any accumulated powder. In the illustrated embodiment, the drying chamber 12 has a side pneumatic liner shake valve port 180 which is coupled to a pneumatic tank 181 that can be periodically actuated to direct pressurized air through the pneumatic liner shake valve port 180 and into the annular air space between the liner 100 and the outer wall of the drying chamber 12 that shakes the flexible liner 100 back and forth with sufficient force to dislodge any accumulated powder. Pressurized air preferably is directed to the pneumatic liner shake valve port 180 in a pulsating manner in order to accentuate such shaking motion. Alternatively, it will be understood that mechanical means could be used for shaking the liner 100.

In order to ensure against cross contamination between successive different selective usage of the spray dryer system, such as between runs of different powders in the drying chamber 12, the annular arrays 120, 120a of quick disconnect fasteners 121 enable disassembly of the cover 14 and collection cone 18 from the drying chamber 12 for easy replacement of the liner 100. Since the liner 100 is made of relatively inexpensive material preferably it is disposable between runs of different powders, with replacement of a new fresh replacement liner being affected without undue expense.

Figure 18:
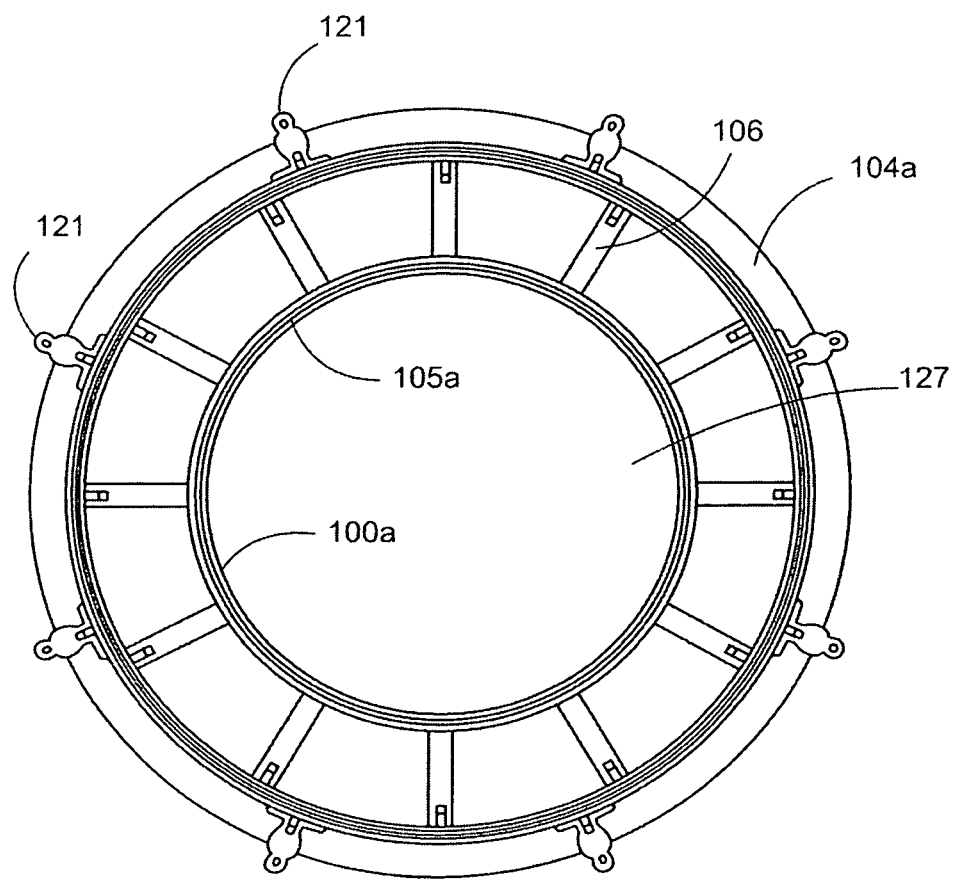

In keeping with another important feature of this embodiment, the drying chamber 12 is easily modifiable for different spray drying requirements. For example, for smaller drying requirements, a smaller diameter liner 100a may be used to reduce the size of the effective drying zone. To that end, standoff ring assemblies 104a (FIG. 18), similar to that described above, but with a smaller diameter inner standoff rings 105a, can be easily substituted for the larger diameter standoff ring assembly 104. The substitution of the ring assemblies may be accomplished by unlatching the circumferentially spaced arrays 120, 120a of latches 121 for the top cover 14 and collection cone 18, removing the larger diameter ring assemblies 104 from the drying chamber 12, replacing them with the smaller diameter ring assemblies 104a and liner 100a, and reassembling and relatching the top cover 14 and collection cone 18 onto the drying chamber 12. The smaller diameter liner 100a effectively reduces the drying zone into which heated drying gas and atomizing gas is introduced for enabling both quicker and more energy efficient smaller lot drying.

Figure 2:
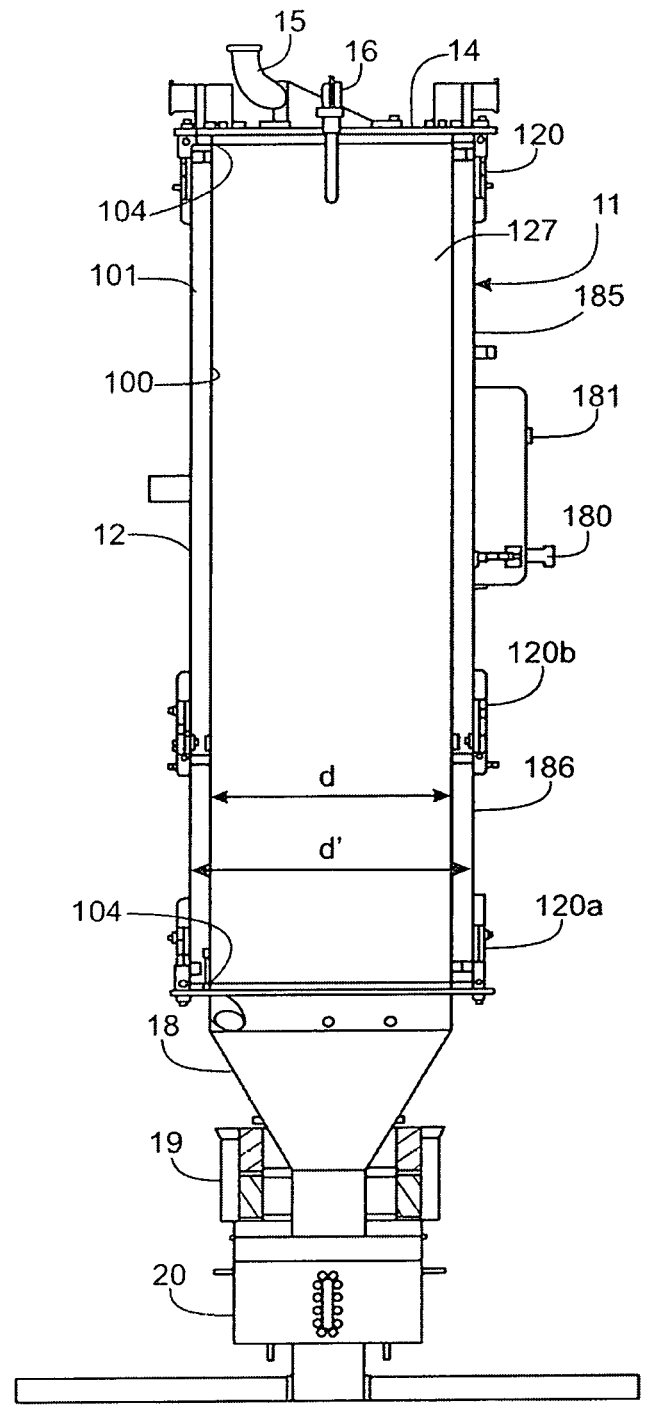

In further enabling more efficient drying of smaller lot runs, the drying chamber 12 has a modular construction that permits reducing the length of the drying chamber 12. In the illustrated embodiment, the drying chamber 12 comprises a plurality, in this case two, vertical stacked cylindrical drying chamber modules or sections 185, 186. The lower chamber section 186 is shorter in length than the upper chamber section 185. The two cylindrical drying chamber sections 185, 186 again are releasably secured together by an array 102b of circumferentially spaced quick disconnect fasteners 121 similar to those described above. The mounting ring 110 for this array 102b of fasteners 121 is welded to the upper cylindrical drying chamber section 185 adjacent the lower end thereof and the fasteners 121 of that array 102b are oriented with the draw hooks 122 downwardly positioned for engaging and retaining an underside of a top outer radial flange 188 (FIGS. 1 and 2) of the lower cylindrical drying chamber section 186. Upon release of the two arrays 102a, 102b of fasteners 121 affixing the lower cylindrical section 186 to the upper cylindrical section 185 and the collection cone 18, the lower cylindrical section 186 can be removed, the lower standoff ring assembly 104 repositioned adjacent the bottom of the upper chamber section 185, and the liner 100 replaced with a shorter length liner. The upper cylindrical dryer chamber section 185 can then be secured directly onto the powder collection cone 18 with the lower standoff ring assembly 104 therebetween by the fasteners 121 of the array 102b which then engage the outer annular flange 129 of the collection cone 18. This modification enables use of a substantially shorter length effective drying zone for further reducing heating requirements for smaller lot drying.

Figure 4:
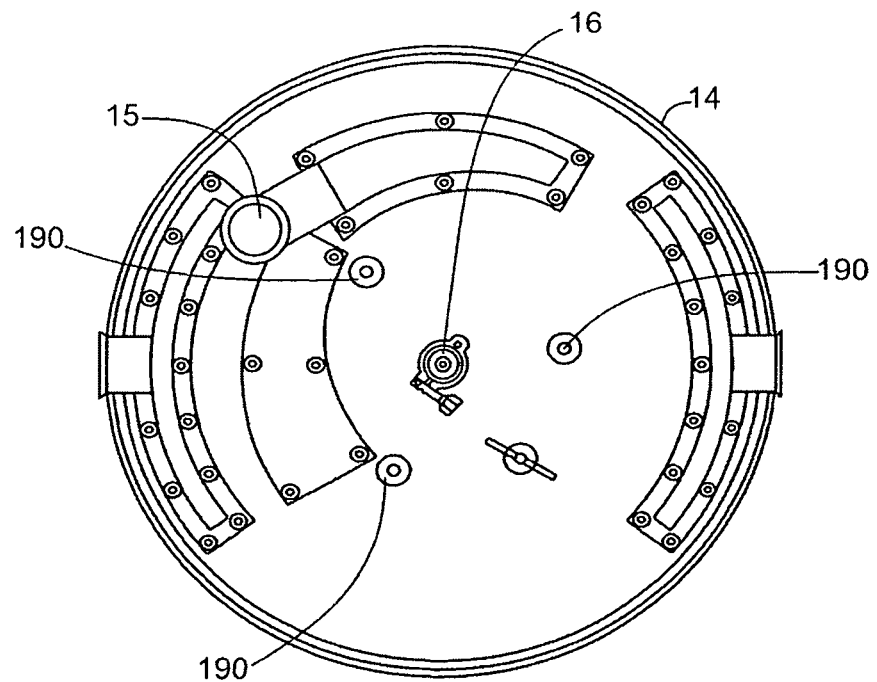
Figure 5:
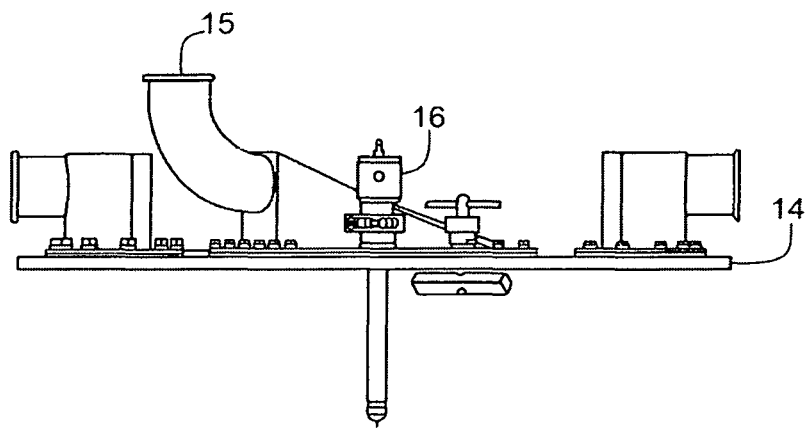
Figure 6:
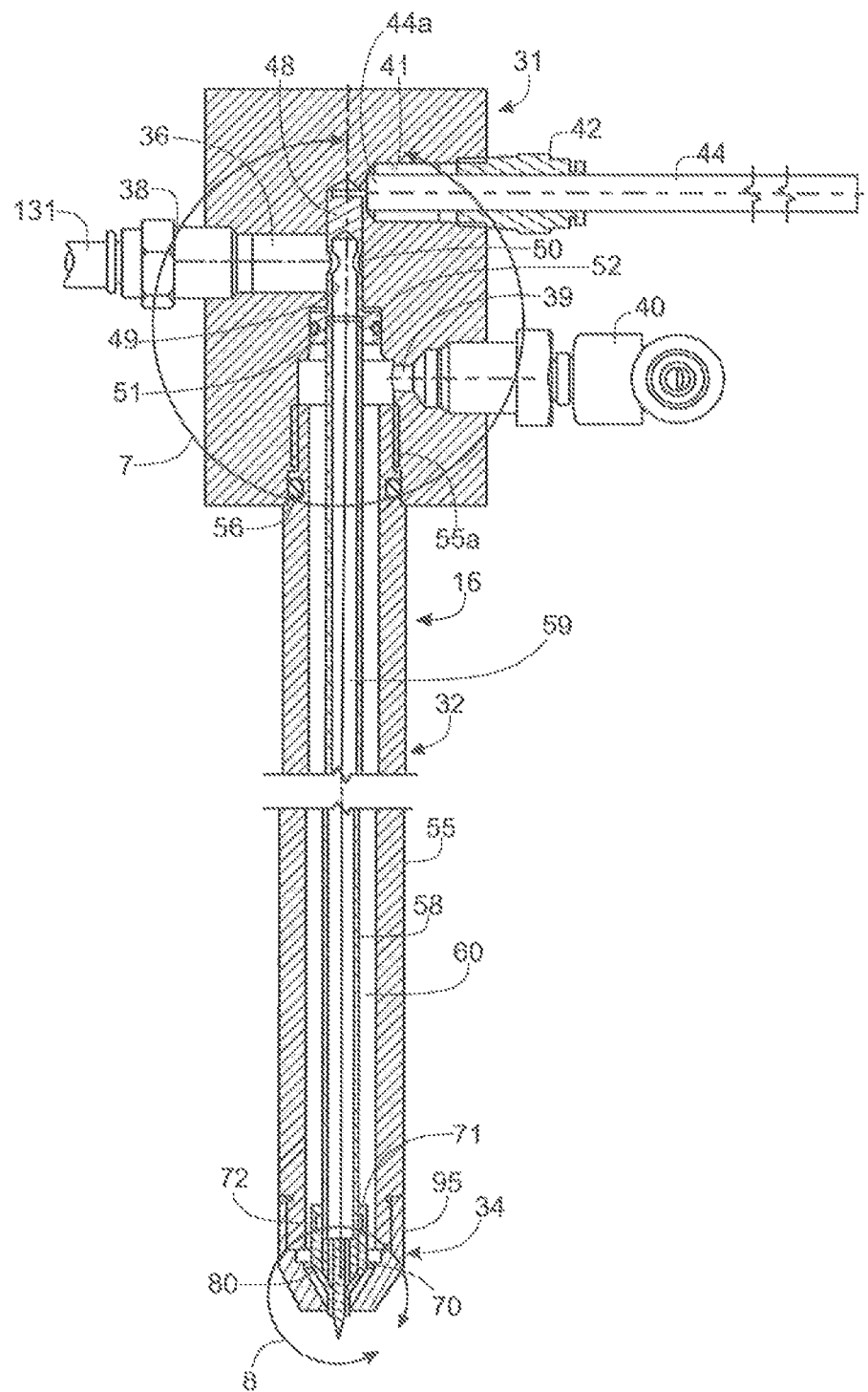
Figure 7:
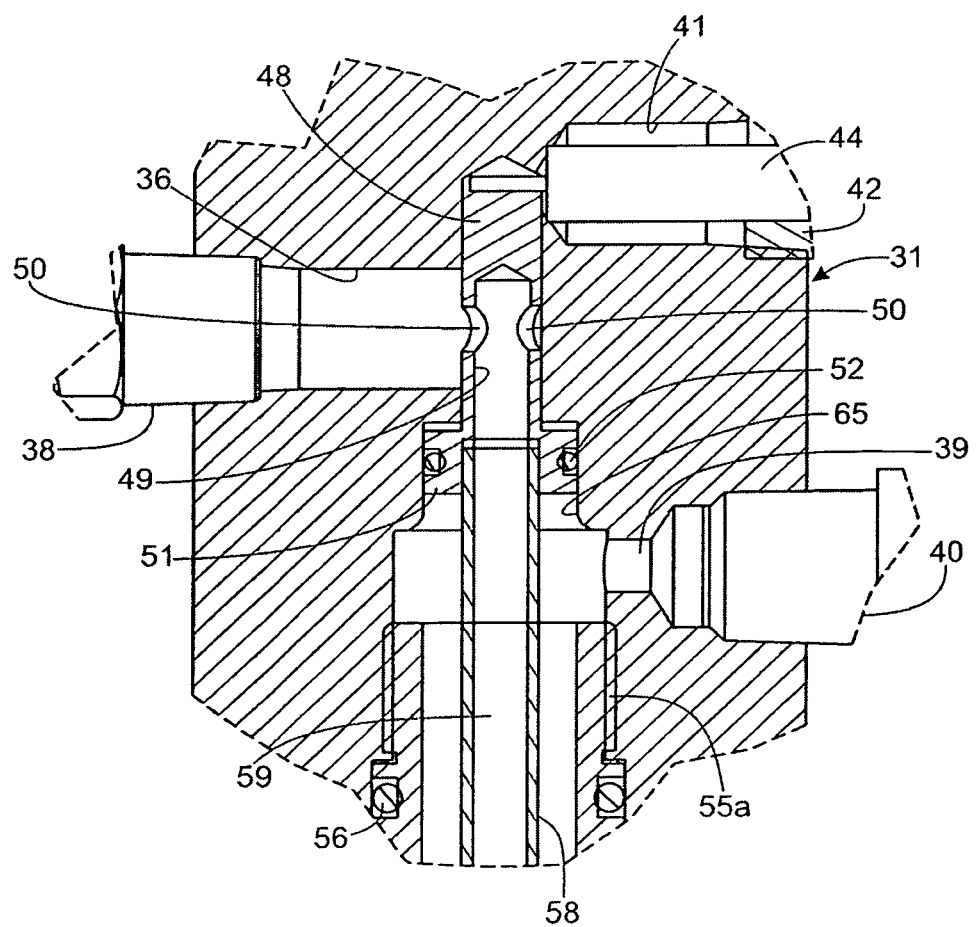
Figure 19:
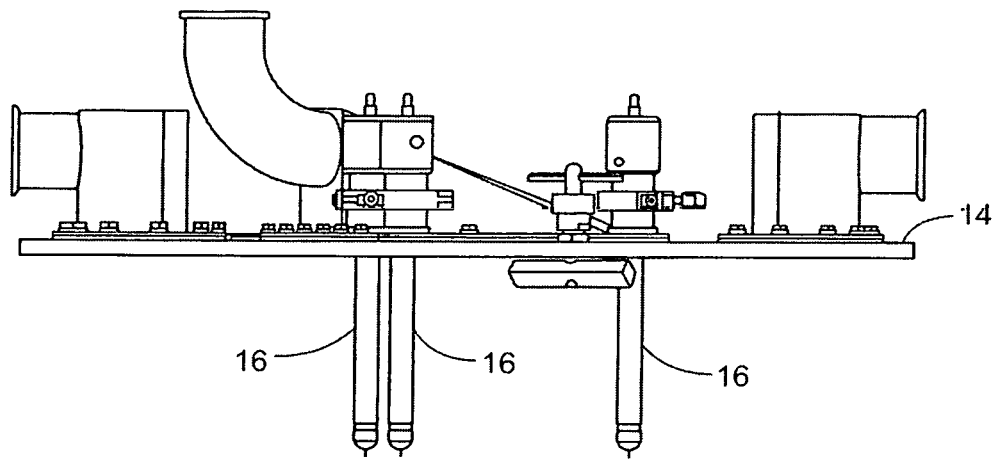
FIG. 19 is an enlarged side elevational view of the top cap of the illustrated powder processing tower supporting a plurality of electrostatic spray nozzle assemblies.
Figure 20:
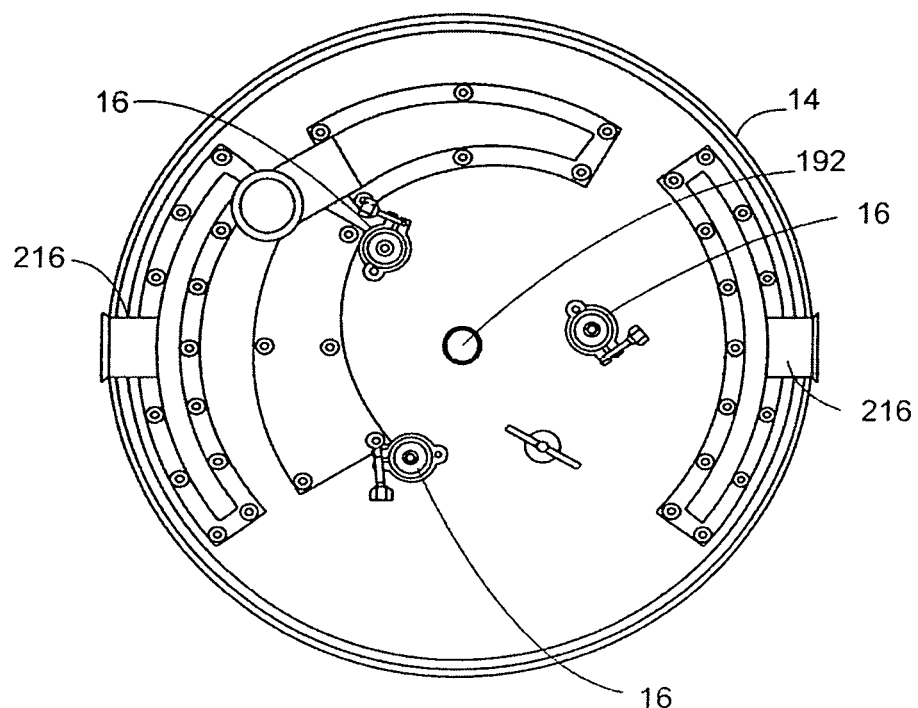
FIG. 20 is a top view of the top cap shown in FIG. 19.

It will be appreciated that additional cylindrical drying chamber modules or sections 186 could be added to further increase the effective length of the drying chamber 12. For increasing the quantity sprayed liquid into the drying chamber 12, whether or not increased in size, a plurality of electrostatic spray nozzle assemblies 16 can be provided in the top cover 14, as depicted in FIGS. 19 and 20. The plurality of spray nozzle assemblies 16, which may be supplied from the common liquid and nitrogen supplies, preferably are supported in a circumferential spaced relation to each other in respective, previously capped, amounting apertures 190 in the top cover 14 (FIG. 4). The then unused central mounting aperture 192 (FIG. 20) may be appropriately capped or otherwise closed.

Figure 21:
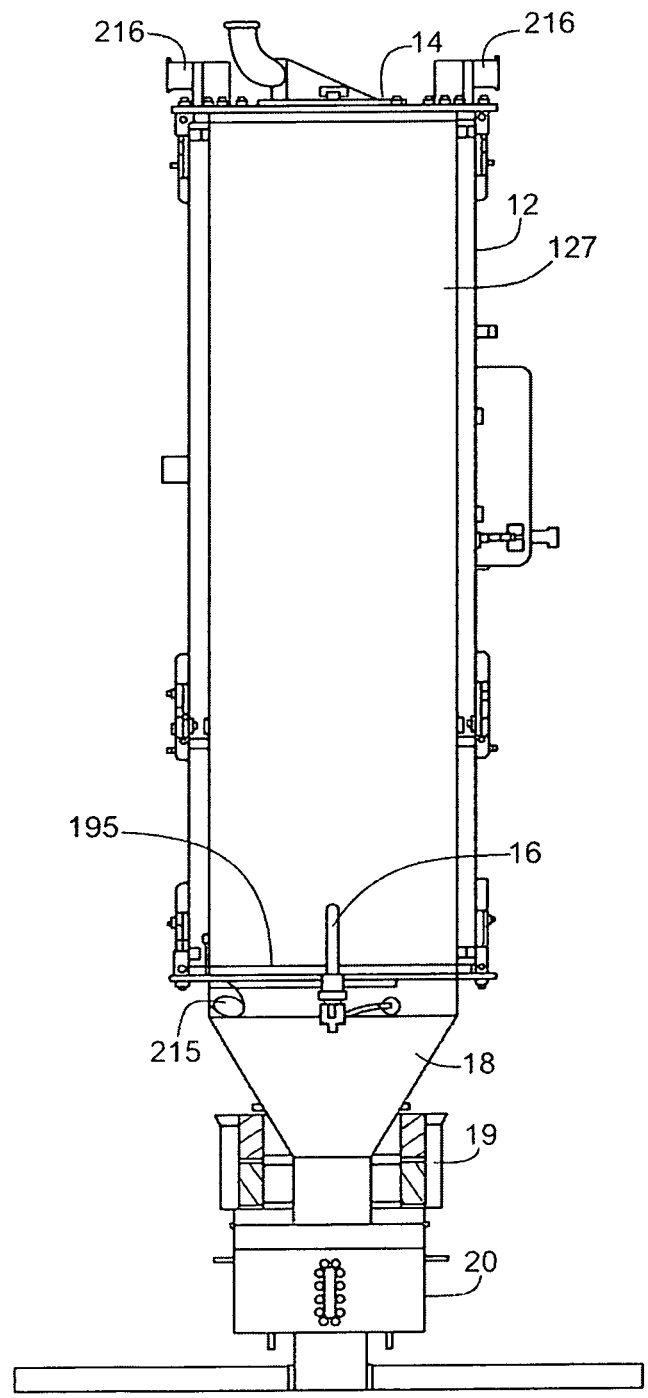
FIG. 21 is a vertical section of the illustrated powder processing tower, modified for supporting the electrostatic spray nozzle centrally adjacent a bottom of the drying chamber thereof for the upward direction of sprayed liquid for drying.
Figure 22:
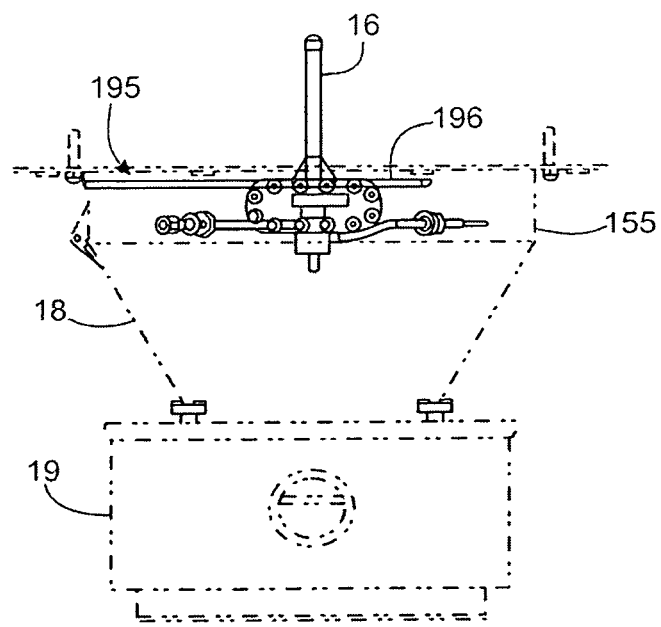
FIG. 22 is a diagrammatic side elevational view of the bottom mounting support of the electrostatic spray nozzle assembly shown in FIG. 21.
Figure 23:
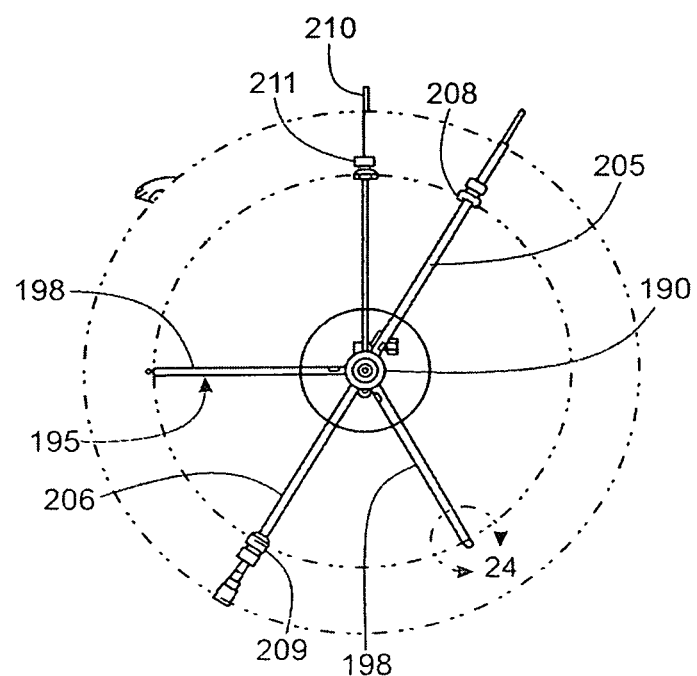
FIG. 23 is a top view of the electrostatic spray nozzle assembly and bottom mounting support shown in FIG. 22.
Figure 24:
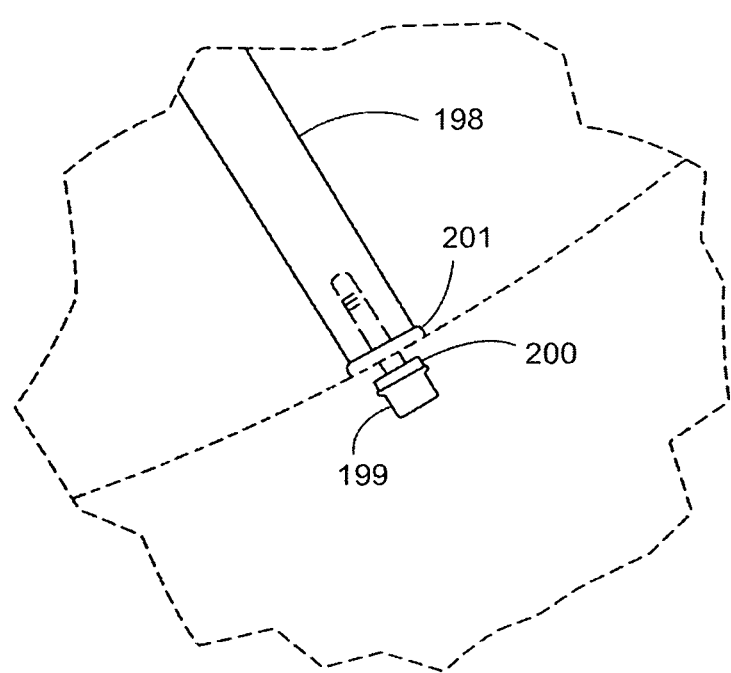
FIG. 24 is an enlarged section of one of the support rods for the spray nozzle bottom mounting support shown in FIGS. 22 and 23.
Figure 25A:
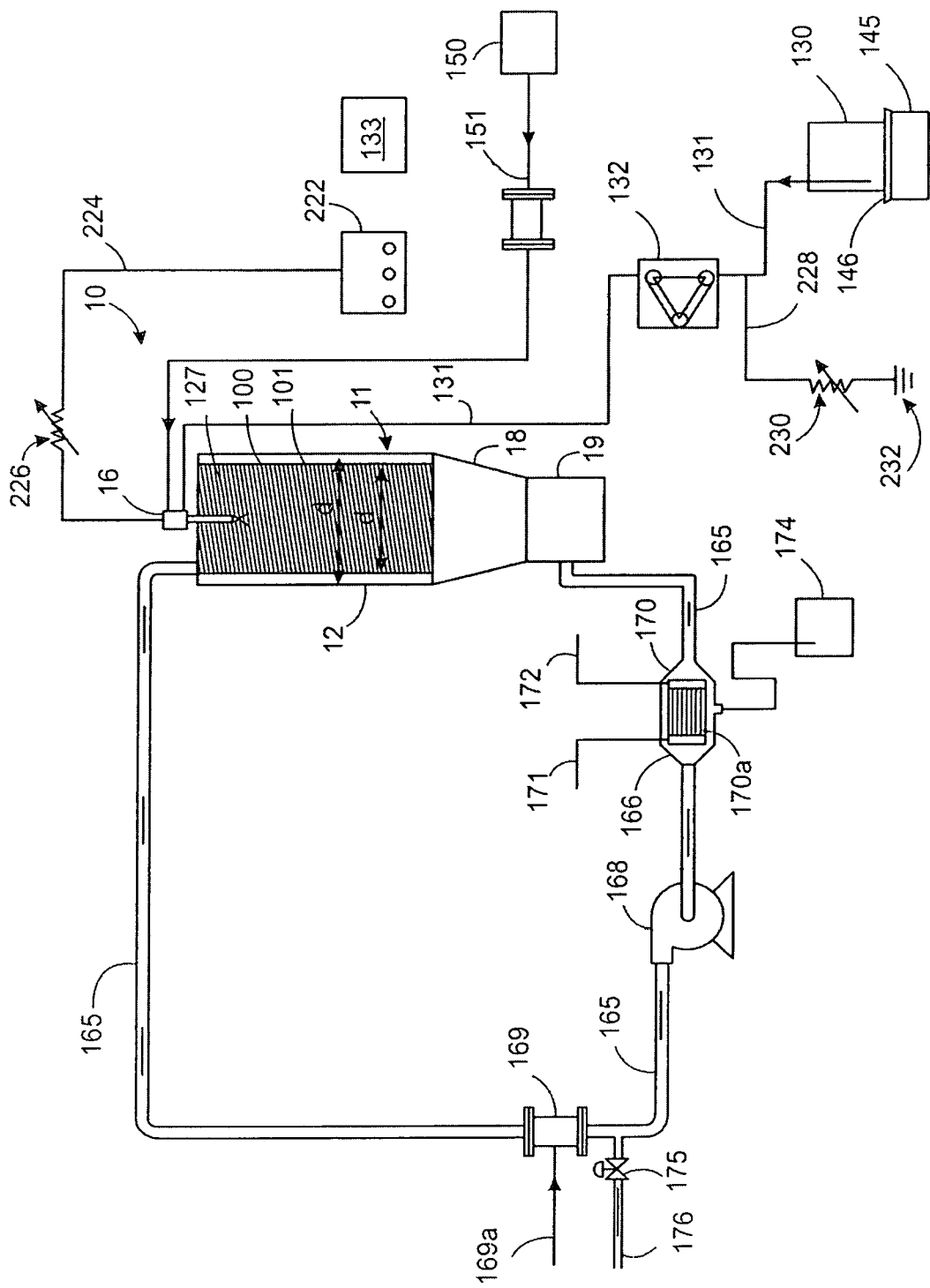
FIG. 25A is a schematic of an alternative embodiment of a spray dryer system in which fresh nitrogen gas is introduced into the gas recirculation line of the system.
Figure 25B:
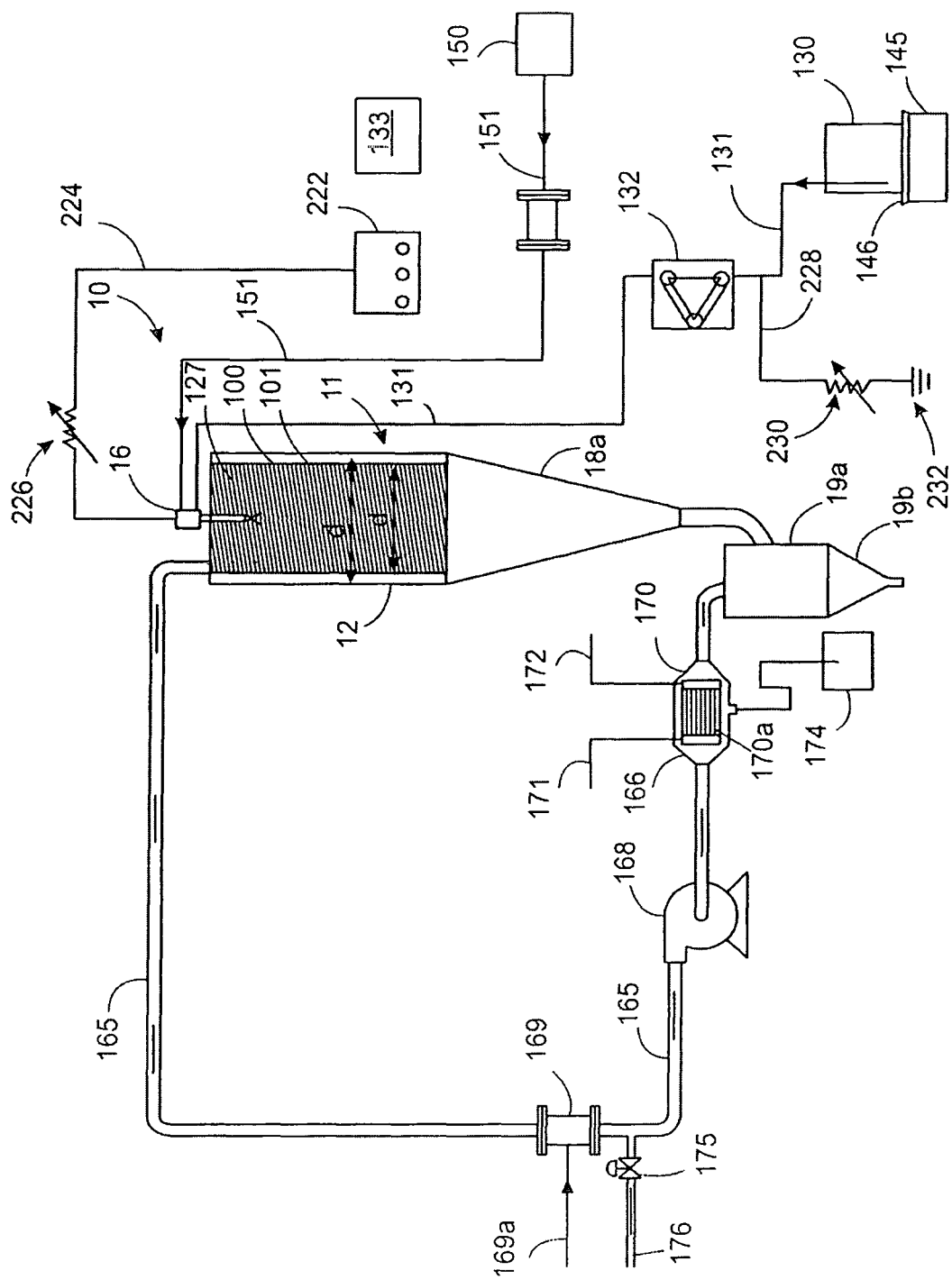
FIG. 25B is a schematic of another alternative embodiment of a spray dryer system that utilizes a cyclone separator/filter bag assembly for filtering particulate matter from a recirculating drying gas stream.
Figure 25C:
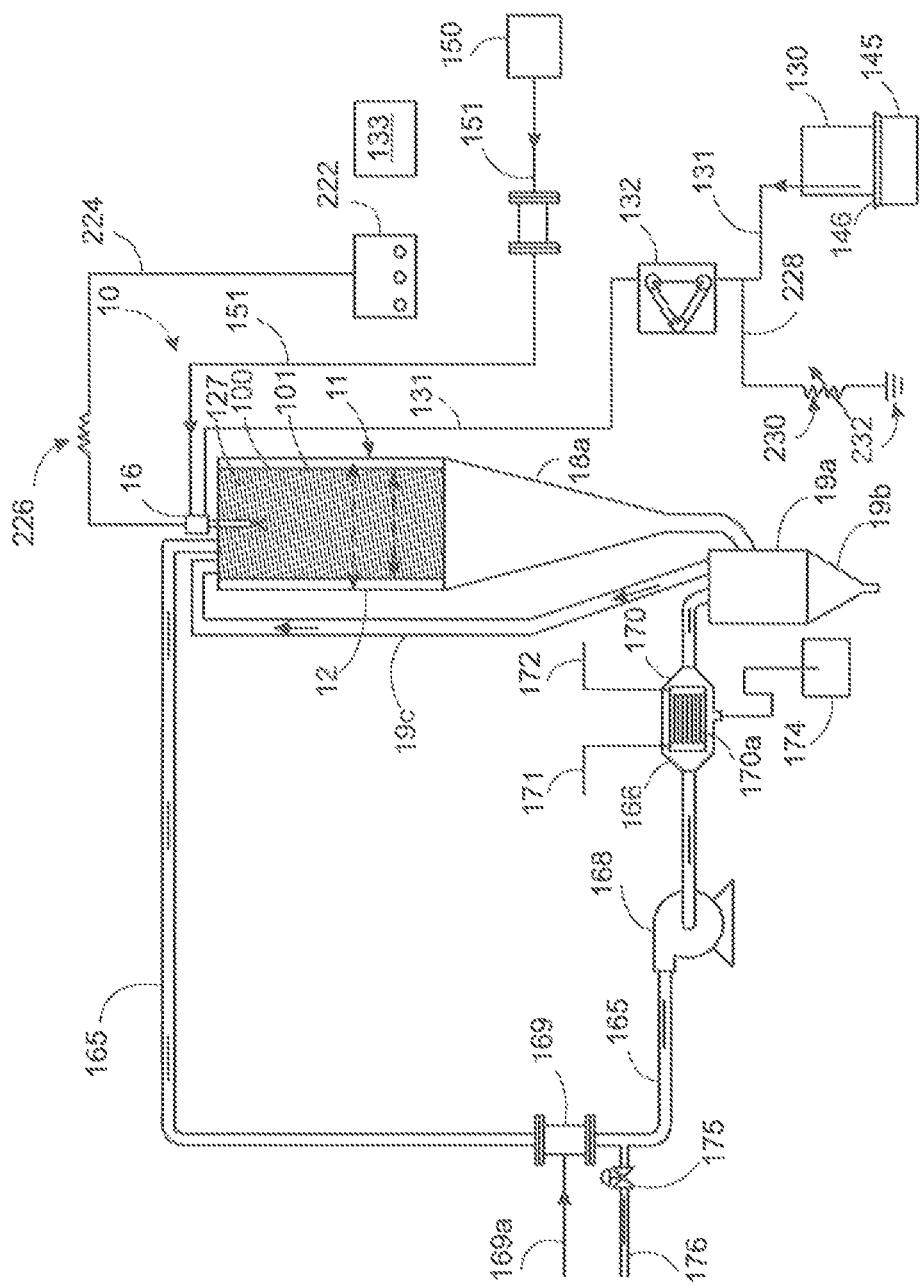
FIG. 25C is an alternative embodiment, similar to FIG. 25B, and which dried fine particles separated in the cyclone separator are reintroduced into the drying chamber.
Figure 25D:
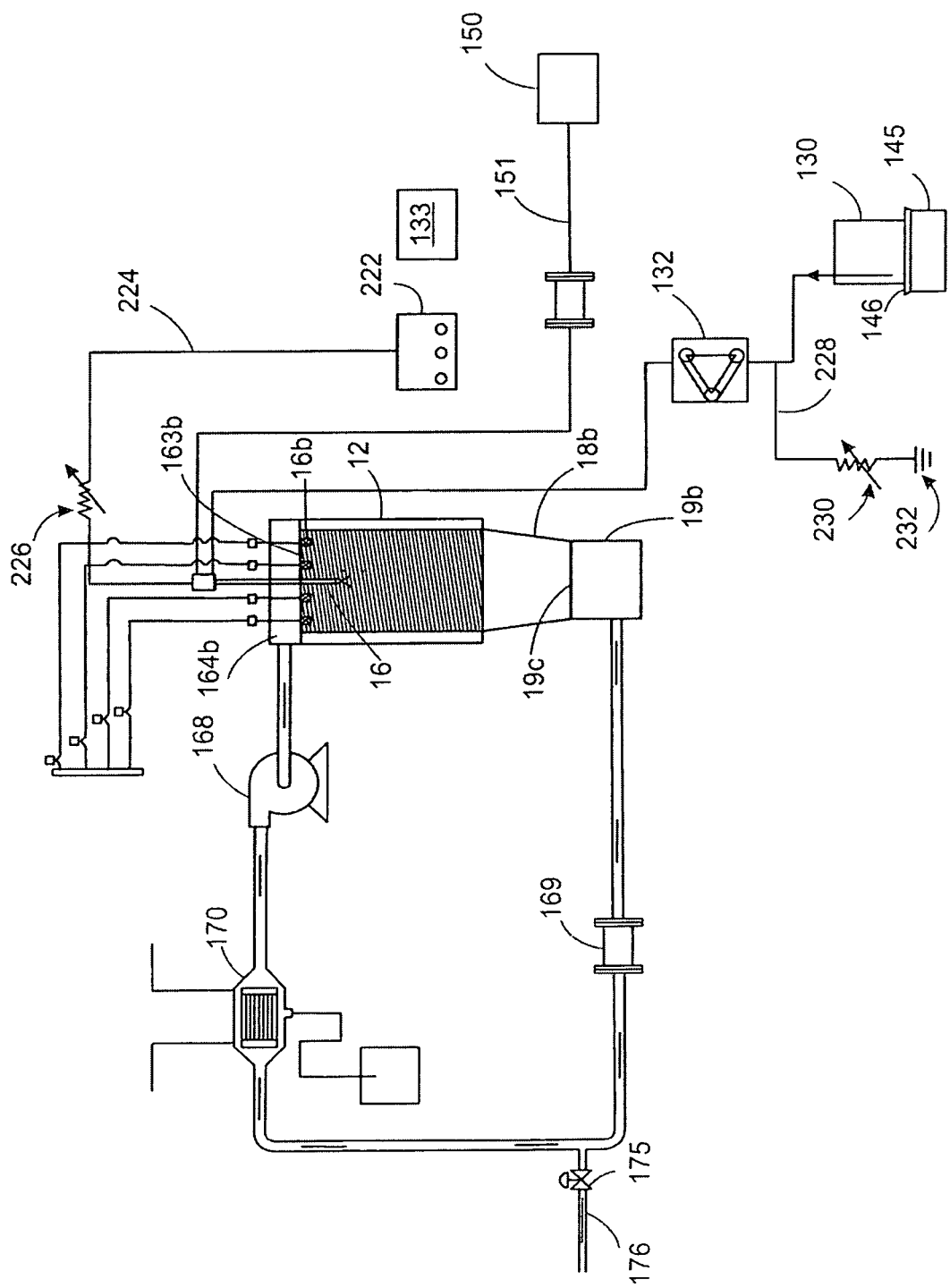
FIG. 25D is another alternative embodiment of the spray dryer system that has a plurality of fluid bed filters for filtering particulate matter from recirculating drying gas.

According to still another feature of this embodiment, the modular quick disconnect components of the drying tower 11 further enables relocation of the electrostatic spray nozzle assembly 16 from a position on top of the drying chamber 12 for downward spraying to a position adjacent a bottom of the drying chamber 12 for the upward direction of an electrostatically charged liquid spray into the drying chamber 12. To this end, the spray nozzle assembly 16 may be removed from the top cover 14 and secured in a bottom spray nozzle mounting support 195 (FIGS. 21-24), which in this case is mounted within the upper cylindrical wall section 155 of the powder collection cone 18 immediately adjacent the bottom of the drying chamber 12 for orienting the electrostatic spray nozzle assembly 16 for spraying charged spray pattern upwardly into the drying chamber 12, as depicted in FIG. 21. The illustrated bottom nozzle mounting support 195, as depicted in FIGS. 22-24, includes a central annular mounting hub 196 for supporting the spray nozzle assembly 16 adjacent an upstream end which, in turn, is supported in the upper cylindrical section 155 of the powder collection cone 18 by a plurality of radial mounting rods 198 made of a non-conductive material. The radial mounting rods 198 each are secured to the cylindrical wall section 155 by respective stainless steel screws 199 (FIG. 24) with a rubber bonded sealing washing 200 between the head of the screw 199 and the outer wall surface of the powder collection cone 18 and a sealing o-ring 201 is interposed between the outer end of each mounting rod 198 and the inside wall surface of the powder collection cone section 18. Non-conductive Teflon or other plastic liquid and atomizing gas supply lines 205, 206 respectively connect radially outwardly to insulated fittings 208, 209 by powder collection cone 18, which in turn are connected to the atomizing air and liquid supply lines 151, 131. A high voltage power cable 210 also connects radially with the nozzle assembly through an insulated fitting 211.

With the electrostatic spray nozzle assembly 16 mounted adjacent the underside of the drying chamber 12, a central spray nozzle mounting aperture 192 in the cover 14 may be appropriately capped, as well as the gas inlet port 15. The powder collection cone 18 further has a tangentially oriented drying gas inlet 215, which may be uncapped and connected to the drying gas recirculation line 165, and the cover 14 in this case has a pair of exhaust ports 216 which also may be uncapped for connection to the heating gas return line.

With the spray nozzle assembly 16 mounted on the underside of the drying chamber 12, electrostatically charged liquid spray particles directed upwardly into the drying chamber 12 are dried by drying gasses, which in this case are tangentially directed through the bottom heating gas inlet 215 and by heating atomizing gas from the spray nozzle assembly 16, which again both are dry inert gas, i.e. nitrogen.

Pursuant to this embodiment, the annular liner 100 in the drying chamber 12 preferably is made of a filter media 100*b* (FIG. 3B) for enabling the drying gas to ultimately migrate through the filter media for exit out from the upper exhaust ports 216 in the cover 14 to the recirculation line 165 for recirculation, reheating, and redirection to the bottom gas inlet port 215, as explained above. The powder dried by the upwardly directed drying gas and atomizing gas will ultimately float downwardly into and through the powder collection cone 18 into the collection chamber 19, as described above, with only the finest particles being filtered by the filter media liner 100. The pneumatic liner shaker again may be periodically actuated to prevent the accumulation of powder on the liner 100.

From the foregoing, it can be seen that the processing tower can be easily configured and operated in a variety of processing modes for particular spray applications, as depicted in the table 220 in FIG. 25. The drying chamber length may be electively changed by adding or removing the cylindrical dryer chamber section 186, the material of the liner may be selectively determined, such as non-permeable or permeable, the electrostatic spray nozzle orientation may be changed between top spraying downwardly or bottom spraying upwardly, and the processed gas flow direction can be changed between downward or upward directions based upon the desired configuration.

While in the foregoing embodiments, nitrogen or other inert drying gas, is introduced into the system as atomizing gas to the electrostatic spray nozzle assembly 16, alternatively, the nitrogen gas could be introduced into the recirculating gas. In the spray dry system as depicted in FIG. 25A, wherein parts similar to those described above have been given similar references numerals to those described above, nitrogen or other inert gas is introduced into the gas heater 169 from a nitrogen injection line 169*a* for direction to the drying chamber 100 via the gas delivery and supply line 169*a* and recirculation from the drying chamber 100 through the condenser 170, and blower 168 as described previously. In that embodiment, nitrogen gas can also be supplied to the electrostatic spray nozzle assembly 16 as atomizing gas, as described above, or air, or a combination of an inert gas and air, can be supplied to the electrostatic spray nozzle assembly 16 as the atomizing gas so long as it does not create a combustive atmosphere within the drying chamber. Operation of the drying system depicted in FIG. 25A otherwise is the same as in previously described.

With reference to FIG. 25B, there is shown another alternative embodiment drying system similar to that described above, except that a powder collection cone 18*a* directs powder to a conventional cyclone separator/filter bag housing 19*a* in which dried product is discharged from a lower outlet 19*b* and exhaust air is directed from an upper exhaust port line 165 for recirculation through the condenser 170, the blower 168, drying gas heater 169 and the drying chamber 11. In FIG. 25C, there is shown an alternative embodiment of drying system similar to that shown in FIG. 25B but with a fine powder recirculation line 19*c* between the cyclone separator and filter bag housing 19*a* and the upper end of the drying chamber 11. Dried fine particulates separated in the cyclone separator 19*a* are recirculated through the fine powder recirculation line 19*c* to the drying chamber 11 for producing powers having agglomerations of fine particles. Again, the system otherwise operates the same as previously described.

Referring now to FIG. 25D there is shown another alternative embodiment in the form of a fluidized bed powder drying system. The powder drying system again has a cylindrical drying chamber 12 with a non-permeable liner 100 concentrically disposed therein and an electrostatic spray nozzle assembly 16 for directing electrostatically charged liquid particles into the effective heating zone 127 defined by the liner 100 as described above. In this case, a conically formed collection container section 18*b* communicates powder from the drying chamber 12 into a collection chamber 19*b* through a fluid bed screen separator 19*c* of a conventional type. In this embodiment, a plurality of fluid bed cylindrical filter elements 160*b*, similar to those described in connection with the embodiment of FIG. 11A, are supported from an upper transverse plate 163*b* which defines an exhaust plenum 164*b* adjacent a top of the drying chamber 12. A blower 168 in this case draws air from the exhaust plenum 164*b* from which powder and particulate matter has been filtered out for direction via the line 165 through the condenser 170 and heater 169, for reintroduction into the bottom collection chamber 19*b* and recirculation upwardly through the drying chamber 12. The filters 16*b* again have reverse pulse air filter cleaning devices 167*b* of the type as disclosed in the referenced U.S. Pat. No. 8,876, 928, having respective air control valves 167c for periodically directing pressurized air to and through the filters 16b for cleaning the filters 16b of accumulated powder.

Figure 3C:
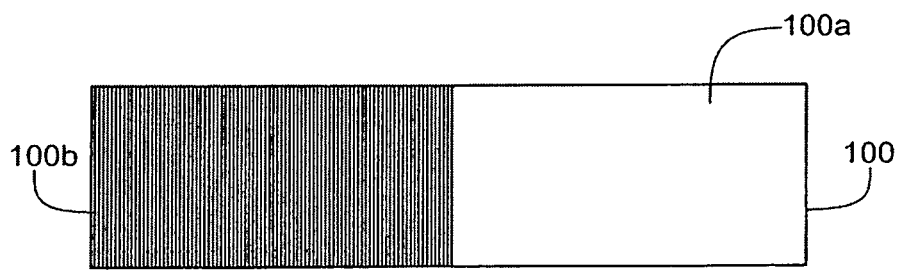
Figure 3D:
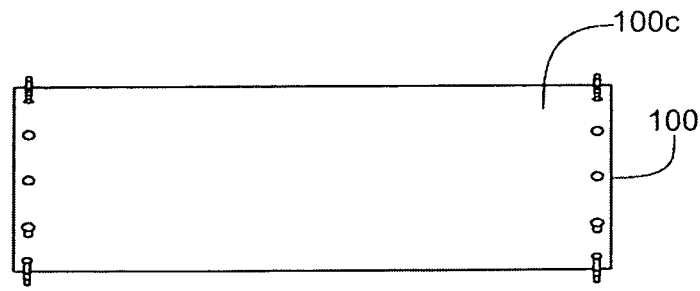

While the non-permeable liner 100 of the foregoing embodiments, preferably is made of flexible non-conductive material, such as plastic, alternatively it could be made of a rigid plastic material, as depicted in FIG. 3D. In that case, appropriate non-conductive mounting standoffs 100d could be provided for securing the liner in concentric relation within the drying chamber 12. Alternatively, as depicted in FIG. 3C the permeable liner can be made in part, such as one diametrical side, of a permeable filter material 100b which allows air to flow through the liner for exhaust and in part, such as on an opposite diametric side, of a non permeable material 100a that prevents dried particles from being drawn into the liner.

Figure 15A:
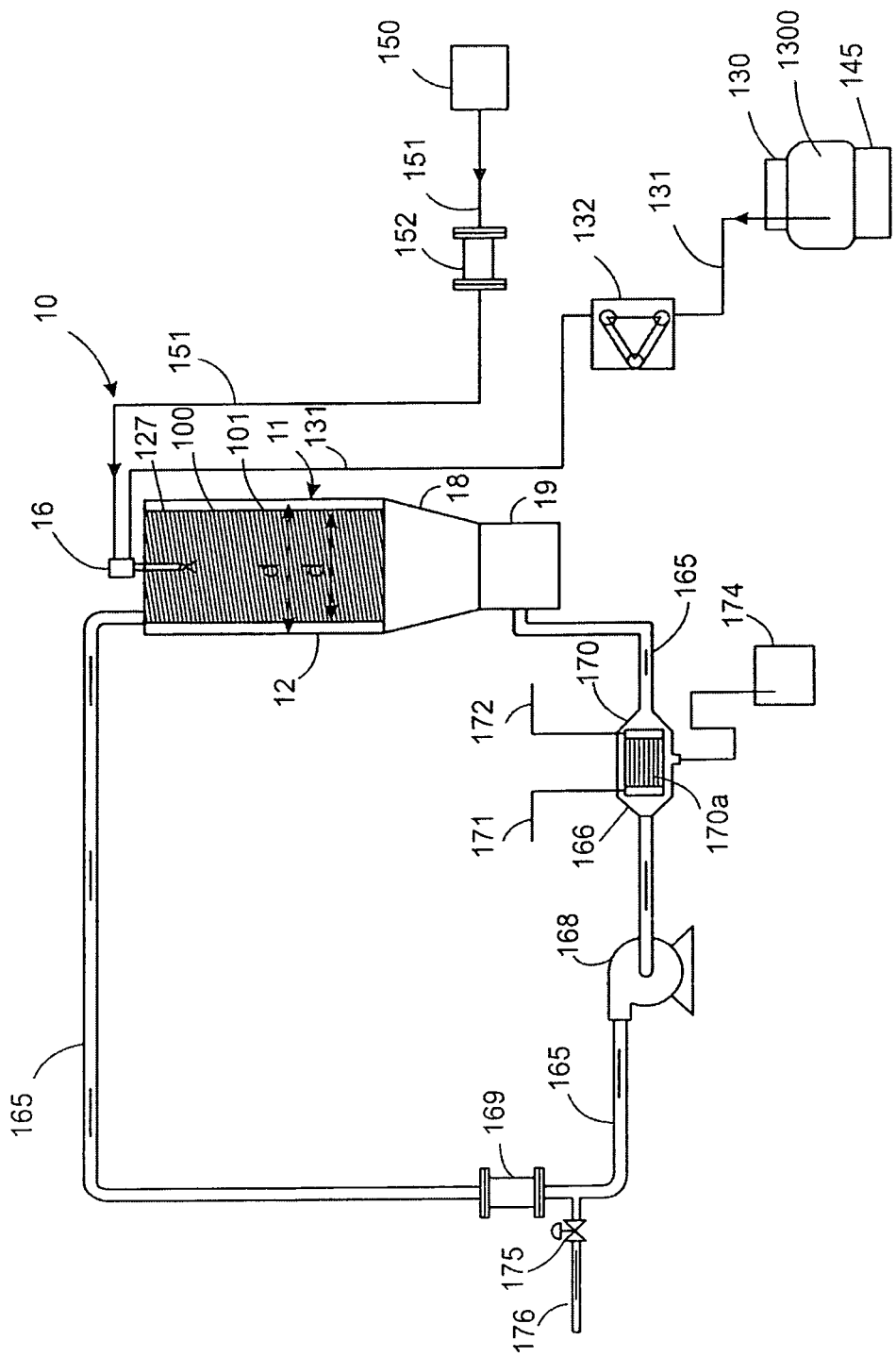
Figure 16:
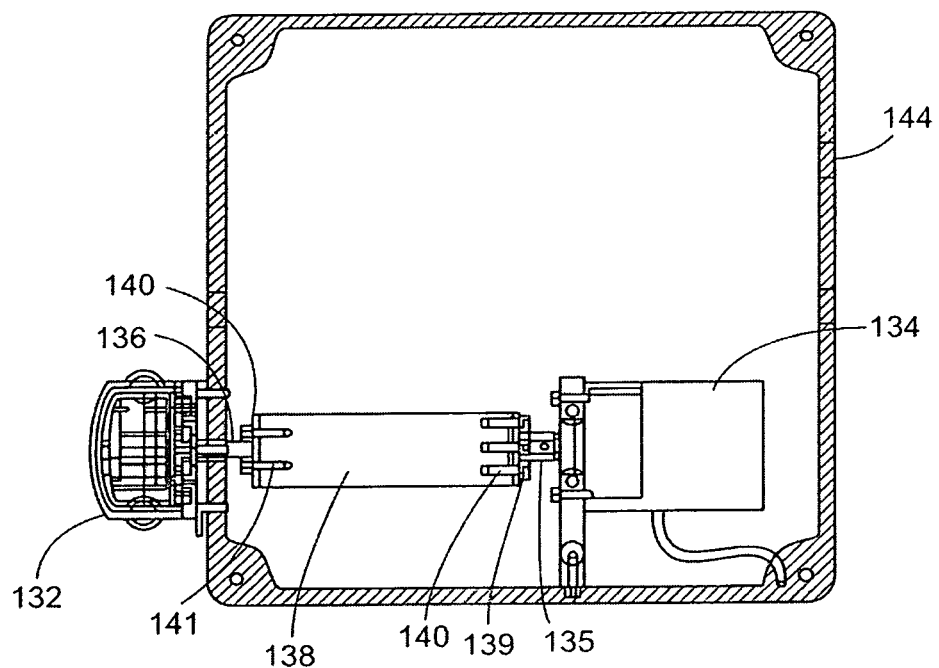
Figure 16A:
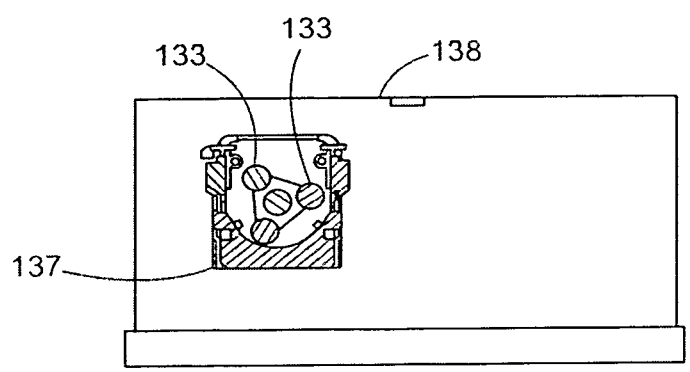
Figure 17:
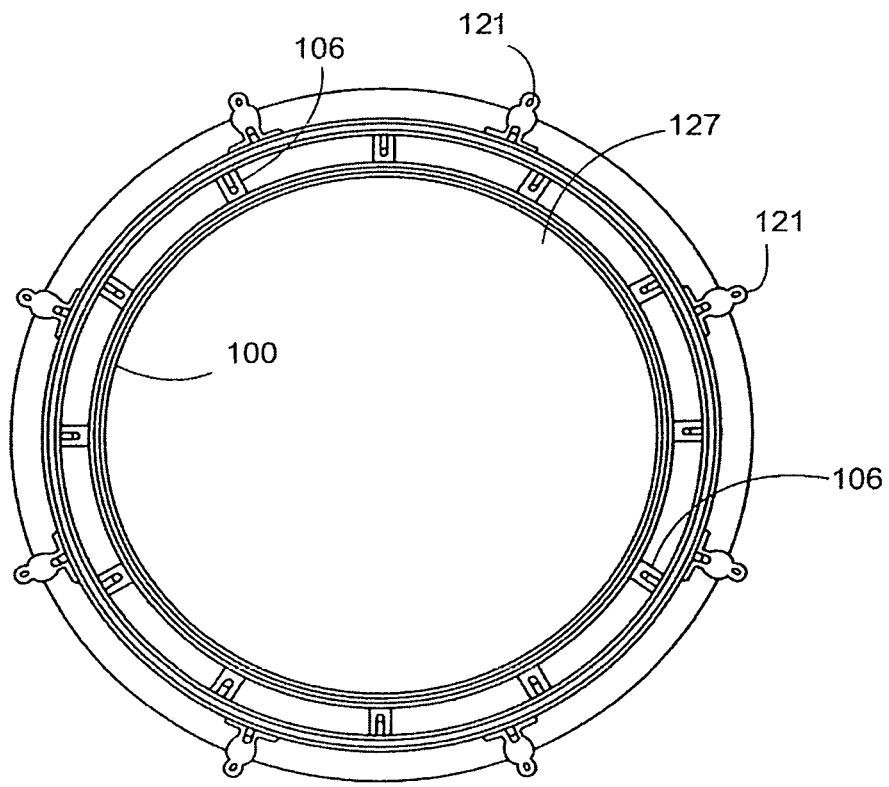

As a further alternative embodiment, the illustrated spray dryer system can be easily modified, as depicted in FIG. 15A, for use in spray chilling of melted flow streams, such as waxes, hard waxes, and glycerides, into a cold gas stream to form solidified particles. Similar items to those described above have been given similar reference numerals. During spray chilling, a feedstock with a melting point, slightly above ambient conditions, is heated and placed in the holding tank 130 which in this case is wrapped in an insulation 130a. The feed stock is pumped to the atomizing nozzle 16 thru the feed line 131 using the pump 132. The molten feedstock again is atomized using compressed gas such as nitrogen 150. During spray chilling melted liquid feedstock may or may not be electrostatically charged. In the latter case, the electrode of the electrostatic spray nozzle assembly is deenergized.

During spray chilling, the atomizing gas heater 152 is turned off so that cool atomizing gas is delivered to the atomizing nozzle 16. During the spray chilling, the drying gas heater 169 also is turned off delivering drying gas that has been cooled by the dehumidification coil 170a to the drying chamber 12 through the drying gas line 165. As the atomized droplets enter the drying gas zone 127 they solidify to form particles that fall into the collection cone 18 and are collected in the collection chamber 19 as the gas stream exits for recirculation. The removable liner 100 again aids in the cleaning of the dryer chamber since it can be removed and discarded. The insulating air gap 101 prevents the drying chamber 12 from becoming cold enough for condensation to form on the outside surface.

Figure 26:
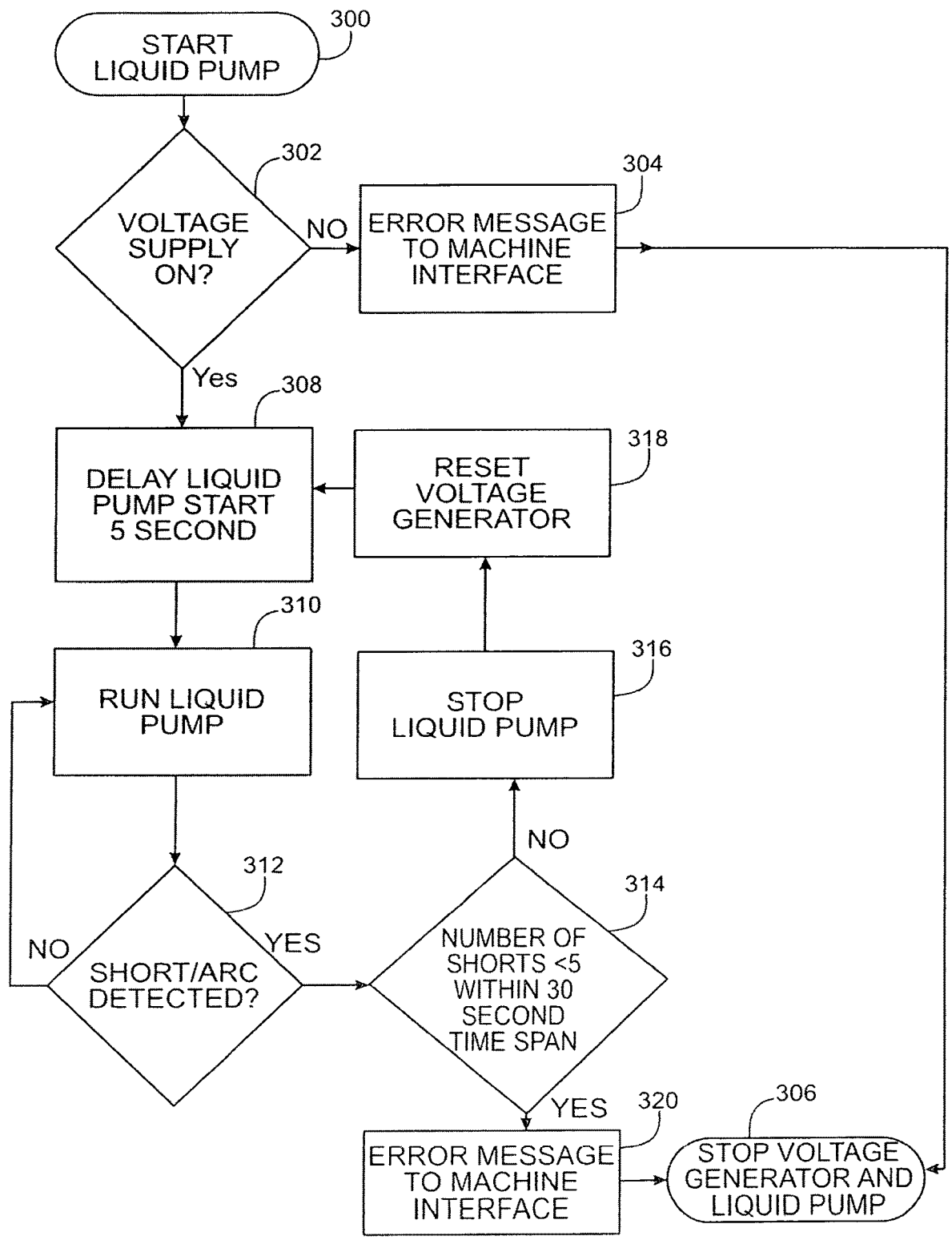
FIG. 26 is a flowchart for a method of operating a voltage generator fault recovery method for use in an electrostatic spray dryer system in accordance with the disclosure.
Figure 27:
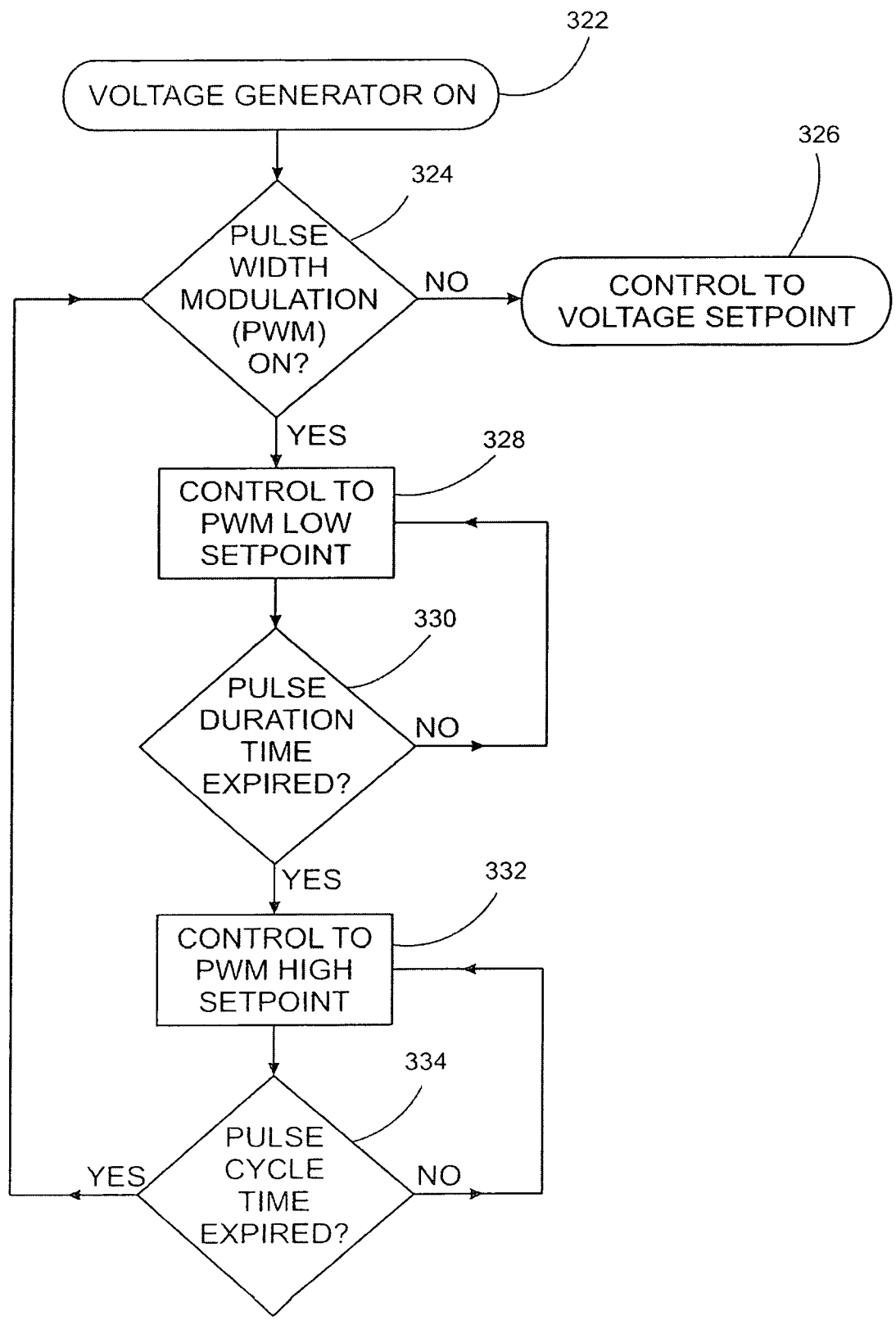
FIG. 27 is a flowchart for a method of modulating a pulse width in an electrostatic spray nozzle for use in an electrostatic spray dryer system in accordance with the disclosure.

In carrying out still a further feature of this embodiment, the spraying system 10 may operate using an automated fault recovery system that allows for continued operation of the system in the event of a momentary charge field breakdown in the drying chamber, while providing an alarm signal in the event of continued electrical breakdown. A flowchart for a method of operating a voltage generator fault recovery method for use in the spraying system 10 is shown in FIG. 27. The illustrated method may be operating in the form of a program or a set of computer executable instructions that are carried out within the controller 133 (FIG. 15). In accordance with the illustrated embodiments, the method shown in FIG. 26 includes activating or otherwise starting a liquid pump at 300 to provide a pressurized supply of fluid to an injector inlet. At 302, a verification of whether a voltage supply is active is carried out. In the event the voltage supply is determined to be inactive at 302, an error message is provided at a machine interface at 304, and a voltage generator and the liquid pump are deactivated at 306 until a fault that is present, which may have caused the voltage supply to not be active as determined at 302, has been rectified.

At times when the voltage supply is determined at 302 to be active, a delay of a predefined time, for example, 5 seconds, is used before the liquid pump is started at 308, and the liquid pump is run at 310 after the delay has expired. A check is performed at 312 for a short or an arc at 312 while the pump continues to run at 310. When a short or arc is detected at 312, an event counter and also a timer are maintained to determine whether more than a predefined number of shorts or arcs, for example, five, have been detected within a predefined period, for example, 30 seconds. These checks are determined at 314 each time a short or arc is detected at 312. When fewer than the predefined shorts or arcs occur within the predefined period, or even if a single short or arc is detected, the liquid pump is stopped at 316, the voltage generator producing the voltage is reset by, for example, shutting down and restarting, at 318, and the liquid pump is restarted at 310 after the delay at 308, such that the system can remediate the fault that caused the spark or arc and the system can continue operating. However, in the event more than the predefined number of sparks or arc occur within the predefined period at 314, an error message is generated at a machine interface at 320 and the system is placed into a standby mode by deactivating the voltage generator and the liquid pump at 306.

In one aspect, therefore, the method of remediating a fault in an electrostatic spray drying system includes starting a pump startup sequence, which entails first determining a state of the voltage generator and not allowing the liquid pump to turn on while the voltage generator has not yet activated. To accomplish this, in one embodiment, a time delay is used before the liquid pump is turned on, to permit sufficient time for the voltage generator to activate. The liquid pump is then started, and the system continuously monitors for the presence of a spark or an arc, for example, by monitoring the current drawn from the voltage generator, while the pump is operating. When a fault is detected, the voltage generator turns off, as does the liquid pump, and depending on the extent of the fault, the system automatically restarts or enters into a standby mode that requires the operator's attention and action to restart the system.

Finally, in carrying out a further aspect of the present embodiment, the spray drying system 10 has a control which enables the charge to the liquid sprayed by the electrostatic spray nozzle assembly to be periodically varied in a fashion that can induce a controlled and selective agglomeration of the sprayed particles for particular spray applications and ultimate usage of the dried product. In one embodiment, the selective or controlled agglomeration of the sprayed particles is accomplished by varying the time and frequency of sprayer activation, for example, by use of a pulse width modulated (PWM) injector command signal, between high and low activation frequencies to produce sprayed particles of different sizes that can result in a varying extent of agglomeration. In another embodiment, the selective or controlled agglomeration of the sprayed particles may be accomplished by modulating the level of the voltage that is applied to electrostatically charge the sprayed fluid. For example, the voltage may be varied selectively in a range such as 0-30 kV. It is contemplated that for such voltage variations, higher voltage applied to charge the fluid will act to generally decrease the size of the droplets, thus decreasing drying time, and may further induce the carrier to migrate towards the outer surfaces of the droplets, thus improving encapsulation. Similarly, a decrease in the voltage applied may tend to increase the size of the droplets, which may aid in agglomeration, especially in the presence of smaller droplets or particles.

Other embodiments contemplated that can selectively affect the agglomeration of the sprayed particles include selectively changing over time, or pulsing between high and low predetermined values, various other operating parameters of the system. In one embodiment, the atomizing gas pressure, the fluid delivery pressure, and the atomizing gas temperature may be varied to control or generally affect particle size and also the drying time of the droplets. Additional embodiments may further include varying other parameters of the atomizing gas and/or the drying air such as their respective absolute or relative moisture content, water activity, droplet or particle size and others. In one particular contemplated embodiment, the dew point temperature of the atomizing gas and the drying air are actively controlled, and in another embodiment, the volume or mass airflow of the atomizing gas and/or the drying air are also actively controlled.

A flowchart for a method of modulating a pulse width in an electrostatic spray nozzle to selectively control the agglomeration of sprayed particles is shown in FIG. 27. In accordance with one embodiment, at an initiation of the process, a voltage generator is turned on at 322. A determination of whether a PWM control, which will selectively control the agglomeration, is active or desired is carried out at 324. When no PWM is desired or active, the process controls the system by controlling the voltage generator to a voltage setpoint at 326, and the fluid injector is operated normally. When PWM is desired or active, the system alternates between a low PWM setpoint and a high PWM setpoint for predefined periods and during a cycle time. In the illustrated embodiment, this is accomplished by controlling to the low PWM setpoint at 328 for a low pulse duration time at 330. When the low pulse duration time has expired, the system switches to a high PWM setpoint at 332 until a high pulse duration time has expired at 334, and returns to 324 to determine if a further PWM cycle is desired. While changes in the PWM setpoint are discussed herein relative to the flowchart shown in FIG. 27, it should be appreciated that other parameters may be modulated in addition to, or instead of, the sprayer PWM. As discussed above, other parameters that may be used include the level of voltage applied to charge the liquid, the atomizing gas pressure, the liquid delivery rate and/or pressure, the atomizing gas temperature, the moisture content of the atomizing gas and/or drying air, and/or the volume or mass air flow of the atomizing gas and/or drying air.

In one aspect, therefore, the agglomeration of sprayed particles is controlled by varying the injection time of the sprayer. At high frequencies, i.e., at a high PWM, the sprayer will open and close more rapidly producing smaller particles. At low frequencies, i.e., at the low PWM, the sprayer will open and close more slowly producing larger particles. As the larger and smaller particles make their way through the dryer in alternating layers, some will physically interact and bind together regardless of their repulsing electrical charges to produce agglomerates by collusion. The specific size of the larger and smaller particles, and also the respective number of each particle size per unit time that are produced, can be controlled by the system by setting the respective high and low PWM setpoints, and also the duration for each, to suit each specific application.

Figure 28:
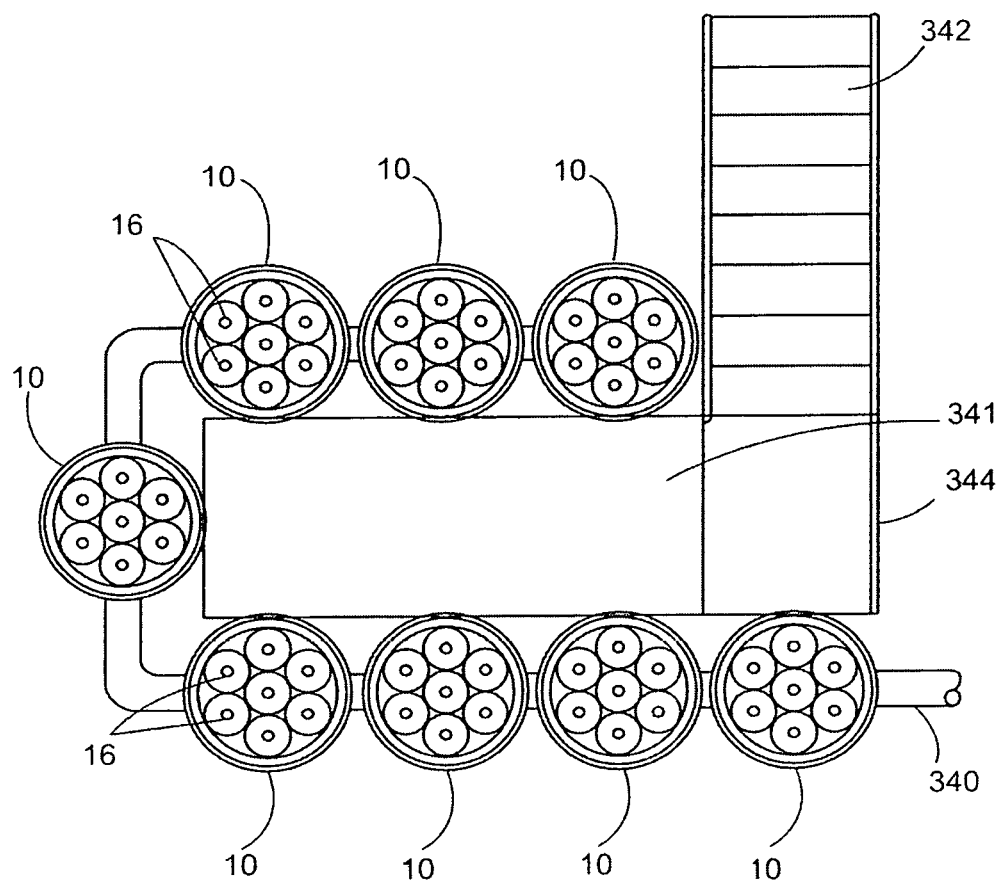
FIG. 28 is a top view, diagrammatic depiction of a modular spray dryer system having a plurality of powder processing towers.
Figure 29:
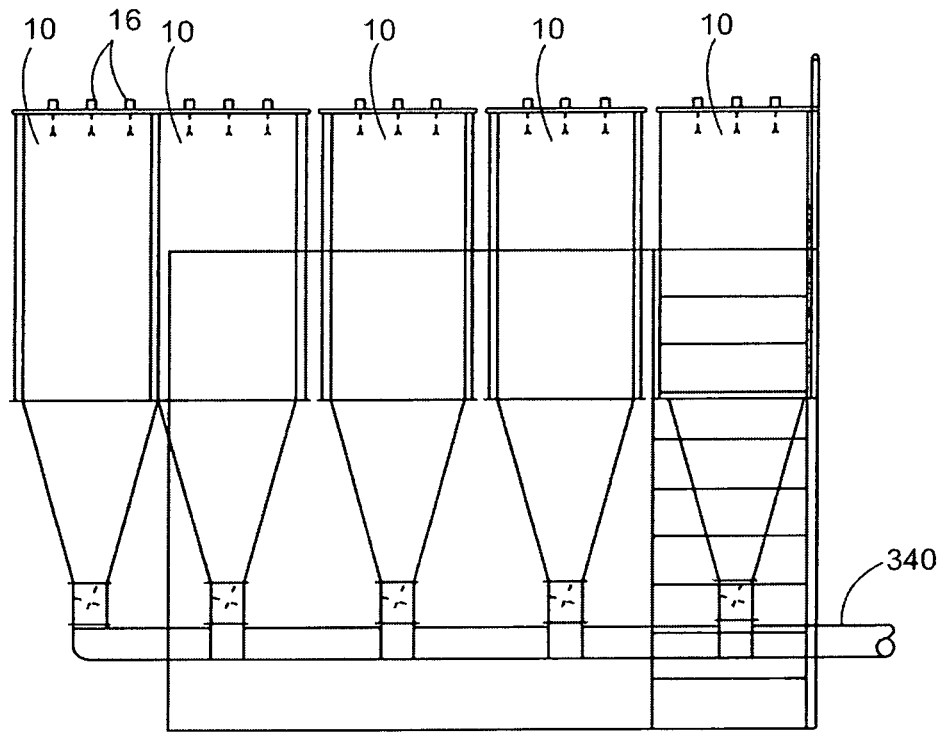
FIG. 29 is a front plan view of the modular spray dryer system shown in FIG. 28.

In accordance with still a further feature, a plurality of powder processing towers 10 having drying chambers 11 and electrostatic spray nozzle assemblies 16 as described above, may be provided in a modular design, as depicted in FIGS. 28 and 29, with the powder discharging onto a common conveyor system 340 or the like. In this case, a plurality of processing towers 10 are provided in adjacent relation to each other around a common working platform 341 accessible to the top by a staircase 342, and having a control panel and operator interface 344 located at an end thereof. The processing towers 10 in this case each include a plurality of electrostatic spray nozzle assemblies 16. As depicted in FIG. 28, eight substantially identical processing towers 10 are provided, in this case discharging powder onto a common powder conveyor 340, such as a screw feed, pneumatic, or other powder transfer means, to a collection container.

Figure 30:
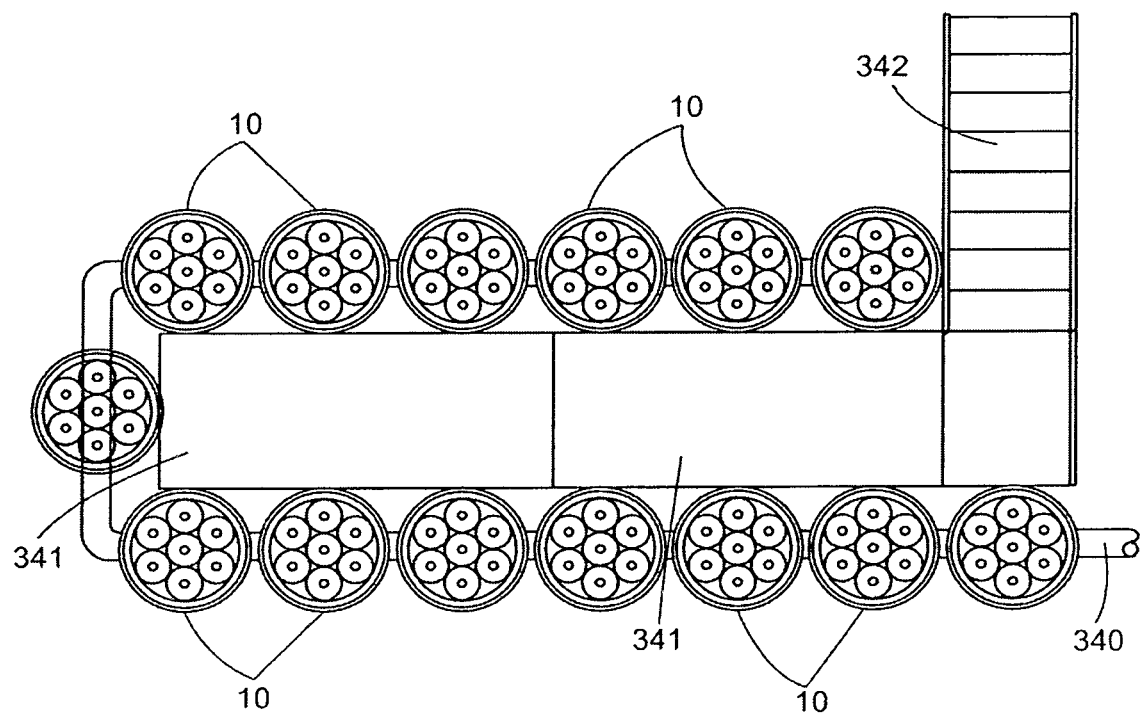
FIG. 30 is a top view of the modular spray dryer system, similar to FIG. 28, but having additional powder processing towers.

Such a modular processing system has been found to have a number of important advantages. At the outset, it is a scalable processing system that can be tailored to a users requirements, using common components, namely substantially identical processing powder processing towers 10. The system also can easily be expanded with additional modules, as depicted in FIG. 30. The use of such a modular arrangement of processing towers 10 also enables processing of greater quantities of powder with smaller building height requirements (15-20 feet) as compared to standard larger production spray dryer systems which are 40 feet and greater in height and require special building layouts for installation. The modular design further permits isolation and service individual processing towers of the system without interrupting the operation of other modules for maintenance during processing. The modular arrangement also enables the system to be scaled for energy usage for particular user production requirements. For example, five modules could be used for one processing requirement and only three used for another batch.

Figure 31:
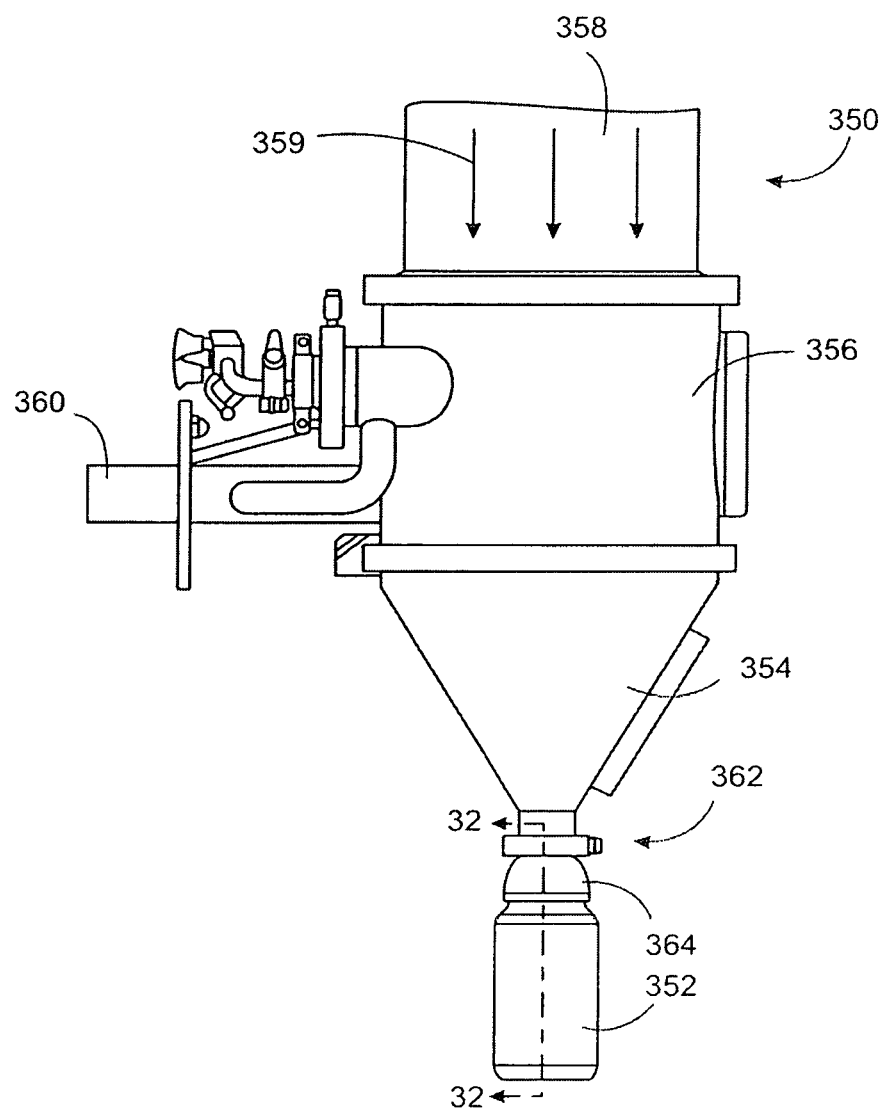
FIG. 31 is a side elevation view of an alternative embodiment of a powder collection system.
Figure 32:
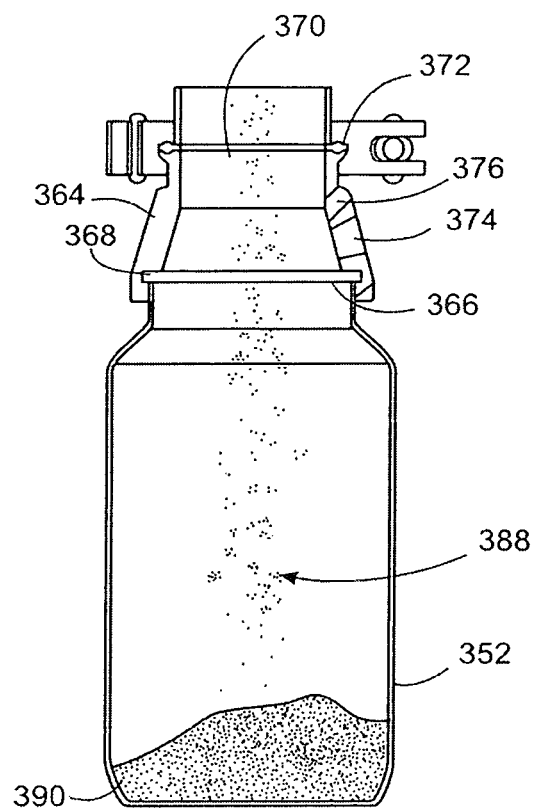
FIG. 32 is an enlarged, cross-sectional view of the collection vessel of the powder collection system of FIG. 31.
Figure 33:
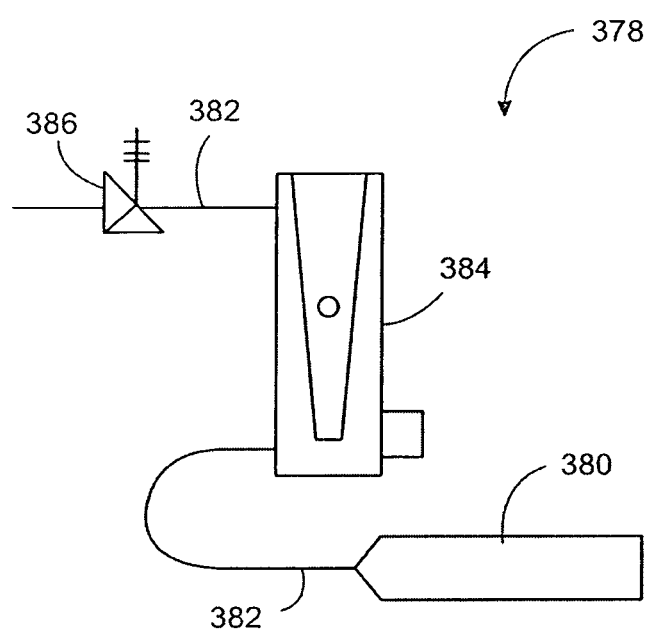
FIG. 33 is a schematic view of the blanket gas feed system for the powder collection system of FIGS. 31 and 32.

With reference to FIGS. 31-33, there is shown an alternative embodiment of a powder collection system 350 that is configured to protect the finished product from damage caused by exposure to moisture, heat and/or oxygen. More particularly, the powder collection system 350 is equipped with a gas blanket system that serves to protect the finished powder from exposure to moisture-laden gas, heat and oxygen associated with the drying process. As shown in FIG. 31, and similar to the embodiment of for example FIG. 12, the powder collection system 350 of this embodiment includes a collection vessel 352 having an open upper end that is arranged at the bottom of a powder collection cone 354 which, in turn, depends from a lower end of a separation plenum 356. The separation plenum 356 communicates with a drying chamber 358. Drying gas and powder (generally shown by arrows 359 in FIG. 31) pass from the drying chamber 358 into the separation plenum 356 as shown in FIG. 31. The separation plenum 356 also communicates with an exhaust gas outlet 360 through which moisture laden drying gas exits the separation plenum 356 while the powder falls into the collection cone 354. In this case, the collection vessel 352 is configured as a removable container that is detachably secured to an open lower end of the powder collection cone 354 by a clamp 362.

To facilitate introduction of a blanketing gas into the collection vessel 352, an adapter 364 is provided at the upper end of the collection vessel 352. In the illustrated embodiment, the adapter 364 includes a rubber seal 366 that engages with an upper edge 368 of the collection vessel 352 as shown in FIG. 32. The adapter 364 surrounds the upper end of the collection vessel 352 and defines a central passage 370 through which dried product may pass from the powder collection cone 354 to the collection vessel 352. In this case, the adapter 364 also defines a flange 372 that is captured in the clamp 362 that secures the collection vessel 352 to the powder collection cone 354. A blanket gas inlet orifice 374 that communicates with the interior of the collection vessel 352 is provided in a sidewall of the adapter 364. This orifice 374 may be connected to a blanketing gas supply such that a blanketing gas may be directed into the interior of the collection vessel 352. The blanketing gas may be any suitable gas and preferably is cool and does not contain appreciable amounts of moisture or oxygen. Nitrogen is one example of a suitable blanketing gas although other gases or gas mixtures may be used.

An exemplary blanket gas feed system 378 that can be used to direct the blanketing gas to the inlet orifice 374, and thus into the collection vessel 352, is shown in FIG. 33. The illustrated blanket gas feed system 378 includes a blanket gas supply 380, which may be a pressurized storage tank, that communicates with the inlet orifice 374 via a gas feed line 382. To control the flow of blanket gas, an adjustable flow control device 384, such as a flow meter or rotameter, may be provided in the gas feed line 382. The flow control device 384 may be configured to be manually adjustable by an operator of the spray dryer system or may be automatically adjustable based on, for example, signals received from a controller. To prevent over pressurization of the collection vessel 352 and/or the gas feed line 382, a pressure relief valve 386 may be arranged in the gas feed line between the flow control device 384 and the collection vessel 352.

In operation, material is spray dried in the drying chamber 358 and falls downward into the separation plenum 356 then into the collection cone 354 via gravity and gas flow. The falling finished product then collects in the collection vessel 352. The blanketing gas is introduced into the collection vessel 352 through the inlet orifice 374 and blankets the falling product (referenced as 388 in FIG. 32) and the settled product (referenced as 390 in FIG. 32) in the collection vessel 352. The blanketing gas slightly pressurizes the collection vessel 352 and the adapter 364, which prevents the exhaust drying gas from entering the collection vessel 352 and exposing the finished product to the harmful effects of moisture, heat and/or oxygen. Excess blanketing gas travels upward through the powder collection cone 354 and into the separation plenum 356, mixes with the dryer exhaust gas and exits the drying chamber through the exhaust gas outlet 360. The flow control device 384 may be set such that a sufficient flow of blanketing gas is directed into the collection vessel 352 to protect the finished powder from heat, moisture and oxygen originating from the drying chamber 358 and separation plenum 356. However, the blanket gas flow should be kept below a level at which the finished powder would fluidize and become airborne. The blanket gas flow should also be set so as to not pressurize the collection vessel 352 to such an extent that dry product is prevented from falling downward into the collection vessel 352. When desired, the collection vessel 352 may be detached from the collection cone 354 so as to remove the finished product. When doing so, a closing device such as a conventional cap or lid may be placed over the open upper end of the collection vessel 352 to prevent exposure of the product to ambient air that may contain moisture and oxygen.

Figure 34:
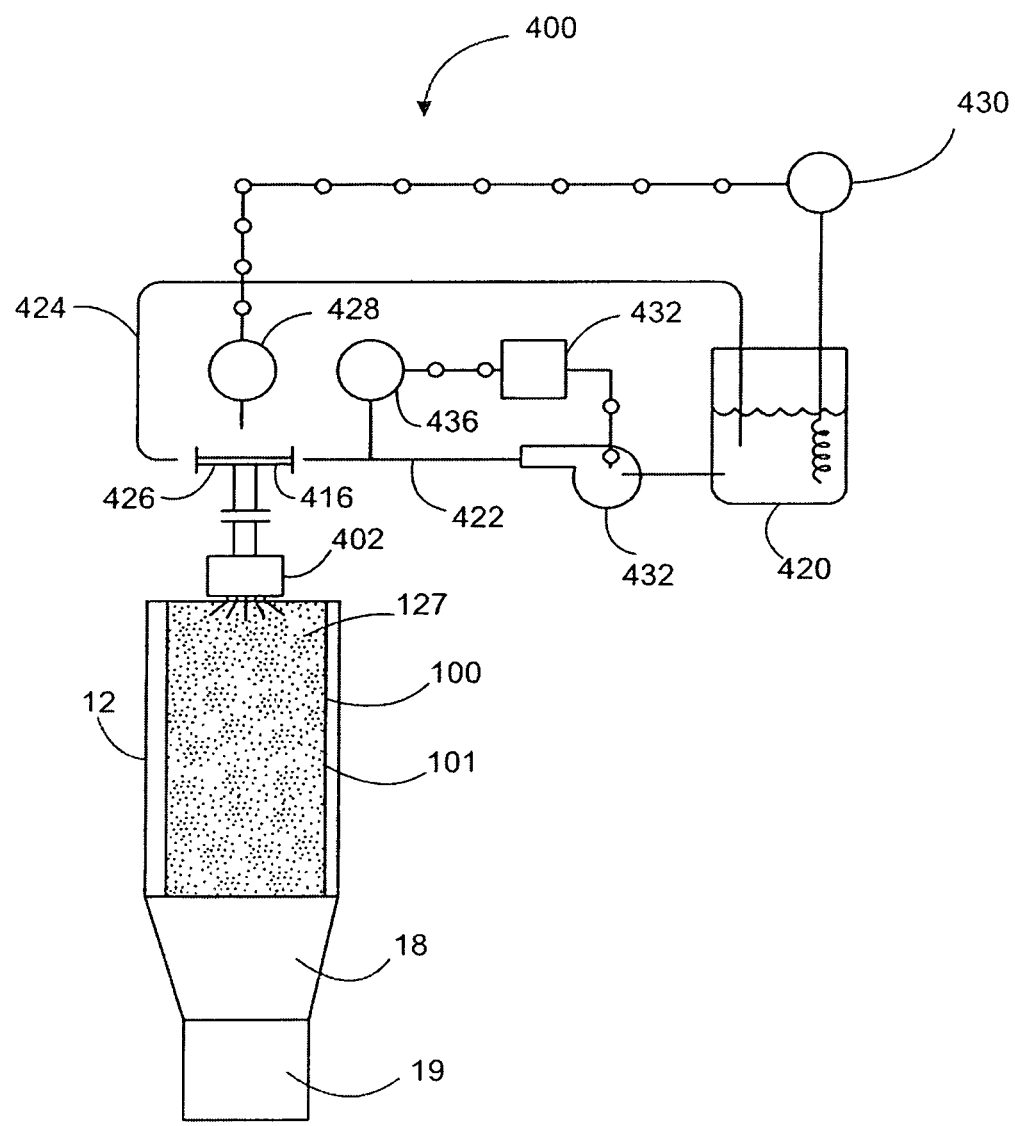
FIG. 34 is a schematic of an alternative embodiment of a spray dryer operable for spray chilling of molten flow streams into solid particles.
Figure 35:
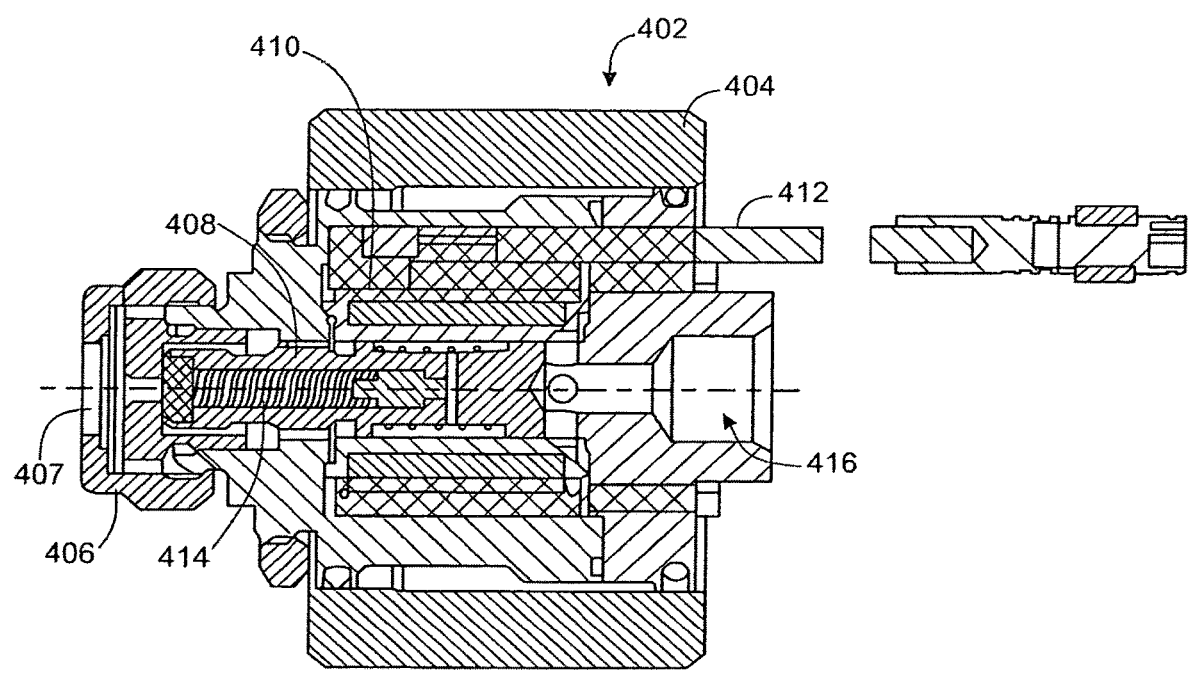
FIG. 35 is an enlarged section view of the pulsing spray nozzle assembly of the spray dryer system of FIG. 34.

A further embodiment of a spray dryer configured as a spray chilling system 400 for performing spray chilling of molten flow streams, such as waxes and polymers that are solid at or near atmospheric conditions, is shown in FIGS. 34 and 35. The spray chilling system 400 of FIGS. 34 and 35 is configured to discharge the molten feedstock material into a cold gas stream in the drying chamber 12 of the spray dryer in order to form solid particles. The spray chilling system 400 of FIGS. 34 and 35 has some similarities to the embodiment of FIG. 15A and items similar to those described above have given similar reference numbers.

In accordance with one important aspect of this embodiment, the spray chilling system 400 of FIGS. 34 and 35 uses a pulsing spray nozzle assembly 402 to discharge the molten material into the drying chamber 12. More particularly, the pulsing spray nozzle assembly 402 is configured to produce a pulsing flow that alternates between on and off flow conditions. A section view of an exemplary embodiment of a suitable pulsing spraying nozzle assembly 402 is shown in FIG. 35. The spray nozzle assembly 402 of FIG. 35 is electrically actuated and includes a nozzle body 404 having a spray tip 406 defining a discharge orifice 407 fixed at a downstream end thereof and a metallic plunger 408 disposed within a solenoid coil 410. The solenoid coil 410 is appropriately coupled to an outside electrical source by electrical leads in this case contained in a suitable conduit 412 that extends from the nozzle body 404. In a known manner, electrical actuation of the solenoid coil 410 is effective for moving the valve plunger 408 to a spray tip open position against the biasing force of a closing spring 414. When in the open position, molten material that enters through the inlet port 416 of the nozzle body 404 is able to pass through the nozzle body 404 and discharge from the nozzle through the spray tip 406. When the solenoid coil 410 is deactivated, the closing spring 414 moves the valve plunger 408 to a spray tip closed position which blocks the flow of molten material out of the spray tip 406. Such electrically actuated spray nozzle assemblies may be cycled at high speeds between the open and closed positions for intermittent discharge of the molten flow stream.

The illustrated spray nozzle assembly 402 is heated in order to help maintain a desired elevated temperature of the molten feed material up to the point at which the material is discharged from the spray tip 406. Further, the illustrated spray nozzle assembly 402 is configured such that the spray tip 406 may be removed from the nozzle body 404 and interchanged with another similarly or differently configured spray tip. The spray tip 406 of the spray nozzle assembly 402 is preferably configured to produce a fan-shaped discharge pattern, which can help prevent the collision of particles as they are being spray chilled. However, a full cone or hollow cone discharge pattern may be used depending upon the application, feed stock physical properties and chemistry or morphology requirements. If a fan-shaped pattern is used, multiple spray nozzles may be used that are arranged such that the straight portions of the fan patterns are parallel to one another. With such an arrangement, the on/off function of each individual spray nozzle may be synchronized with the adjacent nozzles in order to help prevent droplet collisions. The ability to interchange the spray tip 406 on the nozzle body 404 can allow the spray nozzle assembly 402 to produce different spray angles and droplet sizes depending, for example, on the application and/or the feedstock material being used. In the illustrated embodiment, the nozzle body 404 and spray tip 406 are configured to produce hydraulic atomization of the molten material. In other embodiments, the pulsing spray nozzle assembly 402 may be configured to provide air atomization of the molten flow stream.

The pulsing spray nozzle assembly 402 may be of a commercially known type such as offered by Spraying Systems Co, assignee of the present application, under the trademark PulsaJet. Various components and their mode of operation of the illustrated spray nozzle assembly 402 are similar to those described in U.S. Pat. No. 7,086,613, the disclosure of which is incorporated herein by reference. Alternatively, any spray nozzle assembly may be used that is capable of producing a pulsing spray action and is configured to stop the flow from the nozzle and then to immediately deliver full pressure to the nozzle tip once the flow begins again.

As in the embodiment of FIG. 15A, during a spray chilling operation, the drying gas delivered to the drying chamber 12 is cooled, for example, by a dehumidification coil. As the atomized droplets discharged from the pulsing spray nozzle assembly 402 enter the drying gas zone 127, they solidify to form particles that fall into the collection cone 18 and are collected in the collection chamber 19 as the gas stream exits for recirculation. The removable liner 100 again aids in the cleaning of the dryer chamber since it can be removed and discarded. An insulating air gap 101 may be provided to prevent the drying chamber 12 from becoming cold enough for condensation to form on the outside surface.

To ensure that the molten feed material remains at a desired temperature up to the point at which it is discharged into the spray dryer, the spray chilling system 400 may be configured with a heated recirculating loop that, for example, can keep the molten feedstock being supplied to the spray nozzle assembly 402 at a desired elevated temperature. An embodiment of such a recirculation loop is shown in FIG. 34. The illustrated recirculation loop includes a heated liquid holding tank 420 that stores the molten material. The holding tank 420 is connected to the nozzle assembly 402 by both a supply line 422 that communicates with the inlet port 416 of the spray nozzle assembly 402 and a recirculation line 424 that communicates with a recirculation port 426 of the spray nozzle assembly (shown schematically in FIG. 34). A temperature sensor 428 arranged in the supply line 422 near the spray nozzle assembly 402 communicates with and controls a heater 430 in the holding tank 420 such that the molten material is maintained at a desired temperature, e.g. just above the melting point. Keeping the molten material just above the melting temperature reduces the amount of heat transfer that is necessary in order to convert the droplets of molten material to particles in the drying chamber 12 helping to ensure that the droplets are solidified as quickly as possible.

High flows can overwhelm the heat carrying capacity of the drying gas leading to improper droplet formation. The pulsing action produced by the spray nozzle assembly 402 eliminates the high flows and allows for full pressure delivery of molten material, which can help ensure proper droplet formation. Additionally, the pulsing discharge of the spray nozzle assembly 402 prevents over- and under-discharge of molten material, which can also lead to deterioration of the droplet formation.

For moving the molten material from the holding tank 420 to the spray nozzle assembly 402, a pump 432 is provided in the supply line 422. In this case, the pump 432 is driven by a variable speed drive 434 that allows the pressure delivered by the pump 432 to be adjusted. Other adjustable driving arrangements for the pump 432 could also be used. A pressure sensor 436 arranged in the supply line 422 near the spray nozzle assembly 402 monitors the pressure of the molten material and this information is communicated to the variable speed drive 434 and may be used to ensure that the pump 432 supplies the molten material to the spray nozzle assembly at a constant pressure. The heated recirculation loop allows for precise control of the temperature of the molten material right up to the spray nozzle assembly including ensuring that the molten material remains at the desired temperature even when a spraying operation is interrupted. In such a case, the heated recirculation loop ensures that the molten material is at the desired temperature for optimum system performance immediately upon resumption of spraying.

Referring to FIG. 36 of the drawings there is shown a further embodiment of a spray drying system 500. Similar to, for example, the embodiment of FIG. 1, the spray drying system 500 of FIG. 36 includes an upstanding cylindrical drying chamber 502, a top closure arrangement 504 having a liquid spray nozzle assembly 506 and a drying gas inlet 508 and a bottom closure arrangement 510 that includes a powder collection vessel 512 that is supported at the bottom of the drying chamber 502. The powder collection vessel 512 of the embodiment of FIG. 36 is shown in more detail in FIGS. 37-39. Instead of using a separate filter arrangement for filtering out dry powder particles from the drying gas exhaust stream, the powder collection vessel of FIGS. 37-39 utilizes a filter collection sock 514 within which the dried powder finished product that falls from the drying chamber 502 may be captured. This collection sock 514 can increase product yield from the spray dryer system 500 by capturing finished powder that otherwise would be lost in separate filter elements. In the illustrated embodiment, the filter collection sock 514 has a sidewall 516 and bottom wall 518 (see FIG. 39) made of a filter material. The sidewall 516 and bottom wall 518 of the collection sock 514 together define an internal collection area 520 that is open at its upper end 522 so as to be able to communicate with the drying chamber 502. The filter material of the sidewall 516 and bottom wall 518 may be configured so that dry powder particles that are entrained in the drying gas are captured in the filter material as the drying gas is drawn out of the internal collection area 520 of the collection sock 514 through the filter material via a drying gas exhaust outlet 524 (see FIG. 36). In this regard, the exhaust gas recirculation system of FIG. 15 may be used with the spray dryer system 500 of FIG. 36.

In the illustrated embodiment, the filter sock 514 is supported on an annular ring 526 that, in turn, is supported via a sidewall 528 of the powder collection vessel 512. More specifically, the filter sock 514 is held in place, in this case, by an inflatable seal 530 that is arranged between the filter collection sock 514 and the annular ring 526. To remove the filter sock 514 from the powder collection vessel 512 for emptying, a lower portion 532 of the powder collection vessel 512 may be removed via screws 533 and the seal 530 deflated such that the filter collection sock 514 can be separated from the annular ring 526. When the emptied filter collection sock 514 is replaced or a new collection sock is installed, the upper portion of the collection sock 514 is placed within the annular ring 526 and the seal 530 is inflated capturing the sock against, for example, a tube from the drying chamber 502 above that closely matches the inner diameter of the collection sock. In this case, an air inlet 534 is provided on the collection vessel 512 for inflating the seal 530. Once the collection sock 514 is secured, the lower portion of the collection vessel 512 can then be reattached using the screws 533.

To facilitate cleaning and removal of the dry powder from the drying chamber 502, a scraper arrangement 540 may be provided on the sidewall 542 of the drying chamber 502 as shown in FIGS. 40 and 41. In the illustrated embodiment, the scraper arrangement 540 may include a handle portion 544 that is arranged on an exterior surface 546 of the sidewall 542 of the drying chamber 502 and a scraper portion 548 that is arranged on an interior surface 550 of the sidewall 542 of the drying chamber 502 as shown in FIG. 41. According to one embodiment, one or both of the handle portion 544 and scraper portion 548 may be configured as a magnet. To the extent only one of the components of the scraper arrangement 540 is a magnet the other component may be made of a magnetic material that is attracted to the magnet component. To the extent both the handle portion 544 and the scraper portion 548 are magnets, the poles of the magnets should be arranged such that the handle portion 544 and the scraper portion 548 are attracted to each other. Moreover, the sidewall 542 of the drying chamber 502 may be configured such that the magnetic field produced by the one or more magnets can pass through the sidewall 542 and exert a pulling force on the other component. For example, the sidewall 542 of the drying chamber 502 may be made of glass. In this way, movement of the handle portion 544 along the exterior surface 546 of the sidewall 542 of the drying chamber 502, such as through manual operation by an operator, will result in corresponding movement of the scraper portion 548 along the interior surface 546 of the sidewall 542. This movement of the scraper portion 548 may help dislodge dry powder that is stuck to the interior surface 550 of the sidewall 542 of the drying chamber 502 allowing the dry powder to then fall into the powder collection vessel 512 and be captured, for example, in the powder collection sock 514. In the illustrated embodiment, the handle portion 544 and scraper portion 548 have generally rectangular configurations; however, other configurations may be used.

In order to filter particulate material from flowing gas streams associated with the spray dryer system 500, a filter housing assembly 560 with a HEPA filter 562 may be provided in one or both of the drying gas inlet 508 and outlet lines 524 (the inlet and outlet are shown in FIG. 36). The drying gas inlet and outlet are shown in FIG. 15 as being connected by a recirculation line 165 which is part of a gas recirculation system which can be used with respect to the spray dryer system of FIG. 36. According to one embodiment, the filter housing assembly 560 with HEPA filter 562 may be provided in this recirculation line 165 near one or both of the drying gas inlet and outlet. An exemplary embodiment of the filter housing assembly 560 with HEPA filter 562 is shown in FIGS. 42 and 43 (the filter 562 is only shown in FIG. 43). The HEPA filter 562 may be configured as a hockey puck style filter element such as are sold by Soldberg Manufacturing of Itasca, Ill. More specifically, as shown in FIG. 43, the HEPA filter 562 may include a filter element 564 having a corrugated configuration that is held within a cylindrical filter cartridge 566. The filter cartridge 566 may include a filter body 568 that has a laterally extending cartridge body flange 570 at one end thereof. This type of filter element 564 and filter cartridge 566 are disclosed in U.S. Pat. No. 5,178,760, the disclosure of which is incorporated herein by reference.

The illustrated filter housing assembly 560 includes a housing body 572 with clamps 574, 576 at either end as shown in FIG. 42 that can be used to attach the filter housing assembly 560 to appropriate piping. In this case, the housing body 572 has a relatively large diameter at a first end 578 and a relatively smaller diameter at a second end 580, although the housing body 572 could have other configurations. As shown in FIG. 43, the housing body 572 further includes an outwardly extending tapered flange 582, 584 at each of the first and second ends 578, 580. Each of the tapered flanges 582, 584 is engaged by a mating surface on a respective one of the clamps 574, 576. To help seal the filter housing assembly to adjacent piping, gaskets 586, 588 are also provided at the first and second ends 578, 580 of the housing body 572. When the HEPA filter 562 is assembled in the housing body 572, the cartridge body flange 570 rests in an annular notch or groove 590, in this case, in the first end of the housing body and the body 568 of the filter cartridge 566 abuts against the interior surface of the housing body. With the illustrated arrangement, the hockey puck style filter is sandwiched between sanitary flange connections. While the filter housing assembly 560 and HEPA filter 562 are described and shown in relating to the gas inlet and outlets of the spray dryer system, the filter housing assembly and HEPA filter may have applicability to other applications involving gas flow.

From the foregoing, it can be seen that a spray dryer system is provided that is more efficient and versatile in operation. Due to enhanced drying efficiency, the spray dryer system can be both smaller in size and more economical usage. The electrostatic spray system further is effective for drying different product lots without cross-contamination and is easily modifiable, both in size and processing techniques, for particular spray applications. The spray drying system further is less susceptible to electrical malfunction and dangerous explosions from fine powder within the atmosphere of the drying chamber. The system further can be selectively operated to form particles that agglomerate into a form that better facilitates their subsequent usage. The system further has an exhaust gas filtration system for more effectively and efficiently removing airborne particulate matter from drying gas exiting the dryer and which includes automatic means for removing the buildup of dried particulate matter on the filters which can impede operation and require costly maintenance. Additionally, the system may be equipped with a gas blanket system to protect the collected finished product from exposure to moisture-laden gas, heat and oxygen from the drying chamber. Yet, the system is relatively simple in construction and lends itself to economical manufacture.

The invention claimed is:

1. An electrostatic spray drying system for drying liquid into powder form comprising:
   a powder processing tower including an elongated structural body supported in upright position; said elongated body having an upper closure arrangement affixed to and closing an upper end of said elongated structural body for forming an upper end of said processing tower and a lower closure arrangement affixed to and closing a lower end of said elongated structural body for forming a bottom of said processing tower with a drying chamber within said elongated structural body between said upper end and lower end closure arrangement;
   an electrostatic spray nozzle assembly supported in said upper closure arrangement;
   said electrostatic spray nozzle assembly including a nozzle body having a discharge spray tip at a downstream end thereof for directing liquid into said drying chamber;
   said electrostatic spray nozzle assembly having a liquid inlet for coupling to a supply of liquid to be discharged into the drying chamber and an electrode for coupling to an electrical source for electrically charging liquid passing through said spray nozzle assembly for discharge from said discharge spray tip into said drying chamber as fine liquid particles;
   said upper closure arrangement having a drying gas inlet for directing drying gas into said drying chamber for drying the discharged fine liquid particles into powder, said lower closure arrangement having a drying gas outlet;
said lower closure arrangement including a powder collection vessel for receiving dried powder from said drying chamber;
a filter collection sock mounted within said powder collection vessel made of a filter material and having an upwardly opening side communicating with said drying chamber for receiving, capturing and collecting dried powder from said drying chamber prior to direction of the drying gas to and through said drying gas outlet;

said drying gas outlet being disposed in said lower closure arrangement above and apart from said powder collection vessel; and said powder collection vessel having a closed bottom open top configuration removably mounted in underlying relation to said drying chamber; at least a portion of said powder collection vessel being removable from said lower closure arrangement without removal of said drying gas outlet from said lower closure arrangement and any exhaust gas line coupled to the drying gas outlet; said filter collection sock being removable from said lower closure arrangement upon removal of said at least a portion of the powder collection vessel from said lower closure arrangement for enabling removal of said filter collection sock and dispensing of dried powder collected in the filter collection sock and replacement of a filter collection sock within the powder collection vessel without removal of the exhaust gas outlet from said lower closure arrangement and any exhaust gas outlet line coupled to said exhaust gas outlet.

2. The electrostatic spray drying system of claim 1 in which said electrostatic spray nozzle assembly has an atomizing gas inlet for coupling to a pressurized gas supply for directing pressurized atomizing gas through said nozzle body for atomizing electrostatically charged liquid discharging from said nozzle assembly.

3. The electrostatic spray drying system of claim 1 further including an annular support ring supported within said lower closure arrangement adjacent an upper end of said powder collection vessel from which said filter collection sock is removably supported.

4. The electrostatic spray drying system of claim 3 further including an inflatable seal that is inflatable for securing the filter collection sock to said annular support ring and deflatable for enabling removal of a filter element sock from the support ring.

5. The electrostatic spray drying system of claim 4 in which said powder collection vessel has an air inlet communicating with said inflatable seal.

6. The electrostatic spray drying system of claim 1 in which said drying gas outlet includes a HEPA filter for filtering residual powder from said drying gas upon direction through said drying gas outlet.

7. The electrostatic spray drying system of claim 6 in which said drying gas inlet includes a HEPA filter for filtering drying gas directed into said drying chamber, and said HEPA filters each including a housing and a hockey puck configured HEPA filter element disposed within a filter cartridge.

8. The electrostatic spray draying system of claim 1 in which said powder collection vessel has a circumferential footprint corresponding to the outer perimeter of the elongated structural body.

9. The electrostatic spray drying system of claim 1 in which said elongated body has a cylindrical side wall that defines said drying chamber, a scraper arrangement for removing residual powder accumulated on said cylindrical wall of said drying chamber, said scraper arrangement including an scraper blade disposed on an interior surface of said cylindrical wall and a movable driver member disposed on an outer side of said cylindrical wall, and one of said scraper and driver member having a magnet for causing a magnetic attraction between said driver member and said scraper blade for enabling movement of said scraper blade about the interior surface of the cylindrical wall as an incident to movement of the driver member about an outer side of said cylindrical wall.

10. The electrostatic spray drying system of claim 1 including an exhaust gas outlet line in the form of a recirculation line coupled to said exhaust gas outlet for recirculating drying gas from said drying gas outlet to said drying gas inlet for reuse in said drying chamber, said recirculation line including a pump for directing drying gas from said drying gas exit to said drying gas inlet and a heater for heating the drying gas before redirection into the drying chamber.

11. The electrostatic spray drying method of claim 1 including a releasable securement device within said lower closure arrangement for securing an upper perimeter of said filter collection sock in place during operation of said electrostatic spray drying system, and said securement device being releasable for enabling removal of the filter collection sock from the powder collection vessel.

12. An electrostatic spray drying system for drying liquid into powder form comprising:

a powder processing tower including an elongated structural body supported in upright position;

said elongated body having an upper closure arrangement affixed to an upper end of said elongated structural body and a lower closure arrangement affixed to the lower end of said elongated structural body for forming a drying chamber within said elongated body;

an electrostatic spray nozzle assembly supported in said upper closure arrangement;

said electrostatic spray nozzle assembly including a nozzle body having a discharge spray tip at a downstream end thereof for directing liquid into said drying chamber;

said electrostatic spray nozzle assembly having a liquid inlet for coupling to a supply of liquid to be discharged into the drying chamber and an electrode for coupling to an electrical source for electrically charging liquid passing through said spray nozzle assembly for discharge from said discharge spray tip into said drying chamber as fine liquid particles;

said upper closure arrangement having a drying gas inlet for directing drying gas into said drying chamber for drying the discharged fine liquid particles into powder, said lower closure arrangement having a drying gas outlet through which drying gas exiting from said drying chamber is directed;

said lower closure arrangement including a powder collection vessel for receiving dried powder from said drying chamber; and said elongated body has a cylindrical side wall that defines said drying chamber, a scraper arrangement for removing residual powder accumulated on said cylindrical side wall of said drying chamber, said scraper arrangement including an elongated scraper blade disposed on an interior surface of said cylindrical side wall and an elongated movable driver member disposed on an outer side of said cylindrical side wall; one of said scraper blade and driver member having a magnetic component for causing a magnetic attraction between said driver member and said scraper blade, said driver member having a handle portion such that manual operator movement of the driver member by the handle portion circumferentially about the cylindrical side wall results in corresponding movement of the scraper blade circumferentially about the interior surface of the cylindrical side wall.

13. The electrostatic spray drying system of claim 12 in which one of said scraper blade and movable driver member includes said magnetic component and the other of said scraper blade and moveable driver is made of a material that is attracted to the magnetic component of the other.

14. An electrostatic spray drying system of claim 12 in which one of said scraper blade and removable driver member include said magnetic component and the other of said scraper blade and removable driver member also includes a magnetic component.

15. The electrostatic spray drying system of claim 12 in which a magnetic field of the said magnetic component passes through said cylindrical side wall of the drying chamber.

16. The electrostatic spray drying system of claim 15 in which said cylindrical side wall of said elongated body is made of glass.

\* \* \* \* \*